US012560481B2

(12) United States Patent　　(10) Patent No.: US 12,560,481 B2
Zhang et al.　　(45) Date of Patent: Feb. 24, 2026

(54) METHODS OF MODIFYING A LIQUID SAMPLE CONTAINING AN ANALYTE SO AS TO INCREASE SERS SIGNAL INTENSITY OF THE ANALYTE, AS WELL AS A PROBE FOR REMOTE SENSING OF AN ANALYTE USING SERS

(71) Applicant: CAPE BRETON UNIVERSITY, Sydney (CA)

(72) Inventors: Xu Zhang, Sydney (CA); Albert Collins Nganou Assonkeng, Sydney (CA); Andrew James Carrier, Sydney (CA)

(73) Assignee: CAPE BRETON UNIVERSITY, Sydney (CA)

( * ) Notice: Subject to any disclaimer, the term of this patent is extended or adjusted under 35 U.S.C. 154(b) by 1040 days.

(21) Appl. No.: 17/753,113

(22) PCT Filed: Aug. 21, 2020

(86) PCT No.: PCT/CA2020/051143
§ 371 (c)(1),
(2) Date: Feb. 18, 2022

(87) PCT Pub. No.: WO2021/030914
PCT Pub. Date: Feb. 25, 2021

(65) Prior Publication Data
US 2022/0334063 A1　　Oct. 20, 2022

Related U.S. Application Data

(60) Provisional application No. 62/890,216, filed on Aug. 22, 2019.

(51) Int. Cl.
*G01J 3/44* (2006.01)
*B82Y 15/00* (2011.01)
(Continued)

(52) U.S. Cl.
CPC ............. *G01J 3/4412* (2013.01); *B82Y 15/00* (2013.01); *B82Y 30/00* (2013.01); *G01N 21/658* (2013.01)

(58) Field of Classification Search
CPC ........ G01J 3/4412; B82Y 15/00; B82Y 30/00; G01N 21/658
See application file for complete search history.

(56) References Cited

U.S. PATENT DOCUMENTS

2008/0024762 A1\* 1/2008 Fang ...................... G01N 21/65
356/72
2011/0305898 A1 12/2011 Zhang et al.
(Continued)

FOREIGN PATENT DOCUMENTS

CN 107365254 A 11/2017
CN 108982465 12/2018
(Continued)

OTHER PUBLICATIONS

Guingab, J.D. et al., Stability of silver colloids as substrate for surface enhanced Raman spectroscopy detection of dipicolinic acid, Talanta, Elsevier, Amsterdam, NL, vol. 74, No. 2, Nov. 15, 2007 (Nov. 15, 2007), pp. 271-274.
(Continued)

*Primary Examiner* — Charles Capozzi
*Assistant Examiner* — Alex Ramirez
(74) *Attorney, Agent, or Firm* — Isabelle Pelletier; Lavery, de Billy, L.L.P.

(57) ABSTRACT

A method of modifying a liquid sample containing an analyte so as to increase SERS signal intensity of the analyte is provided. The method of the present invention comprises the steps of: providing the liquid sample to be analyzed using SERS; and adding an oxygen scavenger to the liquid sample so as to remove dissolved oxygen from the liquid
(Continued)

sample. A probe for remote sensing of an analyte in a liquid sample using SERS is also provided. The probe of the present invention comprises a detection chamber having a window that is transparent to SERS excitation light and Raman scattered signal, and tubing with a first and a second end, the first end of the tubing being flowably connected to the detection chamber and the second end of the tubing being configured to be placed in contact with a liquid sample.

14 Claims, 32 Drawing Sheets

(51) Int. Cl.
  *B82Y 30/00*     (2011.01)
  *G01N 21/65*     (2006.01)

(56)        References Cited

U.S. PATENT DOCUMENTS

2012/0276549 A1    11/2012   Cunningham et al.
2013/0045877 A1     2/2013   Yap et al.
2013/0242297 A1     9/2013   Thoniyot et al.
2018/0059118 A1*    3/2018   Weidemaier ......... G01N 33/587

FOREIGN PATENT DOCUMENTS

WO       2013/185167 A1    12/2013
WO       2017/164815 A1     9/2017

OTHER PUBLICATIONS

B. Sharma, R. R. Frontiera, A.-I. Henry, E. Ringe, R. P. Van Duyne, "SERS: Materials, applications, and the future", Materials Today, 2012, vol. 15, No. 1-2, pp. 16-25.
B. Sharma, P. Bugga, L. R. Madison, A.-I. Henry, M. G. Blaber, N. G. Greeneltch, N. Chiang, M. Mrksich, G. C. Schatz, R. P. Van Duyne, "Bisboronic Acids for Selective, Physiologically Relevant Direct Glucose Sensing with Surface enhanced Raman Spectroscopy", J. Am. Chem. Soc., 2016, vol. 138, pp. 13952-13959.
J. A. Powell, K. Venkatakrishnan, B. Tan, "Programmable SERS active substrates for chemical and biosensing applications using amorphous/crystalline hybrid silicon nanomaterial", Sci. Rep., 2016, vol. 6, No. 19663, pp. 1-13.
F. Sun, H.-C. Hung, A. Sinclair, P. Zhang, T. Bai, D. D. Galvan, P. Jain, B. Li, S. Jiang, Q. Yu, "Hierarchical zwitterionic modification of a SERS substrate enables real-time drug monitoring in blood plasma", Nat. Commun., 2016, vol. 7, No. 13437, pp. 1-9.
P. Dyakonov, K. Mironovich, S. Svyakhovskiy, O. Voloshina, S. Dagesyan, A. Panchishin, N. Suetin, V. Bagratashvili, P. Timashev, E. Shirshin, S. Evlashin, "Carbon nanowalls as a platform for biological SERS studies", Sci. Rep., 2017, vol. 7, No. 13352, pp. 1-7.
R. A. Halvorson, P. J. Vikesland, "Surface enhanced Raman Spectroscopy SERS for Environmental Analyses", Environ. Sci. Technol., 2010, vol. 44, p. 7749-7755.
M. Fl.ischmann, P. J. Hendra, A. J. McQuillan, "Raman spectra of pyridine adsorbed at a silver electrode", Chem. Phys. Lett. 1974, vol. 26, p. 163-166.
D. L. Jeanmaire, R. P. Van Duyne, "Surface raman spectroelectrochemistry: Part I. Heterocyclic, aromatic, and aliphatic amines adsorbed on the anodized silver electrode", J. Electroanal, Chem. Interfacial Electrochem., 1977, vol. 84, p. 1-20.
S. Nie, S. R. Emory, "Probing Single Molecules and Single Nanoparticles by Surface enhanced Raman Scattering", Science. 1997, vol. 275, p. 1102.
K. Kneipp, Y. Wang, H. Kneipp, L. T. Perelman, I. Itzkan, R. R. Dasari, M. S. Feld, "Single Molecule Detection Using Surface enhanced Raman Scattering SERS", Phys. Rev. Lett., 1997, vol. 78, p. 1667-1670.

S.-Y. Ding, J. Yi, J.-F. Li, B. Ren, D.-Y. Wu, R. Panneerselvam, Z.-Q. Tian, "Nanostructure-based plasmon-enhanced Raman spectroscopy for surface analysis of materials", Nat. Rev. Mater., 2016, vol. 1, No. 16021, pp. 1-16.
A. Ahmed, R. Gordon, "Directivity Enhanced Raman Spectroscopy Using Nanoantennas", Nano Lett., 2011, vol. 11, pp. 1800-1803.
D. Radziuk, H. Moehwald, "Prospects for plasmonic hot spots in single molecule SERS towards the chemical imaging of live cells", Phys. Chem. Chem. Phys., 2015, vol. 17, pp. 21072-21093.
L. Dong, X. Yang, C. Zhang, B. Cerjan, L. Zhou, M. L. Tseng, Y. Zhang, A. Alabastri, P. Nordlander, N. J. Halas, "Nanogapped Au Antennas for Ultrasensitive Surface enhanced Infrared Absorption Spectroscopy", Nano Lett., 2017, vol. 17, pp. 5768-5774.
M. Yilmaz, E. Babur, M. Ozdemir, R. L. Gieseking, Y. Dede, U. Tamer, G. C. Schatz, A. Facchetti, H. Usta, G. Demirel, "Nanostructured organic semiconductor films for molecular detection with surface enhanced Raman spectroscopy", Nat. Mater. 2017, vol. 16, p. 918-924.
S. Yang, X. Dai, B. B. Stogin, T.-S. Wong, "Ultrasensitive surface enhanced Raman scattering detection in common fluids", Proc. Natl. Acad. Sci., 2016, vol. 113, No. 2, pp. 268-273.
F. De Angelis, F. Gentile, F. Mecarini, G. Das, M. Moretti, P. Candeloro, M. L. Coluccio, G. Cojoc, A. Accardo, C. Liberale, R. P. Zaccaria, G. Perozziello, L. Tirinato, A. Toma, G. Cuda, R. Cingolani, E. Di Fabrizio, "Breaking the diffusion limit with superhydrophobic delivery of molecules to plasmonic nanofocusing SERS structures", Nat. Photonics., 2011, vol. 5, p. 682-687.
P. Christopher, H. Xin, S. Linic, "Visible-light-enhanced catalytic oxidation reactions on plasmonic silver nanostructures", Nat. Chem., 2011 vol. 3, pp. 467-472.
J. F. Li, X. D. Tian, S. B. Li, J. R. Anema, Z. L. Yang, Y. Ding, Y. F. Wu, Y. M. Zeng, Q. Z. Chen, B. Ren, Z. L. Wang, Z. Q. Tian, "Surface analysis using shell-isolated nanoparticle-enhanced Raman spectroscopy", Nat. Protoc., 2013, vol. 8, No. 1, pp. 52-65.
M. Erol, Y. Han, S. K. Stanley, C. M. Stafford, H. Du, S. Sukhishvili, "SERS Not To Be Taken for Granted in the Presence of Oxygen", J. Am. Chem. Soc., 2009, vol. 131, pp. 7480-7481—Together with Supporting information.
Y. Han, R. Lupitskyy, T.-M. Chou, C. M. Stafford, H. Du, S. Sukhishvili, "Effect of Oxidation on Surface enhanced Raman Scattering Activity of Silver Nanoparticles: A Quantitative Correlation", Anal. Chem., 2011, 2011, vol. 83, pp. 5873-5880.
J.-F. Li, Y.-J. Zhang, S.-Y. Ding, R. Panneerselvam, Z.-Q. Tian, "Core-Shell Nanoparticle-Enhanced Raman Spectroscopy", Chem. Rev., 2017, vol. 1177, pp. 5002-5069.
N. Michieli, R. Pilot, V. Russo, C. Scian, F. Todescato, R. Signorini, S. Agnoli, T. Cesca, R. Bozio, G. Mattei, "Oxidation effects on the SERS response of silver nanoprism arrays", RSC Adv., 2017, vol. 7, pp. 369-378.
Matikainen, T. Nuutinen, T. Itkonen, S. Heinilehto, J. Puustinen, J. Hiltunen, J. Lappalainen, p. Karioja, p. Vahimaa, "Atmospheric oxidation and carbon contamination of silver and its effect on surface enhanced Raman spectroscopy SERS", Sci. Rep., 2016, vol. 6, pp. 37192.
J. F. Li, Y. F. Huang, Y. Ding, Z. L. Yang, S. B. Li, X. S. Zhou, F. R. Fan, W. Zhang, Z. Y. Zhou, D. Y. Wu, B. Ren, Z. L. Wang, Z. Q. Tian, "Shell-isolated nanoparticle-enhanced Raman spectroscopy" Nature, 2010, vol. 464, pp. 392-395.
L. Dendramis, E. W. Schwinn, R. P. Sperline, "A surface enhanced Raman scattering study of CTAB adsorption on copper", Surf. Sci., 1983, vol. 134, pp. 675-688.
R. M. Bakker, D. Permyakov, Y. F. Yu, D. Markovich, R. Paniagua-Dominguez, L. Gonzaga, A. Samusev, Y. Kivshar, B. Luk'yanchuk, A. I. Kuznetsov, "Magnetic and Electric Hotspots with Silicon Nanodimers", Nano Lett., 2015, vol. 15, pp. 2137-2142.
Shalabney, J. George, H. Hiura, J. A. Hutchison, C. Genet, P. Hellwig, T. W. Ebbesen, "Enhanced Raman Scattering from Vibro-Polariton Hybrid States", Angew. Chem. Int. Ed., 2015, vol. 54, pp. 7971-7975.
S. A. Maier, P. G. Kik, H. A. Atwater, S. Meltzer, E. Harel, B. E. Koel, A. A. G. Requicha, "Local detection of electromagnetic energy transport below the diffraction limit in metal nanoparticle plasmon waveguides", Nat. Mater., 2003, vol. 2, pp. 229-232.

(56)         References Cited

OTHER PUBLICATIONS

Q. Zhang, N. Li, J. Goebl, Z. Lu, Y. Yin, "A Systematic Study of the Synthesis of Silver Nanoplates: Is Citrate a "Magic" Reagent?", J. Am. Chem. Soc., 2011, vol. 133, pp. 18931-18939.

U. Hohenester, J. Krenn, "Surface plasmon resonances of single and coupled metallic nanoparticles: A boundary Integral method approach", Phys. Rev. B., 2005, vol. 72, pp. 195429-1-195429-9.

F. J. Garcia de Abajo, A. Howie, "Relativistic Electron Energy Loss and Electron-Induced Photon Emission in Inhomogeneous Dielectrics", Phys. Rev. Lett., 1998, vol. 80, No. 23, pp. 5180-5183.

F. J. Garcia de Abajo, A. Howie, "Retarded field calculation of electron energy loss in inhomogeneous dielectrics", Phys. Rev. B., 2002, vol. 65, pp. 115418-1 ?115418-17.

M. J. Lagos, A. Trugler, U. Hohenester, P. E. Batson, "Mapping vibrational surface and bulk modes in a single nanocube", Nature., 2017, vol. 543, pp. 529-532.

U. Hohenester, A. Trugler, "Interaction of Single Molecules With Metallic Nanoparticles" IEEE J. Sel. Top. Quantum Electron., 2008, vol. 14, pp. 1430-1440.

F. J. Garcia de Abajo, "Optical excitations in electron microscopy" Rev. Mod. Phys., 2010, vol. 82, pp. 209-275.

P. B. Johnson, R. W. Christy, "Optical Constants of the Noble Metals" Phys. Rev. B., 1972, vol. 6, pp. 4370-4379.

G. Saroja, V. Vasu, N. Nagarani, "Optical Studies of Ag2O Thin Film Prepared by Electron Beam Evaporation Method". Open J. Met., 2013, vol. 3, pp. 57-63.

A. Maryott, E. R. Smith, Table of Dielectric Constants of Pure Liquids United States Department of Commerce, 1951, National Bureau of Standard Circular.

Ouyang, Lei ; Ren, Wen ; Zhu, Lihua ; Irudayaraj, Joseph, "Prosperity to challenges : Recent approaches in SERS substrate fabrication", Reviews in Analytical Chemistry. 2017, vol. 36, No. 1, pp. 1?22.

Mosier-Boss PA., "Review of SERS Substrates for Chemical Sensing", Nanomaterials, 2017, vol. 7, No. 142, pp. 1-30.

McNay G, Eustace D, Smith WE, Faulds K, Graham D., "Surface-enhanced Raman scattering SERS and surface-enhanced resonance Raman scattering SERRS: a review of applications", Applied Spectroscopy, 2011, vol. 65, No. 8, pp. 825-837.

Restaino SM, White Im., "A critical review of flexible and porous SERS sensors for analytical chemistry at the point-of-sample", Analytica Chimica Acta, 2019, vol. 1060, pp. 17-29.

Luo SC, Sivashanmugan K, Liao JD, Yao CK, Peng HC, "Nanofabricated SERS-active substrates for single-molecule to virus detection in vitro: a review", Biosens Bioelectron., 2014, vol. 61, pp. 232-240.

Ogundare, S.A., van Zyl, W.E., "A review of cellulose-based substrates for SERS: fundamentals, design principles, applications", Cellulose, 2019, vol. 26, pp. 6489-6528.

Purwidyantri , C.-H. Hsu , C.-M. Yang , B. A. Prabowo , Y.-C. Tiang and C.-S. Lai, "Plasmonic nanomaterial structuring for SERS enhancement", RSC Advances, 2019, vol. 9 , pp. 4982-4992.

Neubrech F, Huck C, Weber K, Pucci A, Giessen H., "Surface-Enhanced Infrared Spectroscopy Using Resonant Nanoantennas", Chem Rev., 2017, VI. 117, pp. 5110-5145.

* cited by examiner g g (a) Transparent sample holder containing the analyte and a suspension of agglomerated nanoparticles with dissolved oxygen removed.
(b) Incident light source (laser).
(c) Detector.
(d) Computer
(e) Fiberoptic cables.

(a) Detection chamber
(b) Incident light source (laser).
(c) Detector.
(d) Computer
(e) Fiberoptic cables.
(f) Sample holder or tip.
(g) Tubing.
(h) Fluid reservoir and pump.

C 100 nm

D 10 nm

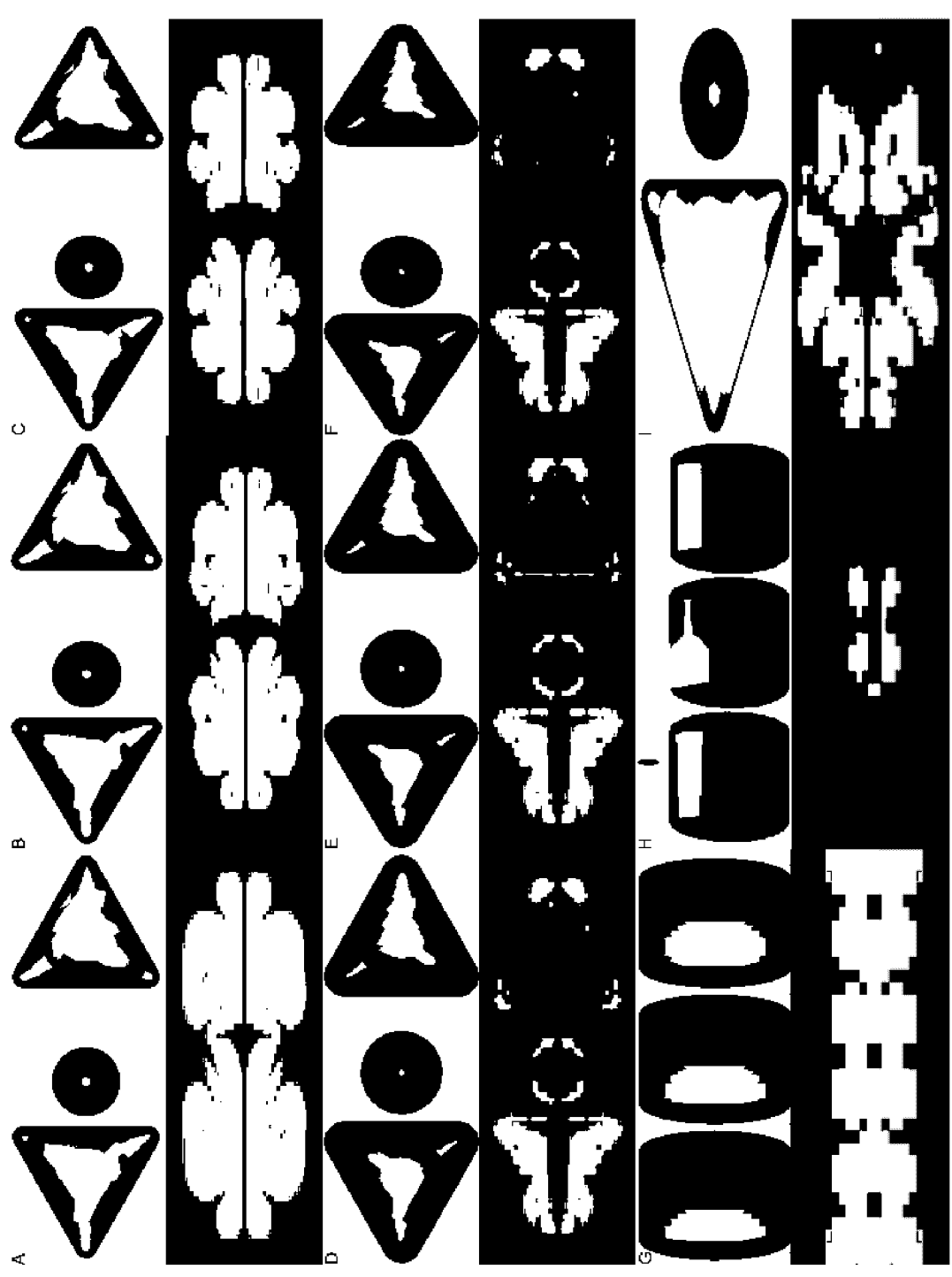
FIG. 7 A to I

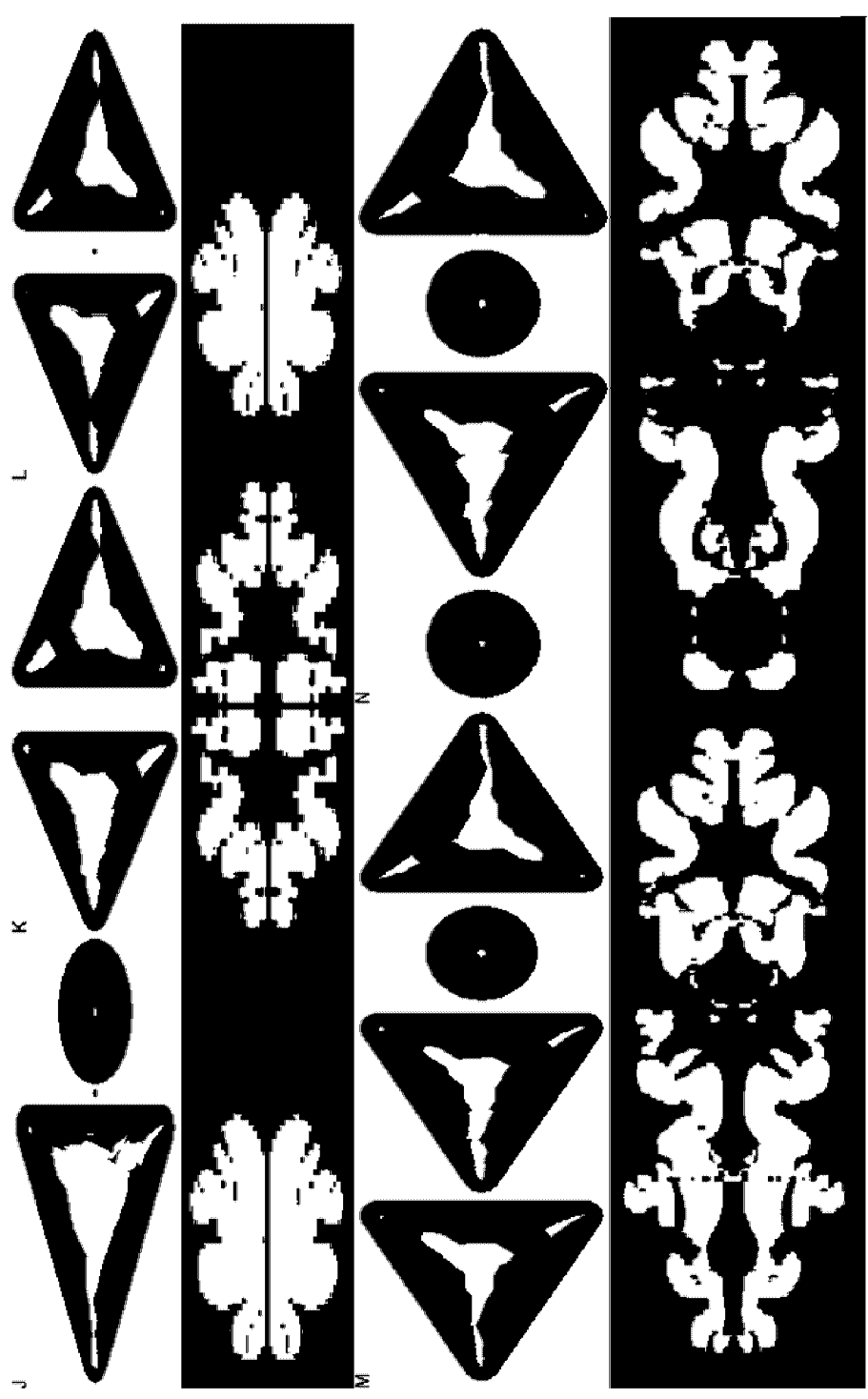
FIG. 7 K to N

METHODS OF MODIFYING A LIQUID SAMPLE CONTAINING AN ANALYTE SO AS TO INCREASE SERS SIGNAL INTENSITY OF THE ANALYTE, AS WELL AS A PROBE FOR REMOTE SENSING OF AN ANALYTE USING SERS

CROSS-REFERENCE TO RELATED APPLICATIONS

This application is a National Entry Application of PCT application no PCT/CA2020/051143 filed on Aug. 21, 2020 and published in English under PCT Article 21(2), which itself claims benefit of U.S. provisional application Ser. No. 62/890,216, filed on Aug. 22, 2019. All documents above are incorporated herein in their entirety by reference.

FIELD OF THE INVENTION

The present invention relates to methods of modifying a liquid sample that is to be analyzed using surface-enhanced Raman spectroscopy (SERS). More specifically, the present invention is concerned with methods of modifying a liquid sample containing an analyte so as to increase SERS signal intensity of the analyte. The present invention also relates to a probe for remote sensing of an analyte using SERS.

BACKGROUND OF THE INVENTION

Raman spectroscopy involves the attenuation or enhancement of the energy of light that is inelastically scattered by molecules through changes in the vibrational energy state of said molecules. Because changes in the energy of the scattered light relative to the incident light correspond to the energy differences between vibrational states of the molecules, the spectrum of inelastically scattered light, that is the Raman spectrum, can be used to identify molecules and the intensity of the inelastically scattered light can be used to quantify the number of said molecules. Inelastic Raman light scattering is weak, and thus requires significant concentrations of analyte molecules to be effective; therefore, this technique has low sensitivity. However, there are methods that can be used to greatly enhance the intensity of inelastically scattered light.

Surface enhanced Raman spectroscopy (SERS) increases the intensity of inelastically scattered light by increasing the probability that light will be scattered inelastically rather than elastically. It accomplishes this by adsorbing the analyte molecules onto a plasmonic material, which is then irradiated by the incident light beam. The precise mechanism through which the enhancement occurs is currently being debated in the scientific community, but it is known that the plasmonic material must be rough at the nanoscale or be comprised of nanostructures, and that the enhancement in signal intensity can be as high as $10^{10}$-$10^{11}$. Notably, the vibrational modes that can be detected by surface enhanced Raman spectroscopy can vary from those of the free molecule; therefore, the Raman spectrum and surface enhanced Raman spectrum can differ for identical molecules.

SERS's sensitivity and reproducibility can be improved by engineering optical hot spots, which are locations on nanostructures exhibiting the strongest electromagnetic field, e.g., nanoprism tips or within nanogaps between neighbouring nanoparticles. Hot spots generate the highest signal amplification for SERS; however, its sensitivity is limited as the analyte molecule must be located simultaneously within a hot spot, in the sampling area of the Raman laser beam, and in the detector field-of-view. This sampling area or volume is normally a negligible fraction of the whole sample volume. Therefore, the detection limit of SM-SERS in practice is at the nM or pM level ($10^{-9}$-$10^{-12}$ M). Although traditional surface enhanced Raman techniques can yield dramatic decreases in the limit of detection for analyte molecules, they do not generally achieve the "single molecule" detection limits that have been optimistically advertised. Recently, this limit was broken by coupling SERS detection with the pre-concentration of analytes using super-hydrophobic or omniphobic surfaces, which increased the detection sensitivity to fM levels.

Substrate surface oxidation can affect SERS detection limits. When silver nanoparticles (AgNPs) or silver films are oxidized by ambient air to form a sub-monolayer of $Ag_2O$, the SERS enhancement factors (EFs) has been reported to decrease by up to $10^5$. This decrease tended to be analyte-dependent and to correlate quantitatively to the thickness of the $Ag_2O$ layer. The $Ag_2O$ layer effect was attributed to a decrease in analyte adsorption and metal-to-analyte electron transfer, compromising both the SERS chemical and electromagnetic enhancements. However, the substrate oxidation effect on SERS EFs was later observed to be less significant, but when combined with atmospheric carbon contamination, the noise level increases with a commensurate decrease in signal intensity. SERS detection can also be achieved using AuNPs coated with a thin layer of silica or alumina, i.e., shell-isolated nanoparticle-enhanced Raman spectroscopy (SHINERS). The success of SHINERS indicates that a thin dielectric oxide layer may not result in a drastic decrease of SERS EFs.

SUMMARY OF THE INVENTION

In accordance with the present invention, there is provided in a first embodiments, a method of modifying a liquid sample containing an analyte so as to increase SERS signal intensity of the analyte, the method comprising the steps of: providing the liquid sample to be analyzed using SERS; and adding an oxygen scavenger to the liquid sample so as to remove dissolved oxygen from the liquid sample.

In a $2^{nd}$ embodiment, there is provided the method according to embodiment 1, wherein the analyte is a thiolated compound, an amine, a pesticide, a persistent organic pollutant, a transition metal complex, a peptide, a protein, a nucleic acid, a polysaccharide, or a hormone.

In a $3^{rd}$ embodiment, there is provided the method according to embodiment 1 or 2, wherein the analyte is a transition metal complex, a peptide, a protein, a nucleic acid, a persistent organic pollutant, a pesticide, or a hormone.

In a $4^{th}$ embodiment, there is provided the method according to any one of embodiments 1 to 3, wherein the analyte is p-aminothiophenol (pATP) or p-nitrothiophenol (pNTP).

In a $5^{th}$ embodiment, there is provided the method according to any one of embodiments 1 to 4, wherein the liquid in the sample is water, or an organic solvent, such as methanol, ethanol, isopropanol, acetone, acetonitrile, diethyl ether, tetrahydrofuran, dichloromethane, chloroform, dimethylformamide, xylene, a hydrocarbon, or mixtures thereof.

In a $6^{th}$ embodiment, there is provided the method according to any one of embodiments 1 to 5, wherein the liquid is water.

In a $7^{th}$ embodiment, there is provided the method according to any one of embodiments 1 to 6, wherein the method further comprises the step of modification of the analyte as needed so that it can interact with a surface of a plasmonic material used for the SERS detection.

In a $8^{th}$ embodiment, there is provided the method according to embodiment 7, wherein the modification of the analyte is done by attaching a thiol group to the analyte, so the analyte will chemisorb, via this thiol, on an Ag or Au plasmonic surface.

In a $9^{th}$ embodiment, there is provided the method according to embodiment 7, wherein the modification of the analyte is done by physisorption through hydrophobic/hydrophilic interactions or van der Waals forces; chemisorption through other binding atoms; indirect detection through chemical reaction with a pre-adsorbed reporter molecule; chelation of metal ions by pre-adsorbed chelating agents; indirect detection through affinity, e.g., antibody-antigen binding of biomolecules; and indirect detection by retention of plasmonic nanoparticles bearing surrogate SERS active reporter molecules by specific interactions with analytes, e.g., antibody-antigen interactions.

In a $10^{th}$ embodiment, there is provided the method according to any one of embodiments 1 to 9, the oxygen scavenger is sodium sulfite, hydrazine, ascorbic acid, or ascorbyl palmitate.

In a $11^{th}$ embodiment, there is provided the method according to any one of embodiments 1 to 10, wherein an excess amount of oxygen scavenger is added.

In a $12^{th}$ embodiment, there is provided the method according to any one of embodiments 1 to 11, wherein enough oxygen scavenger is added to remove at least 98%, 99%, 99.5%, or 99.9% of the DO in the liquid sample, preferably at least 99.5% or 99.9%.

In a $13^{th}$ embodiment, there is provided the method according to any one of embodiments 1 to 12, wherein enough oxygen scavenger is added such that the concentration of remaining DO is at most about 0.020 mM, about 0.010 mM, about 0.005 mM, or about 0.002 mM, preferably at most about 0.005 mM or about 0.002 mM.

In a $14^{th}$ embodiment, there is provided the method according to any one of embodiments 1 to 13, wherein, after the liquid sample is modified, the LOD for a given analyte is decreased by a factor of at least about $10^8$, preferably about $10^9$, or and even up to about $10^{10}$.

In a $15^{th}$ embodiment, there is provided the method according to any one of embodiments 1 to 14, wherein, after the liquid sample is modified, the LOD for the analyte using SERS is improved by a factor of at least about $10^9$ or about $10^{10}$.

In a $16^{th}$ embodiment, there is provided the method according to any one of embodiments 1 to 15, wherein the LOD for the analyte using SERS is at most about 1 pM, about 100 fM, about 10 fM, about 1 fM, about 100 aM, about 10 aM, about 1 aM, about 100 zM, or about 10 zM.

In a $17^{th}$ embodiment, there is provided the method according to any one of embodiments 1 to 16, wherein the LOD for the analyte is at most about 10 zM.

In a $18^{th}$ embodiment, there is provided the method according to any one of embodiments 1 to 17, wherein the method further comprises the step of contacting the liquid sample with a plasmonic material.

In a $19^{th}$ embodiment, there is provided the method according to embodiment 18, wherein at least part of the analyte is or becomes adsorbed onto a surface of the plasmonic material.

In a $20^{th}$ embodiment, there is provided the method according to embodiment 18 or 19, wherein the plasmonic material is a substance that is made of a conductive, semi-conductive, and/or dielectric material, a combination thereof, or a composite material thereof.

In a $21^{st}$ embodiment, there is provided the method according to any one of embodiments 18 to 20, wherein the plasmonic material is gold, silver, copper, or a mixture thereof.

In a $22^{nd}$ embodiment, there is provided the method according to any one of embodiments 18 to 21, wherein the plasmonic material is gold or silver, preferably silver.

In a $23^{rd}$ embodiment, there is provided the method according to any one of embodiments 18 to 22, wherein the plasmonic material has a rough plasmonic surface, is comprised of plasmonic nanoparticles, or both.

In a $24^{th}$ embodiment, there is provided the method according to embodiment 23, wherein the roughness of the rough plasmonic surface is between about 5 nm and about 50 nm, preferably about 10 nm and about 20 nm.

In a $25^{th}$ embodiment, there is provided the method according to embodiment 23 or 24, wherein the roughness of the rough plasmonic surface is at least about 5 nm; at least about 10 nm; or at least about 20 nm; and/or at most about 200 nm; at most about 100 nm; or at most about 50 nm.

In a $26^{th}$ embodiment, there is provided the method according to any one of embodiments 23 to 25, wherein the plasmonic material is comprised of plasmonic nanoparticles.

In a $27^{th}$ embodiment, there is provided the method according to any one of embodiments 23 to 26, wherein the plasmonic nanoparticles include gold, silver, or copper nanoparticles (including silica coated gold, silver, or copper nanoparticles).

In a $28^{th}$ embodiment, there is provided the method according to any one of embodiments 23 to 27, wherein the plasmonic nanoparticles are silver or gold nanoparticles (without coatings), more preferably silver nanoparticles (without coatings).

In a $29^{th}$ embodiment, there is provided the method according to any one of embodiments 23 to 28, wherein the plasmonic nanoparticles are prismoidal, spheroidal (including spherical), platelet-shaped, or rod-shaped.

In a $30^{th}$ embodiment, there is provided the method according to any one of embodiments 23 to 29, wherein the D50 of the diameter of the plasmonic nanoparticles is between about 2 nm to about 500 nm in size.

In a $31^{st}$ embodiment, there is provided the method according to any one of embodiments 23 to 30, wherein the D50 of the diameter of the plasmonic nanoparticles is at least about 2 nm, at least about 10 nm, at least about 25 nm, or at least about 50 nm, and/or at most about 500 nm, at most about 250 nm, at most about 200 nm, at most about 100 nm, at most about 75 nm, or at most about 50 nm in size.

In a $32^{nd}$ embodiment, there is provided the method according to any one of embodiments 23 to 31, wherein the plasmonic nanoparticles are agglomerated so they are in close proximity to (and/or touching) each other.

In a $33^{rd}$ embodiment, there is provided the method according to any one of embodiments 23 to 32, wherein the plasmonic nanoparticles are agglomerated by adding an agglomerant, such as agglomerating molecules (i.e. molecules that can bridge nanoparticles and induce agglomeration) or an electrolyte (e.g., a salt), adjusting the pH, adding an organic solvent such as an alcohol, or combining these approaches.

In a $34^{th}$ embodiment, there is provided the method according to any one of embodiments 23 to 33, wherein the plasmonic nanoparticles are agglomerated through the addition of an agglomerant, such as salts of sulfate or sulfite.

In a $35^{th}$ embodiment, there is provided the method according to embodiment 33 or 34, wherein the agglomerant and the oxygen scavenger are different materials.

In a 36$^{th}$ embodiment, there is provided the method according to embodiment 33 or 34, wherein the agglomerant is the oxygen scavenger, which is preferably a sulfite salt, preferably sodium sulfite.

In a 37$^{th}$ embodiment, there is provided the method according to any one of embodiments 23 to 36, wherein the nanoparticles are agglomerated through the addition of dissolved salts and/or adjustments in pH.

In a 38$^{th}$ embodiment, there is provided the method according to any one of embodiments 32 to 37, wherein the pH of the liquid sample is adjusted to about 4 before agglomeration.

In a 39$^{th}$ embodiment, there is provided the method according to any one of embodiments 32 to 38, wherein the plasmonic nanoparticles are added to the liquid sample before agglomeration of the nanoparticles and before dissolved oxygen removal using an oxygen scavenger.

In a 40$^{th}$ embodiment, there is provided the method according to any one of embodiments 23 to 39, wherein the plasmonic nanoparticles are stabilized by small loosely bound capping molecules, preferably citrate, ethanol, ethylene glycol, and/or polyethylene glycols, more preferably citrate and/or ethanol.

In a 41$^{st}$ embodiment, there is provided the method according to any one of embodiments 23 to 40, wherein a molecule that interacts with specific analytes to produce a distinct signal, for example, a chelating agent for metal ions, is pre-adsorbed to the plasmonic nanoparticles or rough plasmonic surface before contact with the analyte.

In a 42$^{nd}$ embodiment, there is provided the method according to any one of embodiments 1 to 41, wherein the method further comprises the step of measuring the SERS spectrum of the liquid sample.

In a 43$^{rd}$ embodiment, there is provided the method according to embodiment 42, wherein the measuring step involves irradiating the plasmonic material with a light, generally a laser, and detecting the Raman signal scattered by the plasmonic material.

In a 44$^{th}$ embodiment, there is provided a probe for remote sensing of an analyte in a liquid sample using SERS, the probe comprising a detection chamber having a window that is transparent to SERS excitation light and Raman scattered signal, and tubing with a first and a second end, the first end of the tubing being flowably connected to the detection chamber and the second end of the tubing being configured to be placed in contact with a liquid sample, wherein the detection chamber and the tubing between said first and second ends comprise plasmonic nanoparticles bathed in a deoxygenated solvent, wherein the plasmonic nanoparticles are in close proximity to each other, thereby allowing uninterrupted propagation of plasmonic fields from the detection chamber to the second end of the tubing and back, and/or an inner wall of the detection chamber and an inner wall of the tubing between said first and second ends are coated with a plasmonic layer, wherein the plasmonic layer is continuous from the detection chamber to the second end of the tubing, thereby allowing uninterrupted propagation of plasmonic fields from the detection chamber to the second end of the tubing and back, and wherein the tubing and the detection chamber are filled with a deoxygenated solvent; and wherein the deoxygenated solvent comprises an oxygen scavenger that removes dissolved oxygen therefrom.

In a 45$^{th}$ embodiment, there is provided the probe of embodiment 44, wherein the plasmonic nanoparticles are as defined in any one of embodiments 23 to 41 and/or the plasmonic layer is a layer of plasmonic material comprising a rough plasmonic surface as defined in any one of embodiments 23 to 25.

In a 46$^{th}$ embodiment, there is provided the probe of embodiment 44 or 45, wherein the detection chamber and the tubing between said first and second ends comprise plasmonic nanoparticles bathed in a deoxygenated solvent.

In a 47$^{th}$ embodiment, there is provided the probe of any one of embodiments 44 to 46, wherein the plasmonic nanoparticles are agglomerated along the length of the tubing, as defined in any one of embodiments 32 to 39, using any technique defined in any one of embodiments 33 to 39.

In a 48$^{th}$ embodiment, there is provided the probe of any one of embodiments 44 to 47, wherein the solvent is water or an organic solvent, such as methanol, ethanol, isopropanol, acetone, acetonitrile, diethyl ether, tetrahydrofuran, dichloromethane, chloroform, dimethylformamide, xylene, a hydrocarbon, or mixtures thereof.

In a 49$^{th}$ embodiment, there is provided the probe of any one of embodiments 44 to 48, wherein the solvent is water.

In a 50$^{th}$ embodiment, there is provided the probe of any one of embodiments 44 to 49, wherein the oxygen scavenger is as defined in any one of embodiments 1 to 43.

In a 51$^{st}$ embodiment, there is provided the probe of any one of embodiments 44 to 50, wherein the concentration of oxygen scavenger added, as well as the concentration of remaining DO, is as defined in any one of embodiments 1 to 43.

In a 52$^{nd}$ embodiment, there is provided the probe of any one of embodiments 44 to 51, wherein the second end of the tubing is open or closed (preferably it is open).

In a 53$^{rd}$ embodiment, there is provided the probe of any one of embodiments 44 to 52, wherein the inner wall of the tubing is coated with a plasmonic layer and the tubing is filled with deoxygenated solvent.

In a 54$^{th}$ embodiment, there is provided the probe of any one of embodiments 44 to 53, wherein the second end of the tubing is open and the detection chamber and tubing are refilled with deoxygenated solvent (and plasmonic nanoparticles if they are used), for example from a pump or a reservoir, such that the tubing and the detection chamber remain filled with deoxygenated solvent (and plasmonic nanoparticles, if they are used, so that the plasmonic nanoparticles are kept in close proximity with each other).

In a 55$^{th}$ embodiment, there is provided the probe of embodiment 54, wherein the pump or the reservoir is connected to the first end of the tubing directly, or connected to the detection chamber in such a manner that any deoxygenated solvent/plasmonic nanoparticles flowing out of the second end of the tubing is replaced.

In a 56$^{th}$ embodiment, there is provided the probe of any one of embodiments 44 to 55, wherein capillary forces keep deoxygenated solvent (and the plasmonic nanoparticles if they are used) inside the tubing despite the second end of the tubing being open.

In a 57$^{th}$ embodiment, there is provided the probe of any one of embodiments 44 to 56, wherein the second end of the tubing is open and the second end of the tubing is at least partially coated with a plasmonic layer.

In a 58$^{th}$ embodiment, there is provided the probe of any one of embodiments 44 to 57, wherein the second end of the tubing comprises plasmonic nanoparticles and the end wall, the inner wall toward the second end of tubing, and the outer wall toward the second end are coated with a plasmonic layer.

In a 59$^{th}$ embodiment, there is provided the probe of any one of embodiments 44 to 58, wherein the inner wall of the tubing is coated with a plasmonic layer, and the plasmonic layer also covers the end wall and the outer wall toward the second end of tubing.

In a 60th embodiment, there is provided the probe of any one of embodiments 44 to 59, wherein the second end of the tubing is also capped with a plasmonic layer.

In a 61st embodiment, there is provided the probe of any one of embodiments 44 to 60, wherein the tubing is made of metal, quartz, glass, or a polymer plastic, such as polyethylene, polypropylene, polystyrene, polyetheretherketone, polyvinyl chloride, polytetrafluoroethylene, or polydimethylsiloxane.

In a 62nd embodiment, there is provided the probe of any one of embodiments 44 to 61, wherein the tubing is polyetheretherketone (PEEK) polymer tubing, or glass capillary tubing.

In a 63rd embodiment, there is provided the probe of any one of embodiments 44 to 62, wherein the inner diameter of the tubing is between about 0.08 mm and about 1 cm, preferably between about 0.3 mm and about 0.5 mm.

In a 64th embodiment, there is provided the probe of any one of embodiments 44 to 63, wherein the inner diameter of the tubing is at least about 0.08 mm; at least about 0.1 mm; at least about 0.2 mm; or at least about 0.3 mm; and/or at most about 1 cm; at most about 5 mm; at most about 2 mm; at most about 1 mm; at most about 0.75 mm; or at most about 0.5 mm.

In a 65th embodiment, there is provided the probe of any one of embodiments 44 to 64, wherein the inner diameter of the tubing is about 0.3 mm or about 0.5 mm.

In a 66th embodiment, there is provided the probe of any one of embodiments 44 to 65, wherein the length of the tubing is at least about 5 cm; at least about 10 cm; at least about 20 cm; at least about 50 cm; or at least about 75 cm; and/or at most about 50 m; at most about 20 m; at most about 10 m; at most about 5 m; at most about 2 m; or at most about 1 m.

In a 67th embodiment, there is provided the probe of any one of embodiments 44 to 66, wherein the length of the tubing is about 1 m or about 2 m.

In a 68th embodiment, there is provided the probe of any one of embodiments 44 to 67, wherein the cross-section of the tubing is circular, oval, or rectangular.

In a 69th embodiment, there is provided the probe of any one of embodiments 44 to 68, wherein "close proximity" means a distance of at most about 15 nm, preferably a distance of at most about 10 nm, most preferably a distance of at most about 5 nm apart (between plasmonic nanoparticles, between plasmonic nanoparticles and a plasmonic layer, or between either of those and an analyte).

In a 70th embodiment, there is provided the probe of any one of embodiments 44 to 69, wherein the density of the plasmonic nanoparticles varies along the length of the tubing.

In a 71st embodiment, there is provided the probe of any one of embodiments 44 to 70, wherein the detection chamber and the first end of the tubing are flowably connected to each other through an aperture defined by the detection chamber.

In a 72nd embodiment, there is provided the probe of any one of embodiments 44 to 71, wherein the detection chamber is made of glass, plastic, or quartz, more preferably glass or quartz.

In a 73rd embodiment, there is provided the probe of any one of embodiments 44 to 72, wherein the analyte contained in the liquid is placed in contact with a plasmonic material as defined in any one of embodiments 18 to 41 contained in the probe (for example, a plasmonic layer completely covering the second end, in the case of a closed second end; or a plasmonic layer coating the second end or plasmonic nanoparticles bathed in the deoxygenated solvent, in a case of an open second end).

In a 74th embodiment, there is provided the probe of any one of embodiments 44 to 73, wherein the liquid sample is placed in contact with, preferably adsorbed onto, a plasmonic material, as defined in any one of embodiments 18 to 41.

In a 75th embodiment, there is provided the probe of any one of embodiments 44 to 74, wherein the liquid sample has been deoxygenated, preferably using an oxygen scavenger as defined in any one of embodiments 1 to 43.

In a 76th embodiment, there is provided the probe of any one of embodiments 44 to 75, wherein the amount of oxygen scavenger, as well as the remaining DO concentration in the liquid sample, is as defined in any one of embodiments 1 to 43.

In a 77th embodiment, there is provided the probe of any one of embodiments 44 to 76, wherein the liquid sample is a liquid sample as defined in any one of embodiments 1 to 43.

In a 78th embodiment, there is provided the probe of any one of embodiments 44 to 77, wherein the liquid sample has been modified using the method as defined in any one of embodiments 1 to 43.

In a 79th embodiment, there is provided the probe of any one of embodiments 44 to 78, wherein the analyte becomes adsorbed to a surface of a plasmonic material, which can be the surface of the nanoparticles in the tubing, a plasmonic layer coated on the second end of the tubing, and/or a plasmonic layer capping the second end of the tubing In a 80th embodiment, there is provided the probe of any one of embodiments 44 to 79, wherein the analyte is in a deoxygenated liquid sample produced according to the method defined in any one of embodiments 1 to 43 and containing agglomerated plasmonic nanoparticles or a rough plasmonic surface as defined in any one of embodiments 23 to 41, either of which comes into contact with the nanoparticles in the tubing; a plasmonic layer coated on the second end of the tubing; and/or a plasmonic layer capping the second end of the tubing.

In a 81st embodiment, there is provided the probe of any one of embodiments 44 to 80, wherein a molecule that interacts with specific analytes to produce a distinct signal, for example, a chelating agent for metal ions or an antibody, peptide, or aptamer that interacts with biomolecules, is pre-adsorbed onto the plasmonic nanoparticles in the tubing, the plasmonic nanoparticles in the liquid sample, a plasmonic layer coated on the second end of the tubing, and/or a plasmonic layer capping the second end of the tubing.

In a 82nd embodiment, there is provided the probe of any one of embodiments 44 to 81, wherein the probe is configured to work with a surface enhanced Raman spectrometer for remote sensing that can be used to detect analyte by applying incident laser irradiation to the sample holder or detection chamber and measuring scattered light using a detector.

In a 83rd embodiment, there is provided the probe of embodiment 82, wherein the backscattered light, that is, light scattered 180° relative to the incident light is detected.

In a 84th embodiment, there is provided the method according to any one of embodiments 1 to 43, wherein the measuring step is performed using the probe as defined in any one of embodiments 44 to 83.

In a 85$^{th}$ embodiment, there is provided the method according to any one of embodiments 1 to 43, wherein the SERS system is as defined in any one of embodiments 44 to 83.

BRIEF DESCRIPTION OF THE DRAWINGS

In the appended drawings:

FIG. 4 shows micrographs of A) an individual, B) and C) aggregates of, and D) nanogaps between silver nanoparticles.

FIG. 5 B) shows the photocurrent generated through NIR ($\lambda$=785 nm) irradiation 1 cm away from the electrode surface in the presence and absence of dissolved oxygen at constant ionic strength.

FIG. 7 shows surface plasmon coupling within and between silver nanoparticle aggregates. The charge distributions (above) and electric field (below) are presented for irradiated A-C) silver nanoparticle and D-F) silver oxide (2 nm thick) coated silver nanoparticle aggregates as a function of distance between the rightmost nanoprism and the rest of the aggregate under anaerobic (deoxygenated) conditions. The distances in question are A) 10, B) 13, C) 17, D) 8, E) 9.8, and F) 17 nm. FIG. 7 also shows electromagnetic field transmission through silver nanorods in G) the absence and H) presence of dissolved oxygen, the silver nanorods having diameters and lengths of 4 and 50 nm, respectively. FIG. 7 also shows the electromagnetic field transmission through dimers consisting of I-J) a nanoprism and nanosphere and K-L) two nanoprisms in I) and K) the absence and J) and L) presence of dissolved oxygen. Moreover, FIG. 7 shows the electromagnetic field transmission among nanoparticle tetrads consisting of M) three nanoprisms and a nanosphere and N) two nanoprisms and two nanospheres in the absence of dissolved oxygen.

FIG. 8 shows the surface enhanced Raman spectra of 1 fM of A) p-aminothiophenol and B) p-nitrothiophenol with and without dissolved oxygen removal (blanks contain Na$_2$SO$_3$).

FIGS. 9 D) and E) show surface enhanced Raman spectra of varying concentrations of p-aminothiophenol with dissolved oxygen removal. Moreover, FIG. 9 shows the intensity of the F) C-H and G) C-S stretching modes as a logarithm of the concentration.

FIG. 11 shows the surface enhanced Raman spectra of thiolated oligonucleotide sequences in A) the presence (10 pM) and B) absence (8 zM) of dissolved oxygen.

FIG. 14 shows the relative surface enhanced Raman spectra and signal intensities as a function of dissolved oxygen concentration when oxygen is removed by A) and B) the addition of Na$_2$SO$_3$ and C) and D) argon sparging.

FIG. 15 shows cyclic voltammograms of A) Ag$_2$NO$_3$ and silver nanoparticles with adsorbed p-aminothiophenol in the B) presence and C) absence of dissolved oxygen.

FIG. 18 shows surface enhanced Raman spectra of A) p-aminothiophenol and B) p-nitrothiophenol transmitted from silver mirrors through silver nanoparticles and measured 10 cm away from the incident laser and detector field-of-view. FIG. 18 also shows surface enhanced Raman C) spectra and D) C-S stretching band intensity of p-aminothiophenol adsorbed to a silver mirror and transmitted through silica-coated silver nanoparticles as a function of distance.

FIG. 19 shows surface enhanced Raman spectra measured using a glass capillary prefilled with deoxygenated and aggregated pristine silver nanoparticles (incident laser 6 cm from the inserted end of the capillary). FIG. 19 shows the spectra of A) p-aminothiophenol and B) p-nitrothiophenol as a function of integration time.

FIG. 20 shows A) a schematic of remote sensing of analyte at the distal end of a 1 m long PEEK capillary tube using a probe of the present invention. In addition, FIG. 20 shows detection of B) p-aminothiophenol and C) p-nitrothiophenol from the configuration given in A).

DETAILED DESCRIPTION OF THE INVENTION

Figure 1A:
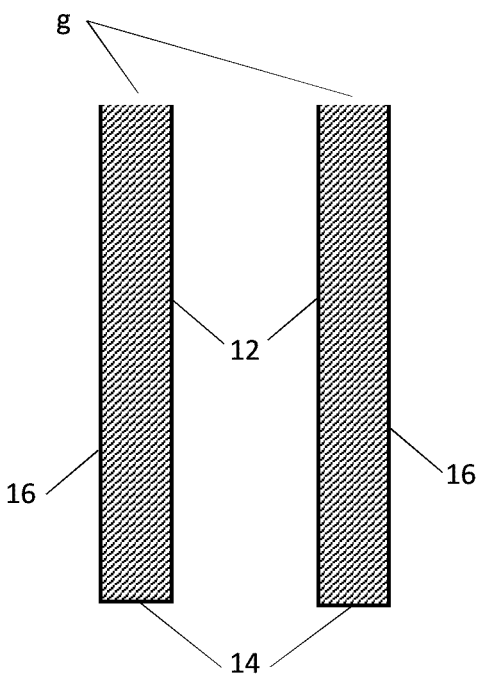
FIG. 1A is a longitudinal sectional view of the second end of tubing g according to an embodiment of the probe of the invention.

There is provided a method of modifying a liquid sample containing an analyte so as to increase SERS signal intensity of the analyte in said sample, as well as a probe for remote sensing of an analyte in a liquid sample using SERS.

The present inventors discovered that dissolved oxygen (DO) in liquid samples is a major factor limiting the propagation of the plasmonic field throughout liquid samples, thereby limiting SERS sensitivity. Specifically, the inventors discovered that by removing DO using chemical oxygen scavengers, increased SERS sensitivity can be achieved, e.g., reaching zM level analyte detection in water. Importantly, such good results cannot be obtained by other methods of removing oxygen, e.g. sparging with an oxygen-free gas, which do not achieve sufficient DO removal. Furthermore, when using oxygen scavengers, the inventors detected analyte outside of the field-of-view of the detector, indicating a completely unexpected long-distance signal propagation along the plasmonic material, which allows for remote sensing of an analyte, e.g. using a probe as described herein.
Method of Modifying a Liquid Sample In a first aspect of the invention, a method of modifying a liquid sample containing an analyte so as to increase SERS signal intensity of the analyte is provided. The method of the present invention comprises the steps of:

(a) providing the liquid sample to be analyzed using SERS; and (b) adding an oxygen scavenger to the liquid sample so as to remove dissolved oxygen from the liquid sample.
Liquid Sample The analyte used in the sample can be any analyte that is typically measured using SERS, that is molecules and ions comprising two or more atoms, organic or inorganic. It is also known that, with SERS, single atom ions can be detected indirectly, e.g., through the formation of a vibrationally active complex. In such cases, the studied substance is technically one atom, but the analyte detected by SERS (i.e. the vibrationally active complex) is polyatomic. In embodiments, the analyte is a thiolated compound, an amine, a pesticide, a persistent organic pollutant, a transition metal complex, a peptide, a protein, a nucleic acid, a polysaccharide, or a hormone. In preferred embodiments, the analyte is a transition metal complex, a peptide, a protein, a nucleic acid, a persistent organic pollutant, a pesticide, or a hormone. As an example, the analyte can be p-aminothiophenol (pATP) or p-nitrothiophenol (pNTP).

The liquid in the sample is preferably water, or an organic solvent, such as methanol, ethanol, isopropanol, acetone, acetonitrile, diethyl ether, tetrahydrofuran, dichloromethane, chloroform, dimethylformamide, xylene, a hydrocarbon, or mixtures thereof. In preferred embodiments, the liquid is water.

In embodiments, the method of the invention further comprises the step of modification of the analyte as needed so that it can interact with the surface of the plasmonic material used for the SERS detection. Such modifications are very well-known to the person skilled in the art of SERS spectroscopy. A common technique is to attach a thiol group to the analyte, so the analyte will chemisorb, via this thiol, on an Ag or Au plasmonic surface. Other techniques include physisorption through hydrophobic/hydrophilic interactions or van der Waals forces; chemisorption through other binding atoms; indirect detection through chemical reaction with a pre-adsorbed reporter molecule; chelation of metal ions by pre-adsorbed chelating agents; indirect detection through affinity, e.g., antibody-antigen binding of biomolecules; and indirect detection by retention of plasmonic nanoparticles bearing surrogate SERS active reporter molecules by specific interactions with analytes, e.g., antibody-antigen interactions.

The liquid sample that is to be modified using the method of the present invention is to be analyzed using SERS. As the method of the present invention is intended to increase SERS signal intensity of the analyte in the liquid sample, the liquid sample contains an analyte to be analyzed. It is to be understood that if the liquid sample contains no analyte (for example, it is a blank), then naturally the desired increase in SERS signal intensity will not occur.
Oxygen Scavenger As mentioned previously, the inventors discovered that by removing DO using chemical oxygen scavengers, SERS sensitivity can be increased. Accordingly, the oxygen scavenger can be any oxygen scavenger known in the art to reduce DO in liquids. In embodiments, the oxygen scavenger is sodium sulfite, hydrazine, ascorbic acid, or ascorbyl palmitate.

It is preferable that as much dissolved oxygen be removed from the liquid sample as possible. Accordingly, it is preferable to add an excess amount of the oxygen scavenger, in order to ensure that as much DO is removed as possible. In embodiments, enough oxygen scavenger is added to remove at least 98%, 99%, 99.5%, or 99.9% of the DO in the liquid sample, preferably at least 99.5% or 99.9%. In embodiments, enough oxygen scavenger is added such that the concentration of remaining DO is at most about 0.020 mM, about 0.010 mM, about 0.005 mM, or about 0.002 mM, preferably at most about 0.005 mM or about 0.002 mM.

Further Optional Steps

As noted above, the liquid sample is to be analyzed using SERS. This spectroscopic technique relies on localized surface plasmon resonance (LSPR). LSPR occurs when the oscillation of free conduction electrons of a plasmonic material is resonant with an incident light (typically a laser). Both the position and the intensity of LSPR bands are dependent on the plasmonic material characteristics and they are further highly sensitive to dielectric properties of the surrounding medium. In particular, the position and the intensity of LSPR bands change when various moieties are attached on (or come in close proximity to) the plasmonic material. Indeed, when light is incident on a plasmonic material, the electromagnetic fields are locally amplified (due to the excitation of a localized surface plasmon), thereby creating what are known as "hot spots", where such field enhancements are higher. When analyte molecules are brought into contact with (or close to) the plasmonic material (e.g. adsorbed onto the surface thereof), the molecules interact with these hot spots, which results in changes in the resonance conditions of the surface plasmon waves. These changes in resonance conditions result in the SERS signal that can be measured by the SERS spectrometer detector, allowing for the analyte to be detected and quantified.

Contacting the Liquid Sample with a Plasmonic Material

As the liquid sample is to be analyzed using SERS, in embodiments, the method further comprises the step of contacting the liquid sample as modified above (or to be modified as above) with a plasmonic material (also known as a SERS substrate). This is done so the analyte can be in close proximity with a surface of the plasmonic material (so it can interact with the amplified electric field generated by the plasmonic material upon irradiation with a SERS laser, thus benefiting from the SERS enhancement factor that is inherent to the SERS technique). Various ways to boost this SERS enhancement factor (and thus the measured signal) are very well known to the skilled person.

In embodiments, at least part of the analyte is (or becomes) adsorbed onto a surface of the plasmonic material. As noted above, a common technique to achieve this is to allow the chemisorption of the analyte onto the plasmonic material, e.g. the chemisorption of an analyte bearing a thiol group onto an Ag or Au plasmonic surface.

By modifying the liquid sample by the method of the present invention, the limit of detection (LOD) for the analyte is unexpectedly vastly decreased compared to unmodified liquid samples. In embodiments, the LOD for a given analyte/plasmonic material is typically decreased by a factor of at least about $10^8$, preferably about $10^9$, or and even up to about $10^{10}$. In preferred embodiments, with the method of the present invention, the LOD for the analyte using SERS is improved by a factor of at least about $10^9$ or about $10^{10}$. In embodiments, the LOD for the analyte using SERS is thus at most about 1 pM, about 100 fM, about 10 fM, about 1 fM, about 100 aM, about 10 aM, about 1 aM, about 100 zM, or about 10 zM. In preferred embodiments, the LOD for the analyte is at most about 10 zM. Of course, the exact LOD of the modified liquid sample will depend on the plasmonic material and the analyte used as noted above.

Based on the experimental results discussed below, oxygen removal yields effective coupling of the SERS field and this plasmonic coupling enables the propagation of the electromagnetic (EM) field throughout the sample volume without significant signal energy loss (i.e. with limited quenching). The plasmonic field generated upon photoexcitation of plasmonic material transports throughout the sample to reach the plasmonic material with the analyte placed in contact or close proximity therewith and back, thus returning the Raman scattering signal of the analyte to the detector. It has herein been found that, without DO removal, the high electron affinity of oxygen traps electrons and prevents the effective generation, coupling, propagation, and integration of the SERS field along the plasmonic material, which was observed experimentally and through computational modelling as described below. Conversely, DO removal enables plasmonic coupling and SERS field transport. This is what causes the increased SERS signal intensity of the analyte.

Conventionally, molecular oxygen suspended in the nanogaps or adsorbed on plasmonic material surfaces yields charge redistribution and quenches the plasmonic field and coupling. However, as shown in the experiments below, this is avoided in by using the method of the invention. Even with $Ag_2O$-coated nanoparticles, for which the plasmonic field was somewhat reduced when compared to uncoated silver nanoparticles; the introduction of DO markedly quenched the EM field and prevented coupling. In the experiments below that used plasmonic nanoparticles, the DO quenching effect was independent of representative parameters characteristic to nanogaps, including the distances of the nanogaps, the number of the nanoparticles in the nano-aggregate (2, 3, and 4 nanoparticles), and the characteristics (size, shape, position, orientation, and surface chemistry) of the plasmonic nanoparticles. This modelling showed that DO quenches the SERS EM field, while its absence allows the EM field to propagate throughout the sample via neighbouring plasmonic nanostructures and their aggregates through plasmonic coupling.

As described above, the conventional understanding of SERS is based on signal amplification with individual nanostructures or the plasmonic field coupling of adjacent nanoparticles, i.e., in nanogaps—this it the "hot spot" theory. However, it was demonstrated in the present experiments (see below) that large-scale plasmonic field coupling (or integrated surface-plasmon resonance) is possible upon DO removal with an oxygen scavenger. This integrated field enables effective transport of the SERS signal of a single molecule that is placed in close proximity or in contact with (preferably adsorbed on) any individual plasmonic material (e.g. plasmonic nanoparticle) throughout the whole liquid sample, e.g., every nanoparticle becomes SERS active and can either act as a "hot spot" for an adsorbed analyte or transport the SERS signal, resulting in real single molecule detection.

The signal enhancement due to oxygen removal in the method of the invention has been observed (see the examples below) for a variety of plasmonic materials, including silver nanoparticles and even silica coated plasmonic nanoparticles, such as AgNPs, i.e., the SHINERS technique, where the LOD has been observed to decrease from 500 nM to 50 aM ($10^{10}$ times). It should be mentioned that although the overall sensitivity of silica coated plasmonic nanoparticles is generally lower than naked (uncoated) plasmonic nanoparticles ($10^4$ times lower when comparing silica coated AgNPs, with uncoated AgNPs), DO, rather than a surface oxide layer, appears to be the main factor quenching the SERS signal, i.e., the relative signal enhancement upon DO removal is always $10^9$-$10^{10}$ times although absolute sensitivities are particle dependent. As an example, by using AuNRs (gold nanorods) and silica coated AgNPs the effects of DO from that of surface oxidation were decoupled.

Therefore, in the method of the invention, the plasmonic material can be any plasmonic material used for SERS. Such materials are well-known to the skilled person and extensively described in the scientific literature. As is well-known by the skilled person, a plasmonic material for SERS is made of a substance that can exhibit localized surface plasmon resonance when irradiated with a SERS laser. Such substances may be conductive, semi-conductive, and/or dielectric materials, combinations thereof, or composite materials thereof. Non-limiting examples of preferred substances that can exhibit localized surface plasmon resonance when irradiated with a SERS laser include gold, silver, and copper, as well as such substances with their surface covered by various thin dielectric oxide layers including, for example, a thin layer of silica or alumina as reported in the prior art. Preferred plasmonic materials are gold, silver, and copper, preferably gold and silver, and more preferably silver.

Furthermore, it is also well known that the plasmonic material either has a rough surface (herein referred to as "rough plasmonic surface") or is comprised of nanoparticles (herein referred to as "plasmonic nanoparticles"), or combinations thereof. In preferred embodiments, the plasmonic material is plasmonic nanoparticles.

For clarity, when referring to a "rough plasmonic surface", the degree of roughness should be sufficient to produce the desired localized surface plasmon resonance. The skilled person would understand the meaning of the expression "rough plasmonic surface" in the SERS context. For clarity, in embodiments, the roughness (Ra) of the rough plasmonic surface is between about 5 nm and about 50 nm, preferably about 10 nm and about 20 nm. In embodiments, the roughness of the plasmonic surface is at least about 5 nm; at least about 10 nm; or at least about 20 nm; and/or at most about 200 nm; at most about 100 nm; or at most about 50 nm. For clarity, a rough plasmonic surface does not necessarily need to be subjected to a separate "roughening" step; the surface as prepared may already possess the above-defined roughness.

The skilled person would understand that, while the above roughness parameter is relevant for rough plasmonic surfaces, other plasmonic materials, such as plasmonic nanoparticles, may comprise areas of high curvature, like edges and vertices, where electromagnetic fields are generally the highest.

Common examples of plasmonic nanoparticles include gold, silver, or copper nanoparticles (including silica coated gold, silver, or copper nanoparticles). In preferred embodiments, the plasmonic nanoparticles are silver or gold nanoparticles (without coatings), more preferably silver nanoparticles (without coatings).

As is well known to the skilled person, plasmonic nanoparticles can be of a variety of (nano)-shapes, sizes, morphologies, and size distributions. In particular, the size and shape of the nanoparticles can be tailored to boost the SERS enhancement factor for a given analyte. In preferred embodiments, the plasmonic nanoparticles are prismoidal, spheroidal (including spherical), platelet-shaped, or rod-shaped. In embodiments, the D50 of the diameter of the plasmonic nanoparticles is between about 2 nm to about 500 nm in size. In embodiments, the D50 of the diameter of the plasmonic nanoparticles is at least about 2 nm, at least about 10 nm, at least about 25 nm, or at least about 50 nm, and/or at most about 500 nm, at most about 250 nm, at most about 200 nm, at most about 100 nm, at most about 75 nm, or at most about 50 nm in size.

In preferred embodiments of the method of the invention, the plasmonic nanoparticles are agglomerated so they are in close proximity to (and/or touching) each other. Indeed, it has been shown in the examples below that, coupled with the use of an oxygen scavenger, this allows long-distance signal propagation along the plasmonic material, which, in turns, allows for remote sensing of an analyte. The plasmonic nanoparticles can be agglomerated using any known technique in the art. It is well known to the skilled person that there are many approaches to agglomerate nanoparticles, including by adding an agglomerant, such as agglomerating molecules (i.e. molecules that can bridge nanoparticles and induce agglomeration) or an electrolyte (e.g., a salt), adjusting the pH, adding an organic solvent such as an alcohol, or combining these approaches. In preferred embodiments of the invention, the nanoparticles are agglomerated through the addition of dissolved salts and/or adjustments in pH.

In embodiments, the plasmonic nanoparticles are agglomerated through the addition of an agglomerant, such as salts of sulfate or sulfite. In embodiments, the agglomerant and the oxygen scavenger are different materials. In embodiments, the agglomerant is the oxygen scavenger, which is preferably a sulfite salt, preferably sodium sulfite. In some embodiments, the pH of the liquid sample is adjusted to about 4 before agglomeration. For example, $SiO_2$-coated AgNPs can be pH adjusted to a pH of about 4 before they are agglomerated by the addition of a sulfite or sulfate salt.

In addition, in preferred embodiments, the plasmonic nanoparticles can be stabilized by small loosely bound capping molecules, preferably citrate, ethanol, ethylene glycol, and/or polyethylene glycols, more preferably citrate and/or ethanol. Such capping molecules can act as reducing and structure directing agents, meaning they can determine particle shape, during synthesis, and stabilize the formed nanoparticles afterward. Such capping molecules (capping ligands) can also improve the optical properties of plasmonic materials (which function as a SERS substrate) while being easily displaceable by thiolated analytes.

In preferred embodiments, the plasmonic nanoparticles are added to the liquid sample before agglomeration of the nanoparticles and before dissolved oxygen removal using an oxygen scavenger.

In embodiments, a molecule that interacts with specific analytes to produce a distinct signal, for example, a chelating agent for metal ions, may be pre-adsorbed to the plasmonic nanoparticles or rough plasmonic surface before contact with the analyte.

Measuring the SERS Spectrum

Once the liquid sample has been modified according to the method defined above and then contacted with a plasmonic material, the method of the present invention can further comprise the step of measuring the SERS spectrum of the liquid sample.

This step can be performed using any known SERS technique in the art, using any SERS system known in the art. Typically, this step involves irradiating the plasmonic material with a light, generally a laser, and detecting the Raman signal scattered by the plasmonic material.

In preferred embodiments, the measuring step is performed using the probe of the present invention, which is defined in the subsequent section.

In preferred embodiments of the present invention, the SERS system is as defined in the next section.

Probe for Remote Sensing Using SERS

In a second aspect of the invention, a probe for remote sensing of an analyte in a liquid sample using SERS is provided. The probe of the present invention comprises:

a detection chamber having a window that is transparent to SERS excitation light and Raman scattered signal, and tubing with a first and a second end, the first end of the tubing being flowably connected to the detection chamber and the second end of the tubing being configured to be placed in contact with a liquid sample, wherein:

the detection chamber and the tubing between said first and second ends comprise plasmonic nanoparticles bathed in a deoxygenated solvent, wherein the plasmonic nanoparticles are in close proximity to each other, thereby allowing uninterrupted propagation of plasmonic fields from the detection chamber to the second end of the tubing and back, and/or an inner wall of the detection chamber and an inner wall of the tubing between said first and second ends are coated with a plasmonic layer, wherein the plasmonic layer is continuous from the detection chamber to the second end of the tubing, thereby allowing uninterrupted propagation of plasmonic fields from the detection chamber to the second end of the tubing and back, and wherein the tubing and the detection chamber are filled with a deoxygenated solvent; and wherein the deoxygenated solvent comprises an oxygen scavenger that removes dissolved oxygen therefrom.

A plasmonic layer is a layer of plasmonic material comprising a rough plasmonic surface. In this section, the plasmonic materials (including plasmonic nanoparticles and rough plasmonic surface) are as described in the previous section (e.g. materials, roughness, shapes, etc. are the same).

During use of the probe, a SERS excitation light will enter the detection chamber through the transparent window. This SERS excitation light will shine on the nanoparticles behind the window in the detection chamber, thus creating a plasmonic field. Since the plasmonic nanoparticles are in close proximity to each other (or the plasmonic layer is continuous) all along the probe (tubing and detection chamber) and since they are in a deoxygenated solvent comprising an oxygen scavenger, this plasmonic field will be propagated in an uninterrupted manner from the detection chamber to the second end of the tubing. There, the plasmonic field will interact with the analyte creating a signal plasmonic field that will propagate back along the tubing towards the detection chamber. Finally, the signal plasmonic field will exit the detection chamber through the transparent window and eventually be detected by a light detector.

As mentioned, the probe of the present invention is for remote sensing using SERS. Specifically, by placing the second end of the tubing in contact with the liquid sample, a SERS spectrum of the sample can be obtained despite the fact that the sample is at a certain distance (i.e. the length of the tubing) from the spectrometer. This allows for the measuring of spectra of samples without having to bring the sample close to the spectrometer, and it also allows for the measuring of samples in spaces that are otherwise too small for a spectrometer (as only the tubing needs to enter the space where the liquid sample is being held).

The size and length of the probe will depend on the dimensions of the tubing and the detection chamber, which are defined in more detail below. For example, the use of longer and narrower tubing will naturally result in a longer and narrower probe. However, the skilled person would understand that the dimensions of the probe can be selected and adjusted depending on the desired use of the probe. For example, if the probe is intended to be used to measure a liquid sample contained in a nuclear reactor, the tubing (and therefore the probe) will be dimensioned so that the liquid sample within the nuclear reactor can be safely reached and measured.

In preferred embodiments, the detection chamber and the tubing between said first and second ends comprise plasmonic nanoparticles bathed in a deoxygenated solvent. In embodiments, the plasmonic nanoparticles are agglomerated along the length of the tubing, as defined in the previous section, using any technique discussed in the previous section.

The deoxygenated solvent used can be any solvent known in the art. In embodiments, the solvent is water or an organic solvent, such as methanol, ethanol, isopropanol, acetone, acetonitrile, diethyl ether, tetrahydrofuran, dichloromethane, chloroform, dimethylformamide, xylene, a hydrocarbon, or mixtures thereof. In preferred embodiments, the solvent is water. As mentioned previously, the solvent is deoxygenated, and the solvent comprises an oxygen scavenger that removes dissolved oxygen therefrom, meaning its dissolved oxygen has been removed using an oxygen scavenger. The oxygen scavenger is as defined in the previous section. In addition, the concentration of oxygen scavenger added, as well as the concentration of remaining DO, is as defined in the previous section.

As mentioned in the previous section, the removal of the dissolved oxygen yields effective coupling of the SERS field and this plasmonic coupling enables the propagation of the electromagnetic field without significant signal energy loss. Accordingly, by using a deoxygenated solvent, the electromagnetic field is propagated along the length of the tubing.

Tubing

The tubing of the probe of the present invention allows the propagation of plasmonic fields from the detection chamber to the second end of the tubing and back. The signal plasmonic field can be generated at the second end in a variety of ways. One example is if the analyte contained in the liquid sample is brought into contact with (preferably adhered to) a plasmonic material, such as the nanoparticles bathed in the deoxygenated solvent, at the second end of the tubing. Another example is if the liquid sample is itself generating a plasmonic field (for example, if the liquid sample has been modified using the method defined above and contains aggregated plasmonic nanoparticles). The latter example would mean that both the liquid sample and the deoxygenated solvent contained in the tubing have been deoxygenated using oxygen scavengers.

FIG. 1A is a longitudinal sectional view of the second end of tubing (g) according to an embodiment of the probe of the invention. In this figure the inner wall (12) and the outer wall (16) of tubing g are identified along with the end wall (14) of that end of the tubing g.

Figure 1B:
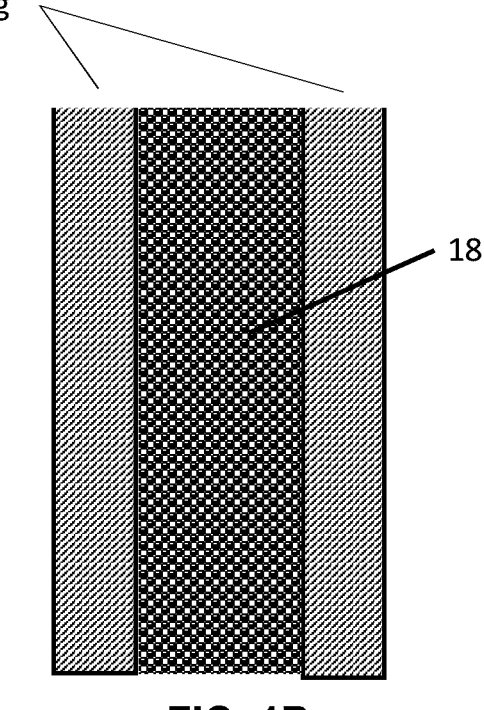
FIG. 1B is a longitudinal sectional view of the second end of tubing g comprising plasmonic nanoparticles according to an embodiment of the probe of the invention.
Figure 1C:
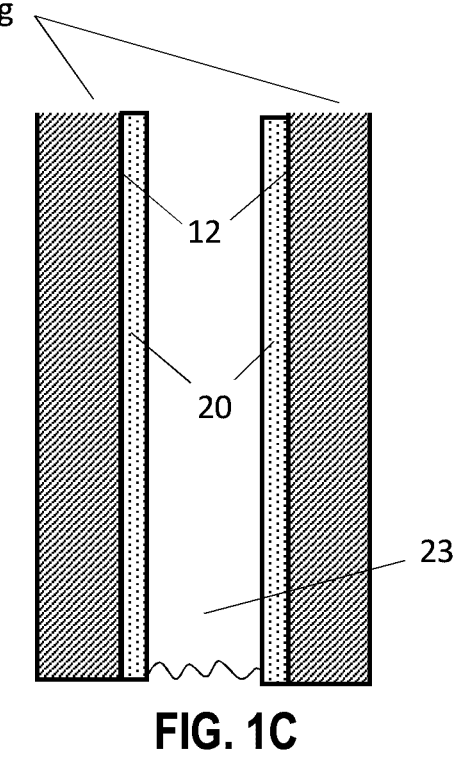
FIG. 1C is a longitudinal sectional view of the second end of tubing g where the inner wall of tubing g is coated with a plasmonic layer according to another embodiment of the probe of the invention.

The second end of the tubing can either be open or closed (preferably it is open). FIGS. 1B and 1C shows embodiments in which the second end of tubing g is open. FIG. 1B is a longitudinal sectional view of the second end of tubing g comprising plasmonic nanoparticles (18) bathed in a deoxygenated solvent according to an embodiment of the probe of the invention. FIG. 1C is a longitudinal sectional view of the second end of tubing g in which the inner wall 12 of tubing g is coated with a plasmonic layer (20) and the tubing g is filled with a deoxygenated solvent (23) according to another embodiment of the probe of the invention.

If the tubing is open, the deoxygenated solvent (and the plasmonic nanoparticles if they are used) may, in some cases, flow out of the second end of the tubing. Accordingly, in some embodiments in which the second end of the tubing is open, the detection chamber and tubing are refilled with deoxygenated solvent (and plasmonic nanoparticles if they are used), for example from a pump or a reservoir, such that the tubing and the detection chamber remain filled with deoxygenated solvent (and plasmonic nanoparticles, if they are used, so that the plasmonic nanoparticles are kept in close proximity with each other). The pump or the reservoir can be connected to the first end of the tubing directly, or it can be connected to the detection chamber in such a manner that any deoxygenated solvent/plasmonic nanoparticles flowing out of the second end of the tubing is replaced. In other cases, especially when the tubing has a small diameter, capillary forces may keep deoxygenated solvent (and the plasmonic nanoparticles if they are used) inside the tubing despite the second end of the tubing being open. In yet other cases, it may be sufficient to simply ensure that there is no air leak in the detection chamber and tubing to ensure that the deoxygenated solvent (and the plasmonic nanoparticles if they are used) remain inside the tubing despite the second end of the tubing being open (this is similar to a straw removed from a glass of water while its top end is blocked: the water stays in the straw as long as the top end of the straw is blocked).

Figure 1D:
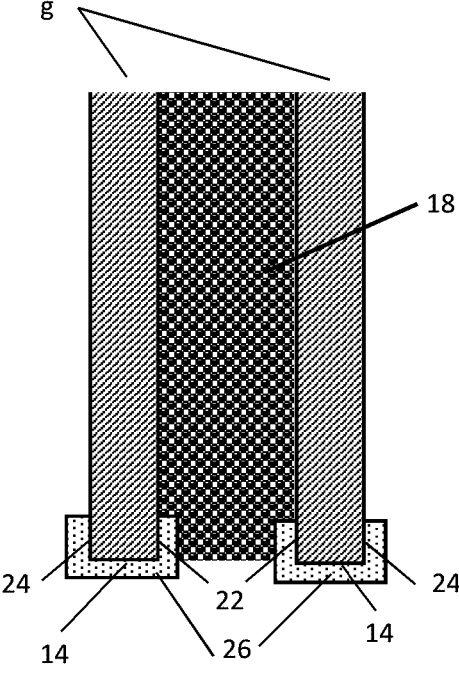
FIG. 1D is a longitudinal sectional view of the second end of tubing g comprising plasmonic nanoparticles in which the end wall, the inner wall toward the second end of tubing g, and the outer wall toward the second end are coated with a plasmonic layer.
Figure 1E:
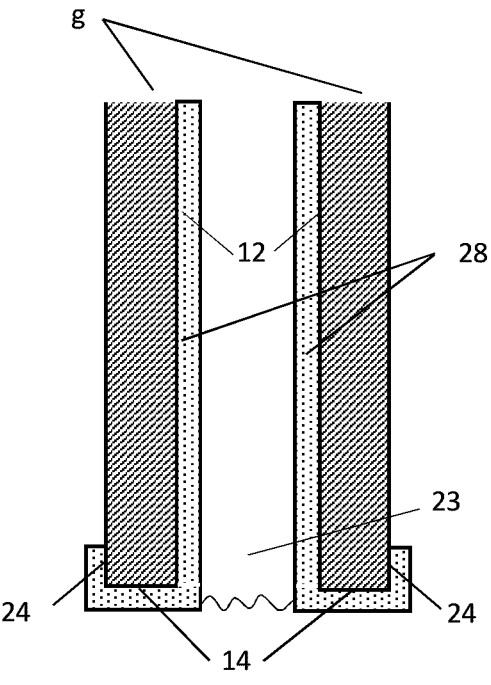
FIG. 1E is a longitudinal sectional view of the second end of tubing g in which the inner wall is coated with a plasmonic layer that also covers the end wall and the outer wall toward the second end of tubing g.

In preferred embodiments in which the second end of the tubing is open, the second end of the tubing is at least partially coated with a plasmonic layer. Embodiments showing this coating are shown in FIGS. 1D and 1E. FIG. 1D is a longitudinal sectional view of the second end of tubing g comprising plasmonic nanoparticles 18 in which the end wall 14, the inner wall toward the second end of tubing g (22), and the outer wall toward the second end (24) are coated with a plasmonic layer (26). This plasmonic layer 26 is in close proximity to (preferably in contact with) the plasmonic nanoparticles and the deoxygenated solvent, thus ensuring propagation of the plasmonic fields between the nanoparticles and said layer. FIG. 1E is a longitudinal sectional view of the second end of tubing g in which the inner wall 12 is coated with a plasmonic layer (28) (similar to that shown in FIG. 1C) but in which the plasmonic layer (28) also covers the end wall 14 and the outer wall toward the second end of tubing g (24). These plasmonic layers (26, 28) are also in contact with the liquid sample allowing the desired interaction between the analyte and the plasmonic fields.

Figure 1F:
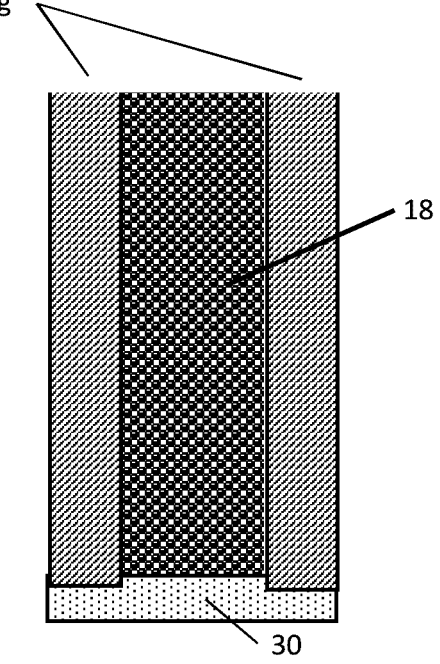
FIG. 1F is a longitudinal sectional view of the second end of tubing g comprising plasmonic nanoparticles capped with a plasmonic layer.
Figure 1G:
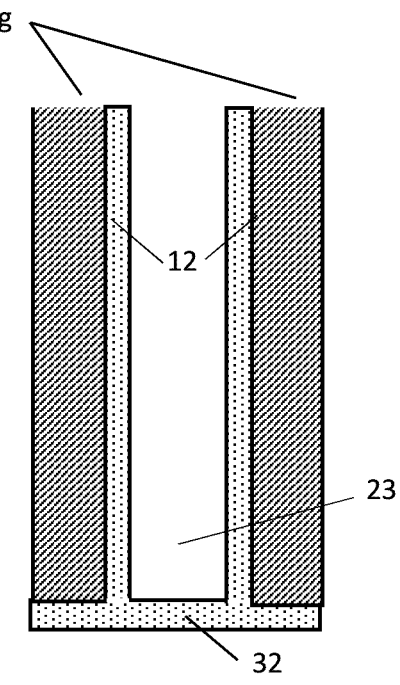
FIG. 1G is a longitudinal sectional view of the second end of tubing g in which the inner wall is coated with a plasmonic layer that also caps the second end of tubing g.

In alternative embodiments, the second end of the tubing may also be capped with a plasmonic layer. Embodiments showing this capping are shown in FIGS. 1F and 1G. FIG. 1F is a longitudinal sectional view of the second end of tubing g comprising plasmonic nanoparticles 18 capped with a plasmonic layer (30). The inner side of the plasmonic layer (30) is in close proximity to (preferably in contact with) the plasmonic nanoparticles and the deoxygenated solvent, thus ensuring propagation of the plasmonic fields between the nanoparticles and said layer. FIG. 1G is a longitudinal sectional view of the second end of tubing g in which the inner wall 12 is coated with a plasmonic layer (32) (similar to that shown in FIG. 1C) but in which the plasmonic layer 32 also caps the second end of tubing g. In use, the outer side of these plasmonic layers (30, 32) is in contact with the liquid sample, thus allowing the desired interaction between the analyte and the plasmonic fields. Indeed, any analyte that comes into contact or in close proximity with the plasmonic layer will result in the generation of the signal plasmonic field that will be transmitted to the detection chamber where the SERS signal can be measured by the spectrometer. With such a configuration, it is not necessary to constantly replenish the plasmonic nanoparticles bathed in a deoxygenated solvent, as none will be escaping from the second end (unlike in configurations where the second end is open).

The tubing can be made of any tubing material known in the art that will not adversely affect the generation and transmission of plasmonic fields. It is generally understood that the choice of tubing material may be affected by the intended use of the probe. For example, a more flexible material may be preferable when the probe will be used in situations where bending of the tubing is necessary. In embodiments, the tubing is made of metal, quartz, glass, or a polymer plastic, such as polyethylene, polypropylene, polystyrene, polyetheretherketone, polyvinyl chloride, polytetrafluoroethylene, or polydimethylsiloxane. In preferred embodiments, the tubing is polyetheretherketone (PEEK) polymer tubing, or glass capillary tubing.

In general, it is more advantageous for the tubing to be narrower. By employing tubing with a smaller inner diameter, fewer plasmonic nanoparticles bathed in a deoxygenated solvent will be needed to fill the tubing; capillary action inside the tubing is increased; and the transmission of the plasmonic field along the length of the tubing will be improved as it will be easier to sufficiently pack the plasmonic nanoparticles together such that they are in close proximity to each other. In addition, tubing with a smaller outer diameter will be smaller in size (meaning the tubing will be able to enter smaller spaces). Further, the inner diameter of the tubing should be appropriate for scattering detection. In embodiments, the inner diameter of the tubing is between about 0.08 mm and about 1 cm, preferably between about 0.3 mm and about 0.5 mm. In embodiments, the inner diameter of the tubing is at least about 0.08 mm; at least about 0.1 mm; at least about 0.2 mm; or at least about 0.3 mm; and/or at most about 1 cm; at most about 5 mm; at most about 2 mm; at most about 1 mm; at most about 0.75 mm; or at most about 0.5 mm. In preferred embodiments, the inner diameter of the tubing is about 0.3 mm or about 0.5 mm.

As mentioned previously, increasing the length of the tubing will increase the length of the probe, thereby allowing for the SERS spectra of samples to be measured at greater distances from the SERS spectrometer. In embodiments, the length of the tubing is at least about 5 cm; at least about 10 cm; at least about 20 cm; at least about 50 cm; or at least about 75 cm; and/or at most about 50 m; at most about 20 m; at most about 10 m; at most about 5 m; at most about 2 m; or at most about 1 m. In preferred embodiments, the length of the tubing is about 1 m or about 2 m.

The skilled person would understand that the tubing need not necessarily have a circular cross-section. In fact, the cross-section thereof can be any shape (oval, rectangular, etc.).

"Close Proximity"

The skilled persons are well aware that plasmonic fields created on surfaces of plasmonic materials decrease in intensity (in a more or less exponential manner) with increasing distance from the surface.

Herein, in the context of an analyte being in close proximity with plasmonic nanoparticles or a plasmonic layer, "close proximity" similarly means that the analyte is close enough to the layer/nanoparticles to interact with the plasmonic field of nanoparticle/layer and thus produce a signal plasmonic field.

Herein, in the context of plasmonic nanoparticles, "close proximity" means that the nanoparticles are close enough so that the plasmonic field of a nanoparticle can excite a next nanoparticle and thus create a plasmonic field on said next nanoparticle, this plasmonic field propagation being repeated in an uninterrupted manner from the detection chamber to the second end of the tubing and back. Of course, "close proximity" includes cases where the particles touch each other. In the context of a plasmonic layer being in close proximity with plasmonic nanoparticles, "close proximity" similarly means that the nanoparticles and the layer are close enough so that the plasmonic field of a nanoparticle can excite that of the layer and thus create a plasmonic field on the layer (and vice versa).

It should be noted that the exact distance at which the plasmonic fields is transported as described above depends on the plasmonic material used. For example, as discussed further below, computational modelling demonstrated that, for pristine (uncoated) and silver-oxide-coated silver nanoparticles, the plasmonic field transport appears to end at 17 nm and 9.8 nm of distance, respectively. Closer distances have more intense resonances, and so they will likely transmit the plasmonic field further. Therefore, in embodiments, "close proximity" means a distance of at most about 15 nm, preferably a distance of at most about 10 nm, most preferably a distance of at most about 5 nm apart (between plasmonic nanoparticles, between plasmonic nanoparticles and a plasmonic layer, or between either of those and an analyte).

It is to be understood that the plasmonic nanoparticles can be in close proximity to each other in such a manner that the density of the plasmonic nanoparticles varies along the length of the tubing; what matters is the SERS signal can be transmitted along the length of the tubing.

As the plasmonic nanoparticles are in close proximity to each other (or as the plasmonic layer is continuous), the signal plasmonic field occurring at the second end of the tubing is able to be transmitted along the tubing to the first end of the tubing, where the SERS signal can be measured by the spectrometer. It is important to repeat here that without removal of dissolved oxygen using an oxygen scavenger, the above propagation (either among plasmonic nanoparticles or along a plasmonic layer) does not happen. In such cases, the plasmonic fields are quenched upon very short distances, even when using oxygen reduction techniques such as gas sparging.

Detection Chamber

The detection chamber is an element of the probe that is flowably connected to the first end of the tubing. The detection chamber of the probe is configured to be used with a surface enhanced Raman spectrometer, such that incident light from the surface enhanced Raman spectrometer is applicable to the detection chamber. The detection chamber is also where the SERS signal incoming from the tubing will be measured by the surface enhanced Raman spectrometer by the spectrometer detector's field-of-view. This is why the detection chamber is transparent to a SERS laser light and Raman scattered light, as this allows the SERS laser to be applied to the detection chamber, and this allows the SERS signal incoming from to be measured by the detector's field-of-view.

The detection chamber and the first end of the tubing are flowably connected to each other, preferably through an aperture defined by the detection chamber, such that the deoxygenated solvent (and plasmonic nanoparticles if they are used) can flow between the detecting chamber and the tubing; or such that the plasmonic layer is continuous (i.e. uninterrupted) from the detecting chamber to the tubing. The detection chamber also comprises the plasmonic nanoparticles bathed in the deoxygenated solvent or has an inner wall coated with a plasmonic layer, as this will allow the SERS signal that has been transmitted to the first open end of the tubing to be propagated throughout the detection chamber, where it can be measured by the detector's field-of-view.

The skilled person would understand that the detection chamber can have any shape and structure that can be used for SERS, and can be made of any material appropriate for SERS. In preferred embodiments, the detection chamber is made of glass, plastic, or quartz, more preferably glass or quartz.

Liquid Sample

The liquid sample can be any liquid sample to be measured by the probe. In embodiments, an analyte contained in the liquid may be placed in contact with a plasmonic material (defined in the previous section) contained in the probe (for example, a plasmonic layer completely covering the second end, in the case of a closed second end; or a plasmonic layer coating the second end or plasmonic nanoparticles bathed in the deoxygenated solvent, in a case of an open second end). In embodiments, the liquid sample may be placed in contact with a plasmonic material, as defined in the previous section. In such embodiments, the plasmonic materials (and therefore the liquid sample) can be located on a surface and/or container where the second end of the tubing is configured to be placed in contact. In preferred embodiments, the analyte is adsorbed onto the plasmonic material.

In preferred embodiments, the liquid sample has been deoxygenated, preferably using an oxygen scavenger as defined in the previous section. The amount of oxygen scavenger, as well as the remaining DO concentration in the liquid sample, can be as defined in the previous section.

In embodiments, the liquid sample is a liquid sample as defined in the previous section. In preferred embodiments, the liquid sample has been modified using the method of the present invention.

The skilled person would understand that, as the probe is intended to be used for SERS measurements, the liquid sample can be any liquid sample from which a SERS measurement can be performed.

As mentioned above, the probe of the present invention is configured to be placed in contact with the liquid sample. For example, the second end of the probe can be immersed into the liquid sample, or the second end can be applied to a surface of the liquid sample. For clarity, it is the tip (whether closed or not) of the second end of the tubing that is placed in contact with the liquid sample.

The Probe as Used with a SERS Spectrometer

Figure 2:
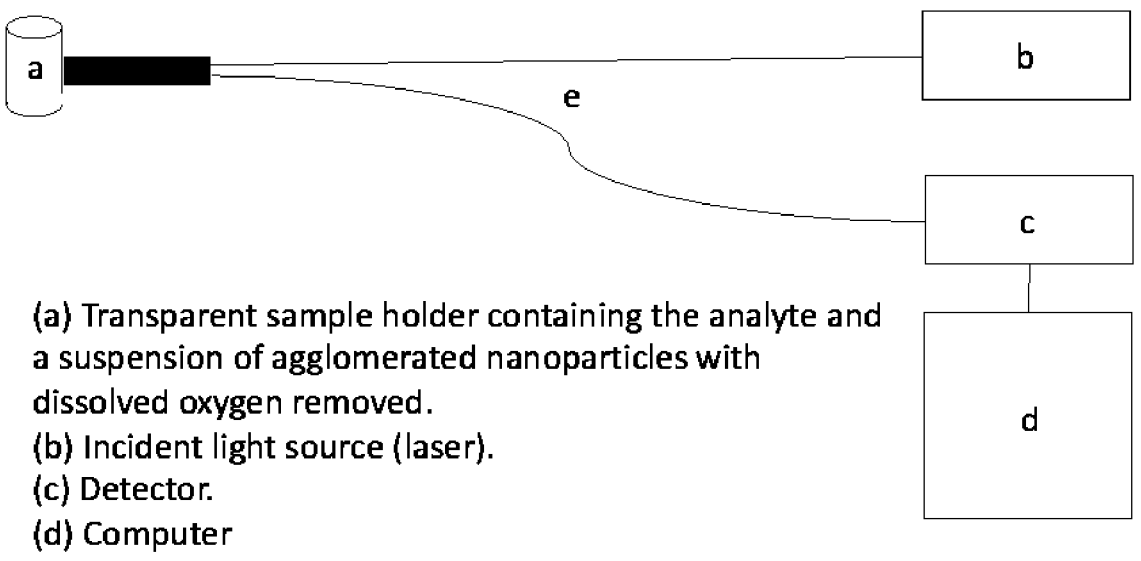
FIG. 2 depicts a schematic of a conventional surface enhanced Raman spectrometer.
Figure 3:
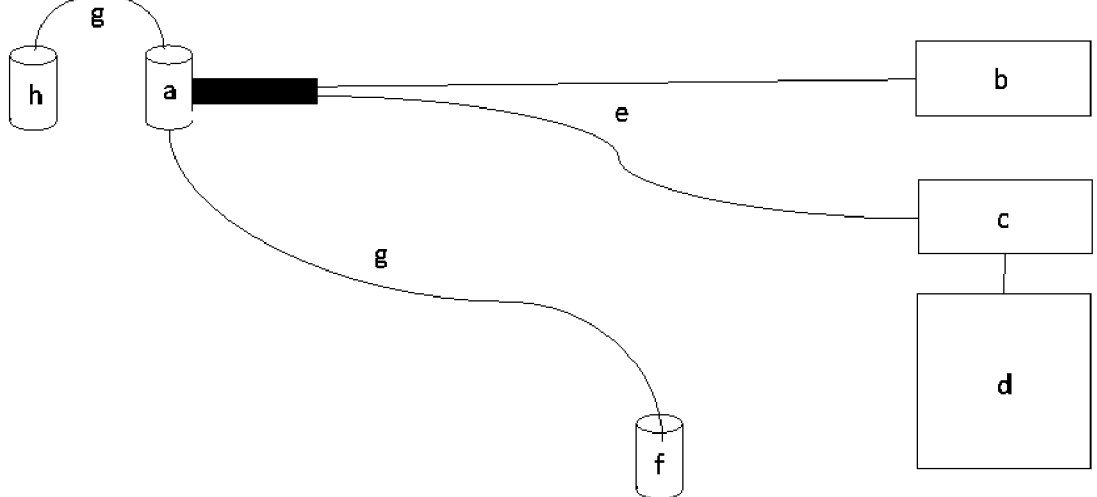
FIG. 3 depicts a schematic of a surface enhanced Raman spectrometer for remote sensing comprising a probe of the present invention.
Figure 4A:
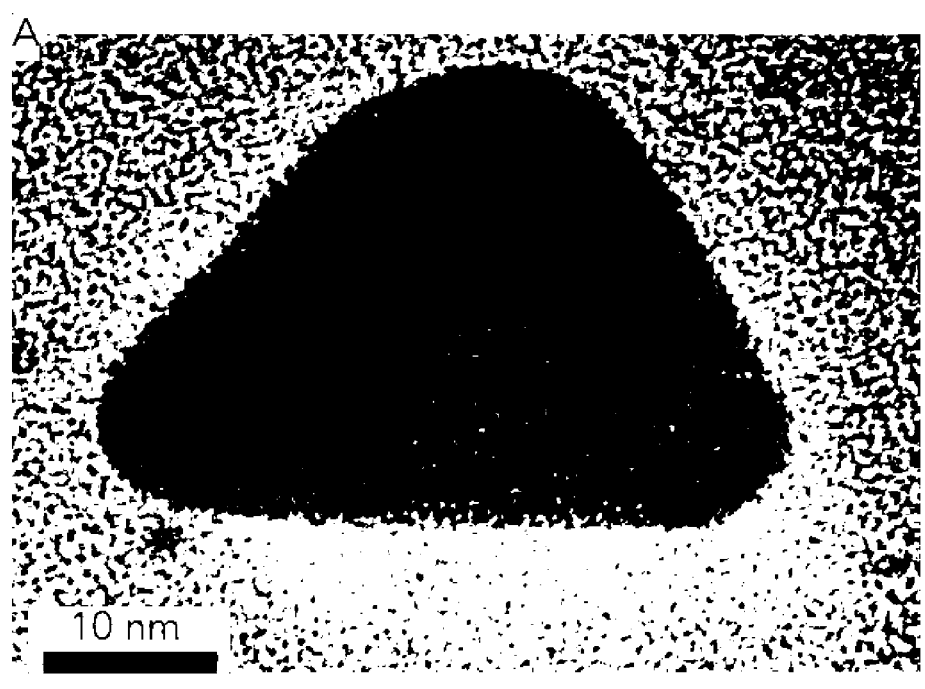
FIG. 4 shows transmission electron micrographs of silver nanoparticles and aggregates used in the present experiments; specifically.
Figure 4B:
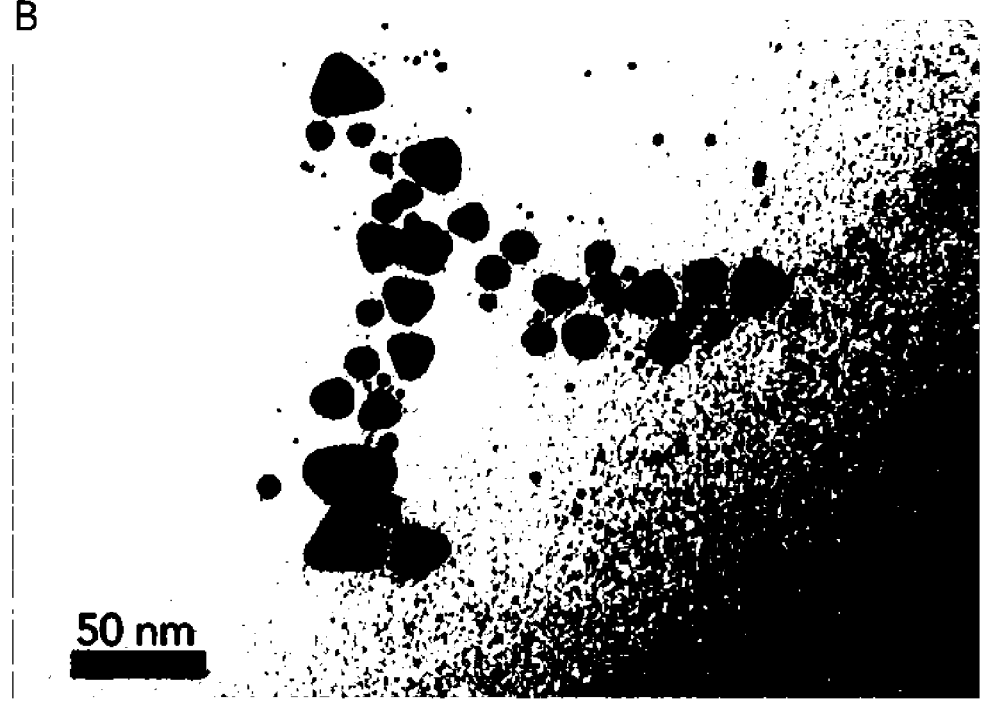
Figure 4C:
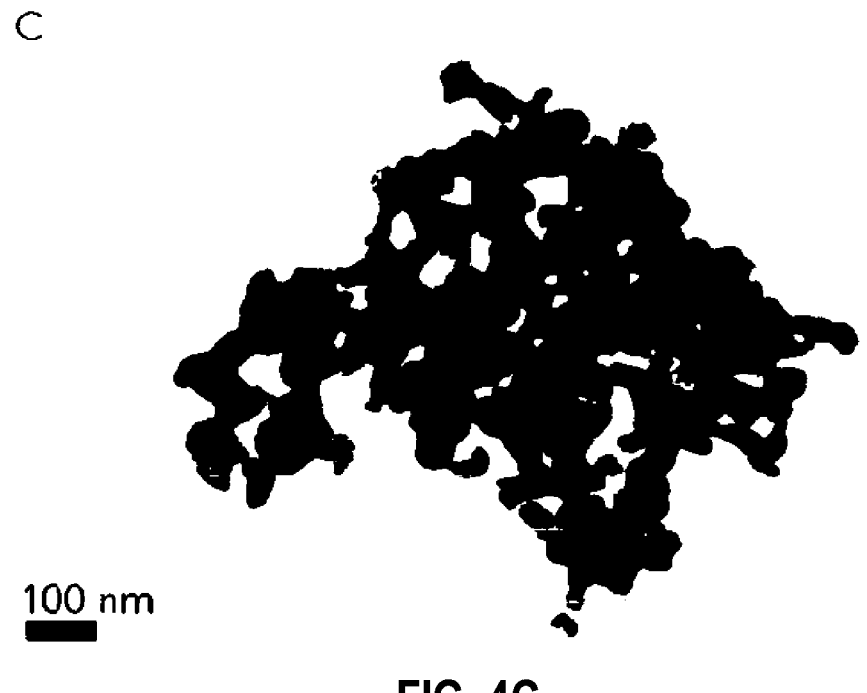
Figure 4D:
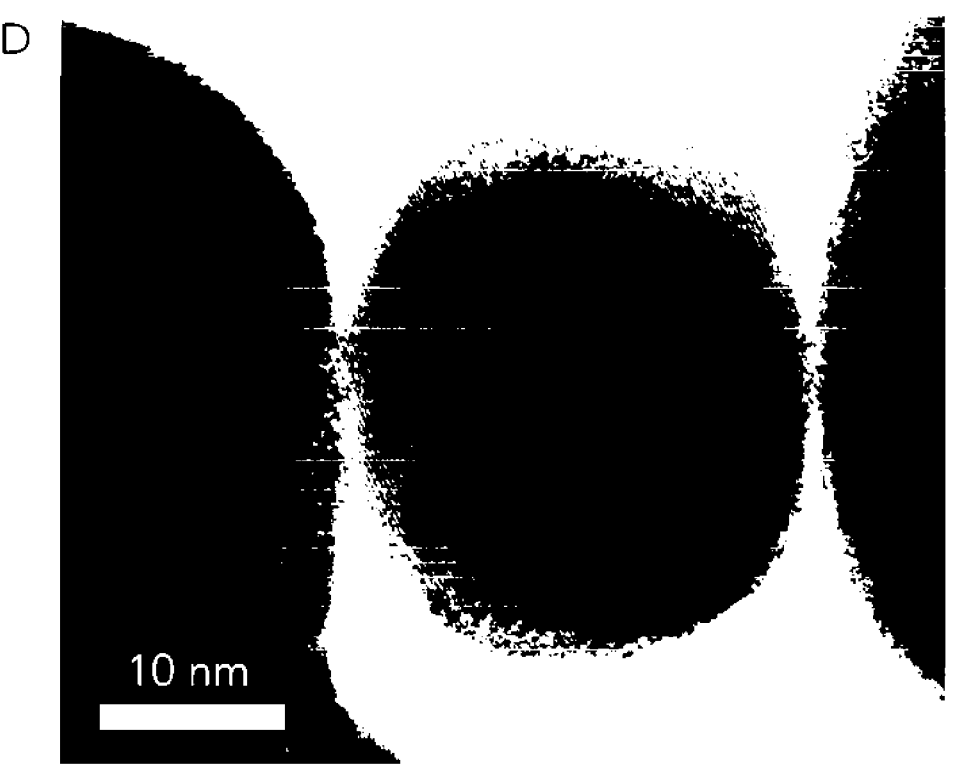

This section will describe how the probe can be configured to work with a SERS spectrometer. FIG. 2. depicts a schematic diagram of a conventional surface enhanced Raman spectrometer. The system in FIG. 2 consists of a transparent sample holder, laser light source, detector, fiberoptic cables to connect both the laser light source and detector to the sample holder, and a computer to interpret and display the data acquired by the detector. FIG. 3, however, depicts a diagram of a surface enhanced Raman spectrometer for remote sensing that comprises most of the same components of the surface enhanced Raman spectrometer as given in FIG. 2. However, in place of the sample holder, there is the detection chamber of the probe, wherein incident light is applied and scattered light is detected that is connected through tubing to a tip (the second end of the tubing) that is brought into contact with (e.g. immersed in or applied to a surface of) a liquid sample. The detection chamber depicted in FIG. 3. is connected to a pump and reservoir for filling the tubing with fluid.

It should also be mentioned that the probe of the present invention can be used in a SERS spectrometer system such as that used for remote testing in the experimental section below.

In use, the probe of the present invention is placed into contact with an analyte. Namely, the second end of the tubing is contacted with the analyte. In preferred embodiments, the analyte preferably becomes adsorbed to a surface of a plasmonic material, which can be the surface of the nanoparticles in the tubing, a plasmonic layer coated on the second end of the tubing, and/or a plasmonic layer capping the second end of the tubing. In alternative embodiments, the analyte is in a deoxygenated liquid sample produced according to the method of the invention and containing agglomerated plasmonic nanoparticles or a rough plasmonic surface, either of which comes into contact with the nanoparticles in the tubing; a plasmonic layer coated on the second end of the tubing; and/or a plasmonic layer capping the second end of the tubing.

In embodiments, a molecule that interacts with specific analytes to produce a distinct signal, for example, a chelating agent for metal ions or an antibody, peptide, or aptamer that interacts with biomolecules, may be pre-adsorbed onto the plasmonic nanoparticles in the tubing, the plasmonic nanoparticles in the liquid sample, a plasmonic layer coated on the second end of the tubing, and/or a plasmonic layer capping the second end of the tubing.

Both the surface enhanced Raman spectrometer of FIG. 2 (when using a liquid sample modified according to the method of the present invention) and surface enhanced Raman spectrometer for remote sensing shown in FIG. 3 (comprising the probe of the present invention) can be used to detect analyte by applying incident laser irradiation to the sample holder or detection chamber and measuring scattered light using a detector. In preferred embodiments, backscattered light, that is, light scattered 180° relative to the incident light is detected, but light scattered at any angle relative to the incident light may be detected.

Dramatic signal amplification is observed in both the surface enhanced Raman spectrometer of FIG. 2 (when using a liquid sample modified according to the method of the present invention) and surface enhanced Raman spectrometer for remote sensing shown in FIG. 3 (comprising the probe of the present invention) upon oxygen removal using chemical oxygen scavengers; oxygen removal also enables the remote sensing ability of the surface enhanced Raman spectrometer using the probe of the present invention.

Advantages of the Invention

In developing the method of the present invention, the inventors discovered the surprising result that the SERS spectra of analytes increased dramatically after DO removal using an oxygen scavenger.

In embodiments, in addition to the advantages previously discussed, the method of the present invention, as well as the probe of the present invention, can present one or more of the following advantages:

The limit of detection (LOD) for analytes can reach 10 zM (compared to 10 pM in aerobic (non-deoxygenated) samples, a $10^9$ increase in sensitivity).

Signal enhancement can also be observed when using silica coated nanoparticles such as AgNPs, i.e., the SHINERS technique, where the LOD decreased from 500 nM to 50 aM ($10^{10}$ times).

The relative signal enhancement upon DO removal (when compared to an unmodified liquid sample) can consistently be between $10^9$-$10^{10}$ times, although absolute sensitivities are particle dependent.

The analyte no longer needs to be irradiated (meaning it no longer has to be within the beam diameter of the incident light source) nor does it have to be within the field-of-view of the detector, which allows for a wider variety of potential applications of the method and the probe of the present invention, such as, for example, environmental monitoring.

Detection time appears to not be determined by analyte diffusion into the field-of-view of the detector, but rather by the transport of the plasmonic field. The SERS signal can be obtained immediately upon irradiation at the other end of the tubing. This fast response yields high temporal resolution in addition to its high sensitivity, which allows monitoring of fast chemical events, e.g., to study chemical reactions or to detect short-lived species at a single molecule level.

The method of the present invention is cost-effective and only requires a regular Raman spectrometer without an expensive SERS detector. This greatly reduces the capital expense of performing SERS experiments and will facilitate this research globally, but particularly in developing countries and resource-limited areas. It is believed the unprecedented detection sensitivity, fast response time, and the remote sensing capability may generate many applications in medical diagnosis, environmental monitoring, and national security.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENT

The present invention is illustrated in further details by the following non-limiting examples.

Experimental Procedures

Surface enhanced Raman spectra were recorded using a 785 nm solid state Nd-YAG laser (line width <3.2 cm$^{-1}$, 500 mW) and backscattered light (180°) was measured using a standard Sunshine TG-Raman fibre spectrometer (Changchun New Industries Optoelectronics Tech. Co., Ltd., Changchun, China). What follows are detailed experimental procedures, including sample preparation, analysis, and computational modelling.

Materials and Reagents

All reagents were commercially available and used without further purification. Silver nitrate (AgNO$_3$, 99.9%), sodium borohydride (NaBH$_4$, 99%), trisodium citrate (99%), 4-aminothiophenol (pATP, 97%), 4-nitrothiophenol (pNTP, 80%), tetraethylorthosilicate (TEOS, 98%), sodium hydroxide (99%), sodium sulfate (99%), sodium sulfite (99%), and ammonium hydroxide (30%) were purchased from Sigma-Aldrich (Oakville, ON, Canada). Ascorbic acid (>99%) was purchased from Alfa Aesar (Ward Hill, MA, USA). Hydrazine hydrate was purchased from EMD Millipore (Burlington, MA, USA). Anhydrous ethanol (EtOH) and hydrogen peroxide (H$_2$O$_2$, 30 wt %) were purchased from VWR (Mississauga, ON, Canada). Single-stranded thiolated DNA 5-mers, i.e., 5A, 5C, 5G, and 5T, were purchased from Eurofins MWG Operon (Huntsville, AL, USA). Nanopure water (18 MΩ cm) was obtained from a Barnstead Nanopure system (Thermo Fisher Scientific, Waltham, MA, USA).

Silver Nanoparticle Synthesis

Silver nanoparticles (AgNPs) stabilized by small loosely bound capping molecules, i.e., citrate and ethanol, were used as the SERS substrate because of their excellent optical properties and the ease of displacement of the capping ligands by the thiolated analytes. They were prepared using the method reported by the reference "Q. Zhang, N. Li, J. Goebl, Z. Lu, Y. Yin, A Systematic Study of the Synthesis of Silver Nanoplates: Is Citrate a "Magic" Reagent? J. Am. Chem. Soc. 133, 18931-18939 (2011)", the entirety of which is incorporated herein by reference. The resultant AgNPs had an absorbance maximum at 590 nm, and TEM imaging revealed triangular nanoparticles with an average diameter of 17±2 nm (see FIG. 4 for transmission electron micrographs of silver nanoparticles and aggregates used in the experiments below). As prepared, the AgNPs had a concentration of 0.3 nM that was concentrated to 7 nM by centrifugation at 12,000 rpm for 20 min. Unless stated otherwise, all references to AgNPs in the experiments below refer to the above-prepared AgNPs.

Preparation of Silica-Coated Silver Nanoparticles

Equal volumes of AgNP (7 nM) and TEOS (1 μM) were ultrasonicated for 10 min in 1.5 mL of EtOH in a polypropylene microcentrifuge tube. No aggregation was observed after centrifugation at 12 500 rpm for 20 min. The pH was adjusted to 4 before adding agglomerating agents for SERS measurements. Unless stated otherwise, all references to silica-coated AgNPs in the experiments below refer to the above-prepared silica-coated AgNPs.

Electrochemical Measurements

Amperometry experiments were performed using a bipotentiostat (CS2350, Wuhan Corrtest Instruments Corp., Ltd., Wuhan, China). Screen-printed gold honeycomb working and counter electrodes were used with an external Ag/AgCl reference electrode (Pine Research Instrumentation, Durham, NC, USA). The honeycomb electrodes have nineteen 0.50 mm diameter 1.5 mm deep holes separated by 0.75 mm, which allow the AgNPs to pass through the working electrode. The solution was stirred at 1200 rpm. For all of the potential range measurements, the initial potential was 0 V and the low and high potentials were −0.9, −1, and −1.7, and +0.9, +1, and +1.7 V, respectively. The current enhancement was independent of the applied voltage and no contribution from electrode instability was observed. The pulse width was 10 s at a frequency of 10 Hz. A quartz cuvette was used as the sample holder (with no background interference observed). The sample was irradiated with a 785 nm laser outside of the electrode area. See FIG. 5A for an experimental schematic showing the above-described system used for electrochemical measurements. For clarity, these electrochemical experiments were designed to show enhanced plasmonic field transport through excitation of the AgNPs with a laser. There were no analytes present or spectra generated.

Surface Enhanced Raman Spectroscopy

To evaluate the detection sensitivity for different analytes adsorbed on the AgNPs, SERS signals were measured in a 5×100 mm quartz NMR tube (0.5 mm quartz thickness). Samples were agglomerated by the addition of sulfite or sulfate and any other additives as indicted in the experiments. Notably, SiO$_2$-coated AgNPs required pH adjustment to ~4 before they could be agglomerated by the addition of sulfite or sulfate. Samples were excited using a solid-state Nd-YAG laser (785 nm, line width <3.2 cm$^{-1}$, 500 mW). The laser stability was ±5% with a resolution of 5-8 cm$^{-1}$. A 785 nm fibreoptic laser probe was connected to the laser source with an output power of 450 mW and a beam diameter of 2.5 μm. The power at the sample (~5 mW) was recorded with a Thorlabs PM100 optical power meter. Backscattered (180°) light was collected by a standard Sunshine TG-Raman fibre spectrometer (Changchun New Industries Optoelectronics Tech. Co., Ltd., Changchun, China). The SERS spectra were collected above 1000 cm$^{-1}$ because of the strong spectra interference of the capping molecules, i.e., citrate and ethanol. However, sample spectra between 200-1650 cm$^{-1}$ are presented to support the conclusions outlined below. All spectra are presented as an average of three measurements consisting of 1505 data points each.

Sample Preparation and Single-Molecule Detection Probability Analysis

Careful sample preparation through serial dilution was used to obtain accurate and precise measurement of samples containing an extremely low concentration of the analyte (pNTP). All of the pre-cleaned glass containers, e.g., 100 mL volumetric flasks and quartz cuvettes, were soaked in freshly prepared aqua regia for 2 h before being rinsed with nanopure water until neutral, followed by rinsing with anhydrous ethanol. The analyst preparing the samples tested the accuracy and precision of volumes delivered by a 20 μL micropipette by weighing volumes of water delivered using an analytical balance. The value obtained was 20.00±0.09 μL (n=10). The stock solutions were carefully prepared by a series of 5000-fold dilutions (20 μL into 100 mL) from an initial stock prepared with >100.0 mg of pNTP to obtain 4 significant figures in measurement, i.e., an initial stock solution (13.22 mM) was prepared by dissolving 102.7 mg of pNTP in 50 mL of anhydrous ethanol with vortex mixing and ultrasonication to ensure complete dissolution of the particles. The number of dilution steps was minimized to mitigate error propagation in the final concentrations obtained. The first of the serial dilutions (8 μM) was made by diluting 60.5 μL of the initial stock into a 100 mL class A volumetric flask (100.00±0.08 mL at 25° C.). This was inverted several times to mix. This procedure was repeated three times by diluting 20 μL of the previous solution into a fresh 100 mL volumetric flask to yield solutions with nominal concentrations of 1.6 nM, 320 fM, and 64 aM. The 160 and 32 zM stock solutions for sample preparation were prepared by diluting 37.5 or 7.5 μL of the 64 aM solution into new 15 mL centrifuge tubes immediately before use.

Two batches of samples (100 each) at two concentrations were prepared such that the estimated probabilities of each containing a single analyte molecule were either 60 or 12%. The sample concentrations required to contain a statistical average of 0.60 and 0.12 molecules in 25 μL are 40 and 8 zM, respectively. The samples were prepared through the addition of 10 μL of pNTP stock solution (160 or 32 zM), 10 μL of 7 nM AgNP solution, and 20 μL of nanopure water in 600 μL microcentrifuge tubes. For rapid screening, each 40 μL sample was agglomerated and deoxygenated with $Na_2SO_3$ powder, then 25 μL was withdrawn and was completely siphoned into a standard melting point capillary (1.5-1.8×100 mm Corning 9530-1 Pyrex capillary tubes) by capillary force for SERS measurement.

A similar sample preparation procedure was applied for other analytes, including pATP and four homopolymer oligoDNA sequences with different concentrations, as well as for different concentrations of pNTP. However, whereas the above pNTP samples were prepared with 5000-fold dilutions, the samples defined in this paragraph were prepared by 100-fold serial dilutions. Then, the analyte, e.g., pATP was mixed with AgNP solutions to obtain the target analyte concentration, e.g., 75 μL each of pATP and AgNP solutions and 150 μL of nanopure water. Each concentration was prepared in 3 independent replicates to obtain a standard deviation. To each solution (e.g. pATP+AgNP solution) (300 μL), 10 mg of either $Na_2SO_3$ or $Na_2SO_4$ powder was added to yield solutions with identical ionic strength but either without or with dissolved oxygen, respectively. Unless stated otherwise, the solutions containing analytes used in the experiments discussed below were prepared according to the above method, with necessary adjustments made to achieve the target concentrations.

Error Propagation in Sample Preparation by Serial Dilution

Given the ±0.1 mg error from the analytical balance and assuming a ±0.1 mL error in the volume of the 50 mL tube, there is a potential 0.22% maximum error in the concentration of the initial pNTP stock solution. For each dilution, the relative standard deviation in concentration would be determined by the root sum square of the relative standard deviations of the pipetting (0.47%) and the volumetric flasks (0.08%), which is ~0.48%. This error is compounded over the initial and three serial dilution steps, which are treated as independent events, i.e., the deviation is random and not systematic, which yields an error in concentration of ~1.9%. After this there is an additional dilution step to form the 160 and 32 zM stock solutions for the analysis. Assuming a ±0.1 mL error in the 15 mL tube and the same relative deviation from pipetting, this yields an additional 0.81% error. The nanoparticle adsorption step includes three pipetting events, which introduce error in the final concentration of the analyte solutions. Assuming similar pipetting error for the 10 and 20 μL additions, an additional ~0.43% error in concentration is accrued. Each of the dilution steps is an independent event and thus the overall relative error in concentration is expected to be ~2.1%. Thus, the concentrations in the analyte solutions should be 40±0.85 or 8±0.17 zM, which corresponds to a detection probability in a 25 μL sample of 58.7-61.3% or 11.7-12.3%, respectively.

Results and Significance of the Probability Analysis

Samples (25 μL, 100 each) at 40 and 8 zM, with a nominally 60 and 12% probability, respectively, of containing a single molecule of pNTP were analysed after nanoparticle agglomeration and deoxygenation by the addition of $Na_2SO_3$ in standard melting point capillary tubes. pNTP was detected in 55 and 8 of 100 samples at the 40 and 8 zM concentration levels, respectively. The measured frequencies were compared to the expected frequencies using Fisher's Exact test to determine if there are non-random associations between the expected and measured frequencies. There was no statistically significant difference p=0.57 and 0.48 for 60 and 12% probability, respectively. Therefore, the experimentally measured detection frequencies at both concentrations were within expected values for single molecule detection. For clarity, no spectra were generated for this probability analysis.

Remote Sensing

To test the efficacy of the probe of the present invention, and to determine the extent of plasmonic coupling within and between the plasmonic nanoparticle aggregates, two experiments were devised. These experiments sought to isolate the analyte molecules from the incident light source and field of view of the detector by adsorbing them on a silver mirror surface and thoroughly removing any unadsorbed or loosely bound analytes through extensive rinsing (these experiments pertain to FIGS. 18-20, whose results are discussed below). This was achieved either using a 10 cm long quartz NMR tube or a 1 m long PEEK capillary tube coupled to a short section of quartz NMR tubing.

First, to prepare the silver mirror surface at the end of the tubing, a solution of Tolien's reagent was made from 0.1 M of $AgNO_3$, which was first precipitated by the addition of dilute NaOH to form $Ag_2O$. The obtained $Ag_2O$ was redissolved by the dropwise addition of concentrated aqueous $NH_3$ to form the $Ag(NH_3)_2$ complex. The Tolien's reagent solution was added either to a quartz NMR tube or to the surface of PEEK tubing in a polypropylene microcentrifuge tube to cover half of the desired surface (~5 mm) that was to be silver-coated. Then, an equal volume of 0.1 M of glucose was added, and the mirror was allowed to develop. After the surface was silver-coated, it was rinsed ~30 times each with nanopure water and EtOH to remove any excess reagents or other adsorbed materials before drying at ambient temperature. Note that the adhesion of silver on the polymer surfaces was weak and treated with care as it could be rubbed off easily.

Afterwards, 100 nM of analyte, such as pATP, was added to cover the silver mirror surface. The NMR tube and the PEEK tubing were then rinsed 30 times each with EtOH and nanopure water to remove any unbound analyte from the silver mirror surface (for the PEEK tubing the rinsing was performed from the end opposite the silver mirror to prevent analyte migration into the tubing). To detect the analyte adsorbed at the distal end (the second end) of a glass NMR tube or PEEK tubing, the thoroughly rinsed apparatus was filled with a AgNP solution that had been agglomerated and deoxygenated immediately prior through the addition of excess $Na_2SO_3$. The fibreoptic bundle connected to the incident laser light source and detector was aligned on the end of the cuvette or tubing opposite to the adsorbed analyte and the Raman spectrum was recorded. As will be discussed in more detail below, analytes were detected when the AgNPs were agglomerated and deoxygenated with $Na_2SO_3$, but not when they were only agglomerated with $Na_2SO_4$.

Blind Remote Sensing from Nanoparticle Aggregates

Samples for remote sensing using the probe of the present invention were prepared for blind testing by making stock solutions, with either 0 or 2 μM of pNTP and 3.5 nM of AgNPs in 50 vol % ethanol (400 μL). The solutions were sonicated for 30 min to ensure the pNTP and AgNPs were well mixed and the pNTP had adsorbed onto the NP surfaces. To remove any residual unadsorbed pNTP that could diffuse through solution, the samples were centrifuged for 30 min at 12,700 rpm to precipitate the NPs and all but 20 μL of solution was removed (so as to not disturb the precipitated NPs). The samples were diluted to 1500 μL with ethanol and sonicated for an additional 30 min. This process was repeated for a total of two washings (reducing the maximum possible free pNTP to ~356 pM) before a final centrifugation, solvent removal (to 20 μL) and resuspension in 50 wt % ethanol with a final maximum possible free pNTP concentration of ~18 pM. The 20 μL of the samples were randomly assigned to 20 microcentrifuge tubes and diluted with 20 μL of water (for a final maximum free pNTP concentration of ~9 pM if none of the pNTP was adsorbed, estimated positive control AgNP-adsorbed concentration 1 μM). The number and identity of the positive and negative controls were unknown to the analyst, who prior to measurement simultaneously agglomerated and deoxygenated the samples through the addition of $Na_2SO_3$ powder. Glass capillary tubes that were pre-filled with solutions of agglomerated and deoxygenated AgNP solutions were aligned with the Raman laser and dipped into the agglomerated sample solutions (6 cm from the incident light) and the Raman spectra were recorded and were assigned as positive and negative controls by the blind analyst. The sample assignments were compared to their identities and all samples (positive controls n=9, negative controls n=11) were correctly identified. For clarity, no spectra were generated for this blind testing.

Theoretical Interpretation for Computation Modeling

To understand how $Ag_2O$ and $O_2$ influence the SERS signal response, the electromagnetic field (E-Field) enhancement of the surface plasmon nanocavity was modelled, using the boundary element method (BEM) approach. The surface integral depends on the scalar and vector potentials of the interfacial charge and current, which are related to the frequency-dependent local dielectric function. The surface charges are hypothesized to be located at the centre of individual infinitesimal triangles (with index j).

The E-field is expressed as scalar and vector potentials, $\varphi$ (electric scalar potential) and A (magnetic vector potential), respectively:

$$E = ikA - \nabla\varphi \qquad (2)$$

After applying the boundary condition, the electric displacement (D) at the interface surface (s) of two media, 1 and 2, are proposed to be ($n_s$ normal vector and $\varepsilon_a$ the dielectric function of the medium a):

$$D^e = n_s \cdot [\varepsilon_1(ikA_1{}^e - \nabla_s\varphi_1{}^e) - \varepsilon_2(ikA_2{}^e - \nabla_s\varphi_2{}^e) \qquad (3)$$

The introduction of the compact matrix notation was adopted for the convolutions in space. The electric displacement in a system without oxygen or an oxide layer will be the sum of electric displacement over each interface of each AgNP, yielding:

$$D^e = n_{Ag\text{-}water} \cdot [\varepsilon_{Ag}(ikA_1{}^e - \nabla_s\varphi_1{}^e) - \varepsilon_{water}(ikA_2{}^e - \nabla_s\varphi_2{}^e)] \qquad (4)$$

In the equation, Ag denotes the AgNPs, $Ag_xO$ represents the oxide layer. In a system with an oxide layer, the electric displacement of each AgNP will be:

$$D^e = n_{Ag\text{-}Ag_xO} \cdot [\varepsilon_{Ag}(ikA_{Ag}{}^e - \nabla_s\varphi_{Ag}{}^e) - \varepsilon_{Ag_xO}(ikA_{Ag_xO}{}^e - \nabla_s\varphi_{Ag_xO}{}^e)] + n_{Ag_xO\text{-}water} \cdot [\varepsilon_{Ag_xO}(ikA_{Ag_xO}{}^e - \nabla_s\varphi_{Ag_xO}{}^e) - \varepsilon_{water}(ikA_{water}{}^e - \nabla_s\varphi_{water}{}^e)] \qquad (5)$$

When molecular oxygen ($O_2$) is present in the medium, each AgNP will have the following electric displacement:

$$D^e = n_{Ag\text{-}Ag_xO} \cdot [\varepsilon_{Ag}(ikA_1{}^e - \nabla_s\varphi_1{}^e) - \varepsilon_{Ag_xO}(ikA_2{}^e - \nabla_s\varphi_2{}^e)] + n_{Ag_xO\text{-}O_2} \cdot [\varepsilon_{Ag_xO}(ikA_{Ag_xO}{}^e - \nabla_s\varphi_{Ag_xO}{}^e) - \varepsilon_{O_2}(ikA_{O_2}{}^e - \nabla_s\varphi_{O_2}{}^e)] + n_{O_2\text{-}water} \cdot [\varepsilon_{O_2}(ikA_{O_2}{}^e - \nabla_s\varphi_{O_2}{}^e) - \varepsilon_{water}(ikA_{water}{}^e - \nabla_s\varphi_{water}{}^e)] \qquad (6)$$

Figure 6:
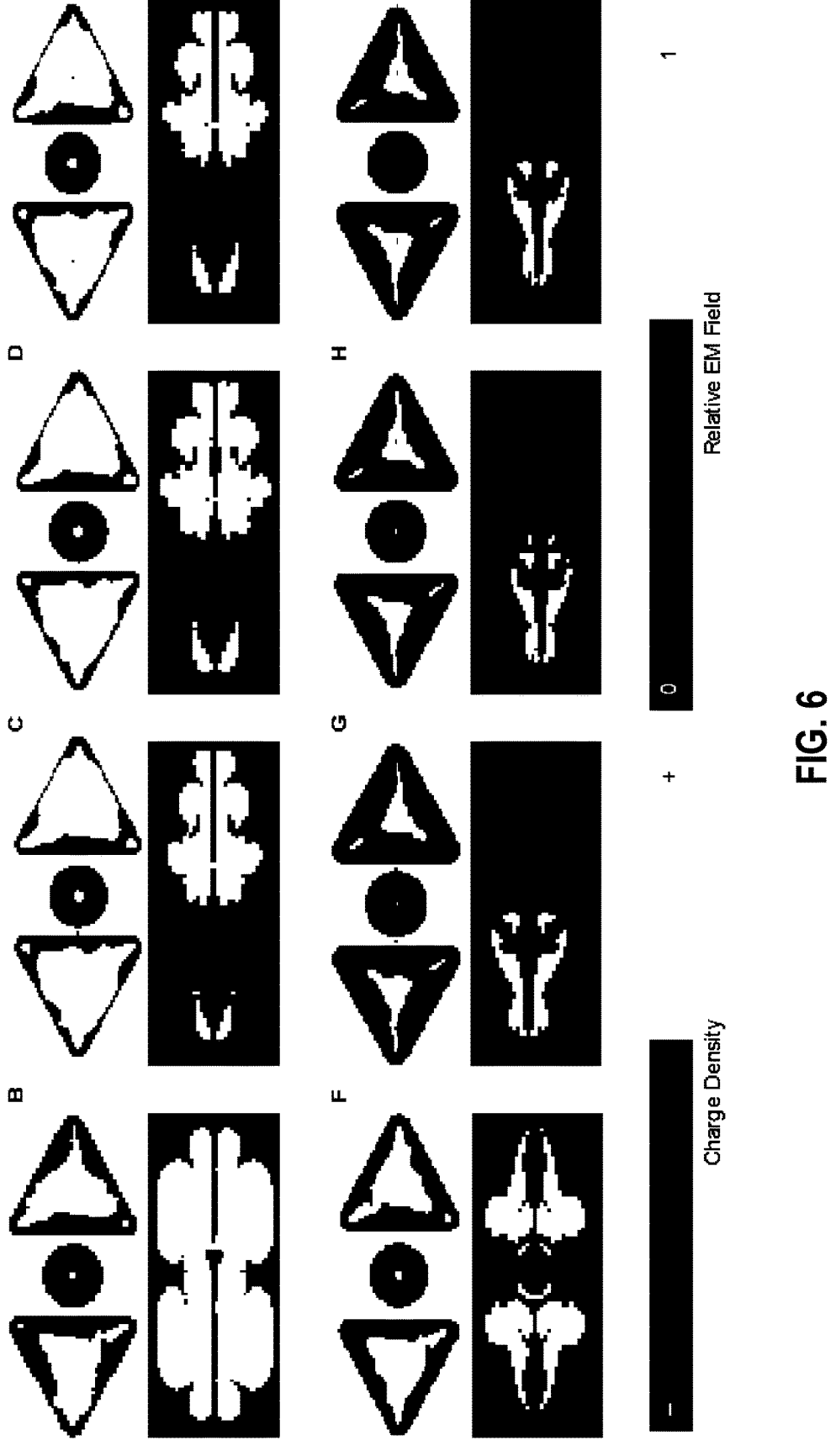
FIG. 6 shows surface plasmon coupling within and between silver nanoparticle aggregates. Specifically, in FIG. 6, the charge distributions (above) and electric field (below) are presented for irradiated silver nanoparticle aggregates under the following conditions: A) uncoated nanoparticles, B) uncoated nanoparticles with two oxygen molecules in the nanogaps, C) uncoated nanoparticles with an oxygen molecule bound on the left nanoparticle surface, D) uncoated nanoparticles with an oxygen molecule bound on each of the left and right nanoparticle surfaces E) Ag$_2$O-coated nanoparticles (2 nm thick), F) Ag$_2$O-coated nanoparticles with two oxygen molecules in the nanogaps, G) Ag$_2$O-coated nanoparticles with an oxygen molecule bound on the right nanoparticle, and H) Ag$_2$O-coated nanoparticles with an oxygen molecule bound on each of the left and right nanoparticles.

The skilled person would understand that detailed elaboration of the BEM method and its application for NP surface plasmons can be found in the literature. The dielectric coefficients for AgNPs, $Ag_xO$, oxygen, and water can also be found in the literature. The results of the modelling are shown in FIGS. 6 and 7, which are described above and below.

With respect to FIG. 7, it should be mentioned that electromagnetic field transmission is lost at 17 and 9.8 nm for pristine and silver oxide coated silver nanoparticles, respectively.

RESULTS AND DISCUSSION

Results and Discussion for Surface Enhanced Raman Spectroscopy of Prepared Samples and Single-Molecule Detection Probability Analysis For a first series of measurements, p-aminothiophenol solutions and p-nitrothiophenol solutions of varying concentrations were prepared with and without dissolved oxygen using the method defined above. AgNPs were used as the plasmonic material (SERS substrate) and sodium sulfite was used as the oxygen scavenger.

Figure 8A:
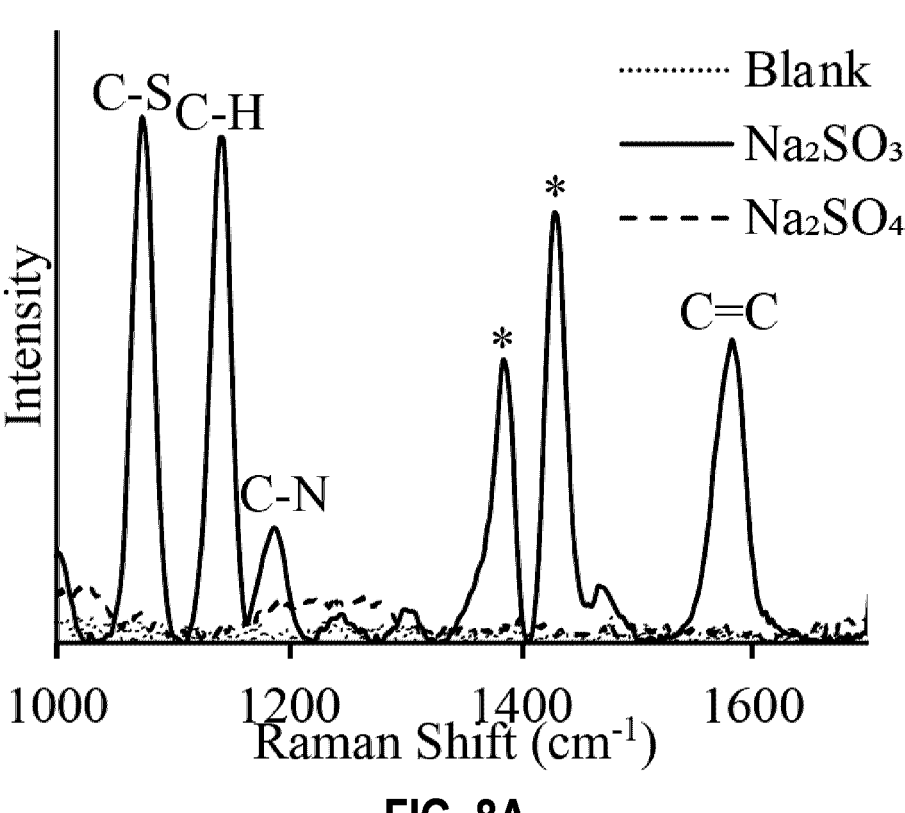
FIG. 8 shows surface enhanced Raman spectra in the presence and absence of dissolved oxygen; specifically.
Figure 8B:
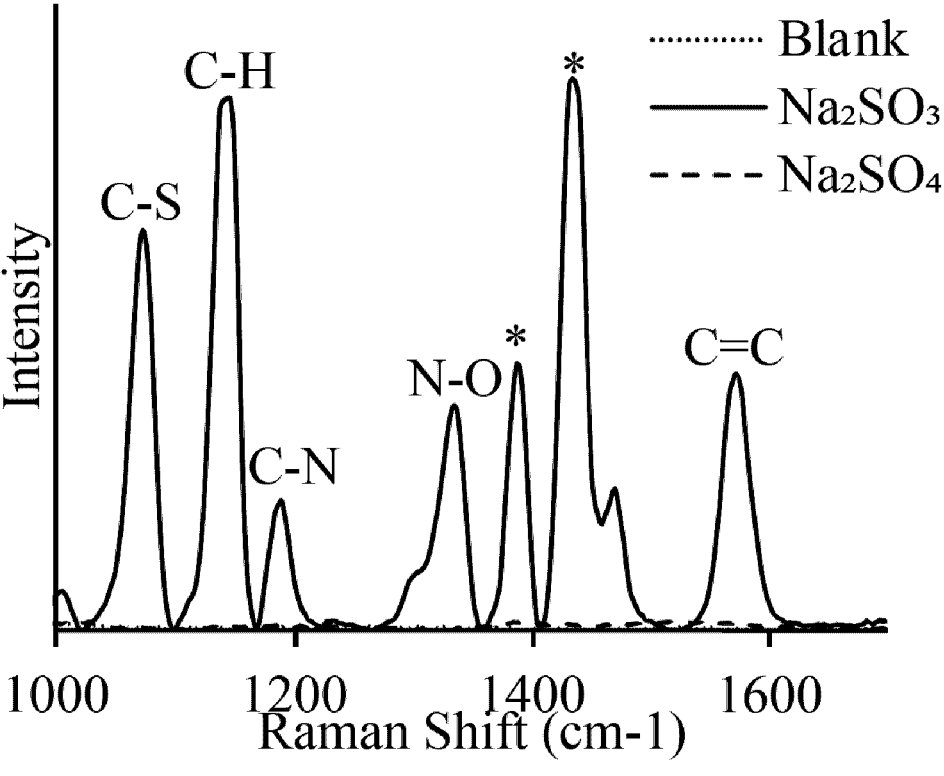
Figure 9A:
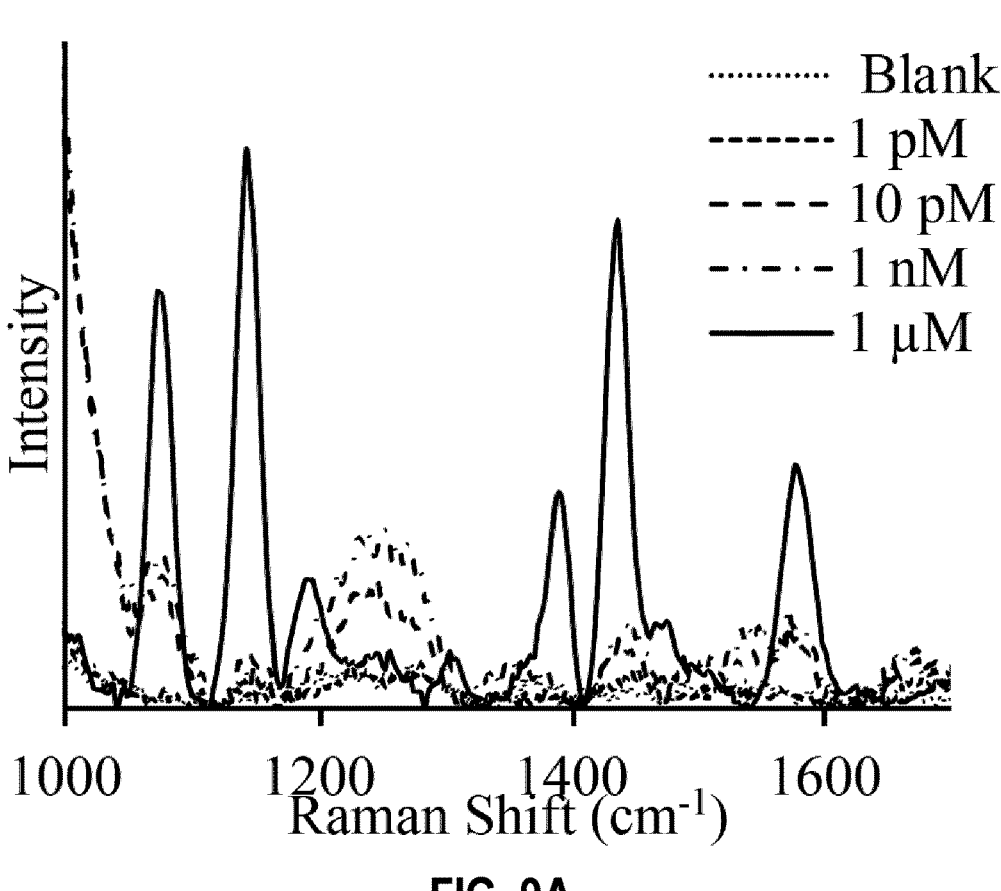
FIG. 9 shows the effect of oxygen scavenging on the limit of detection of surface enhanced Raman spectroscopy; specifically, FIGS. 9A) and B) show surface enhanced Raman spectra of varying concentrations of p-aminothiophenol without dissolved oxygen removal, and C) shows the intensity of the C-S stretching mode as a function of the logarithm of the concentration.
Figure 9B:
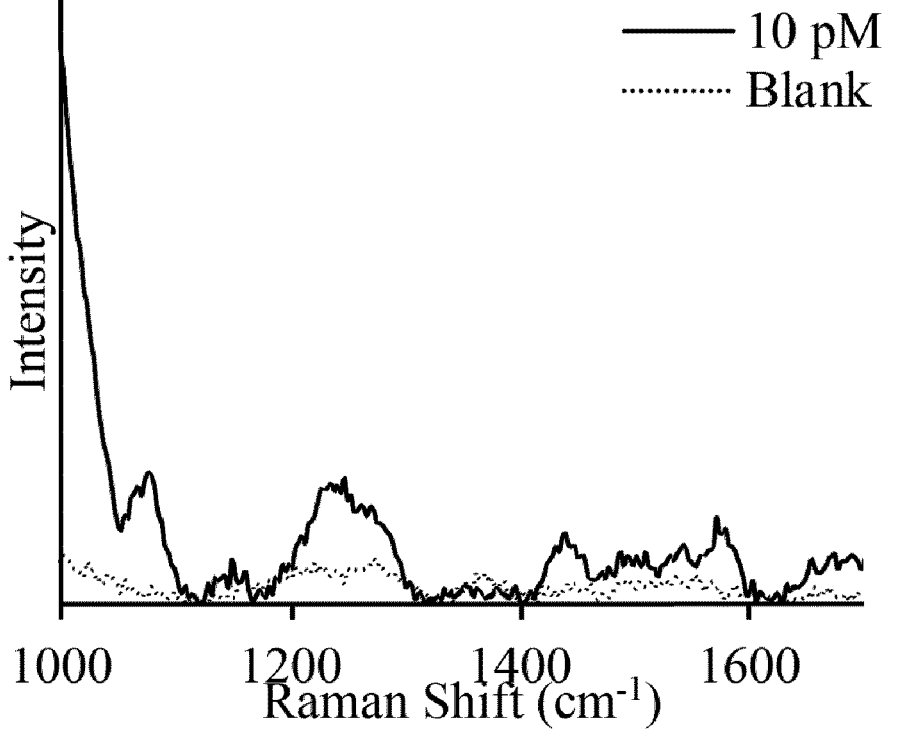
Figure 9C:
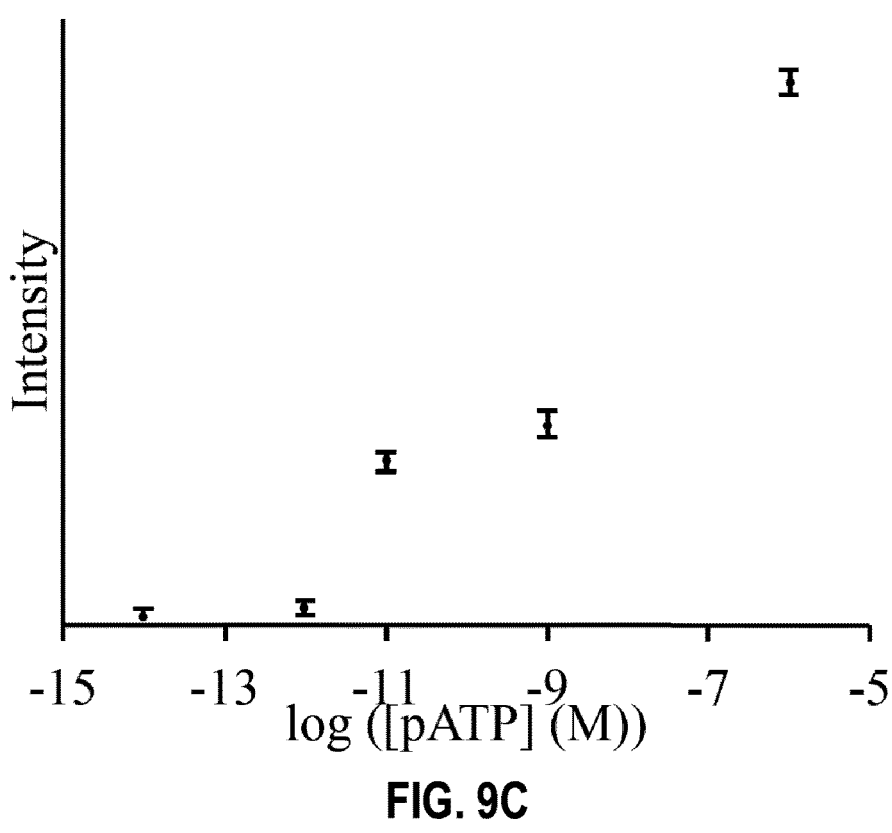
Figure 9D:
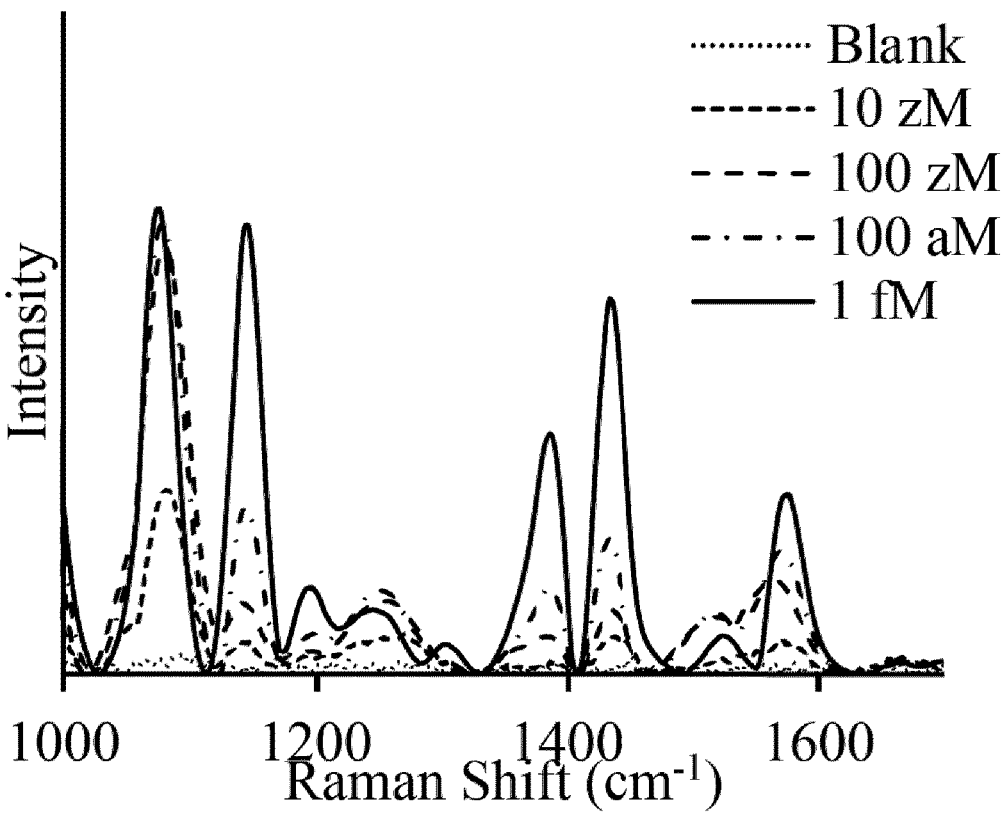
Figure 9E:
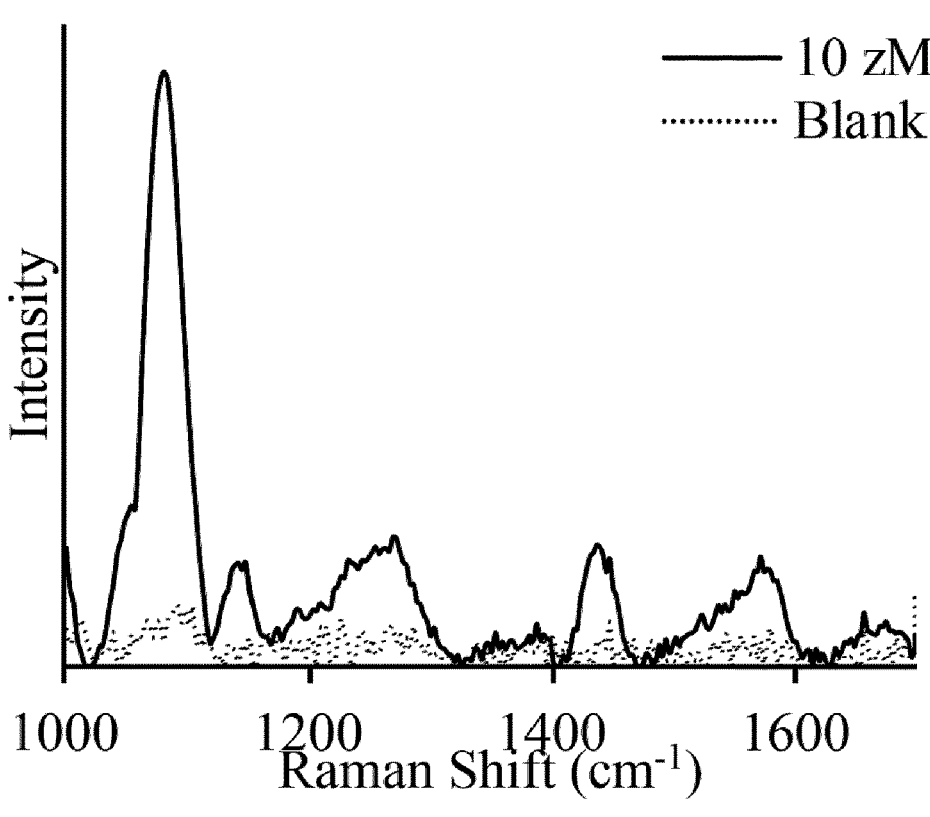
Figure 9F:
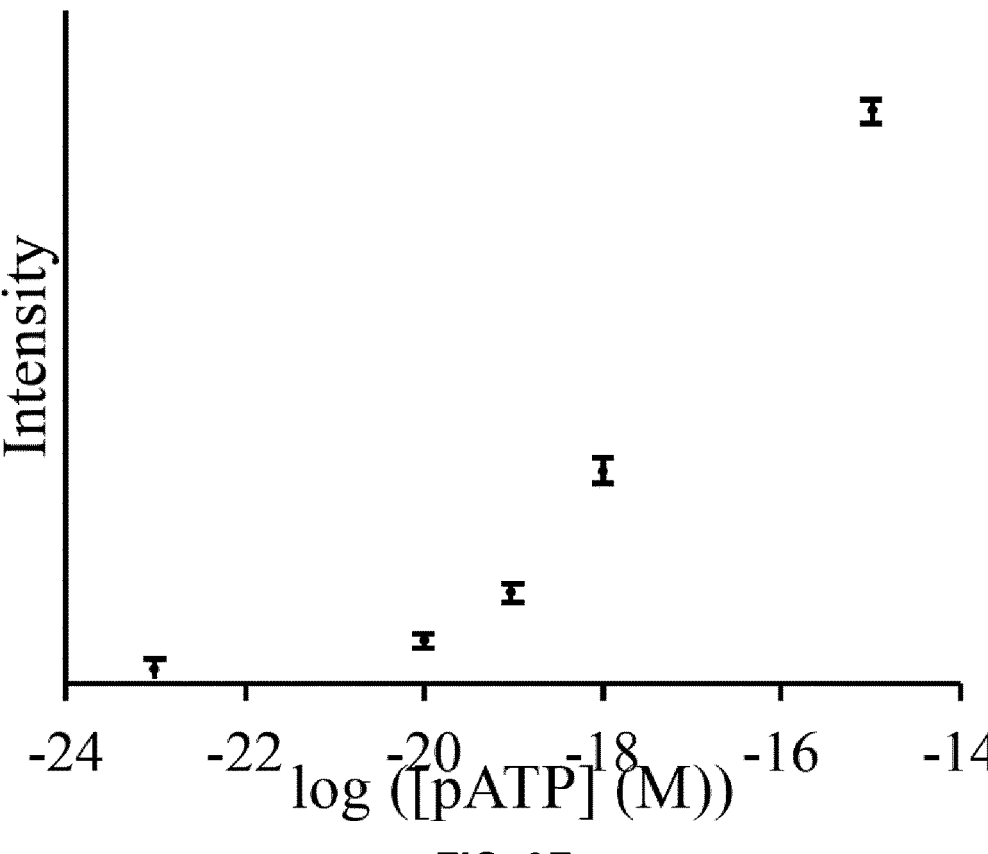
Figures 9G, 10A:
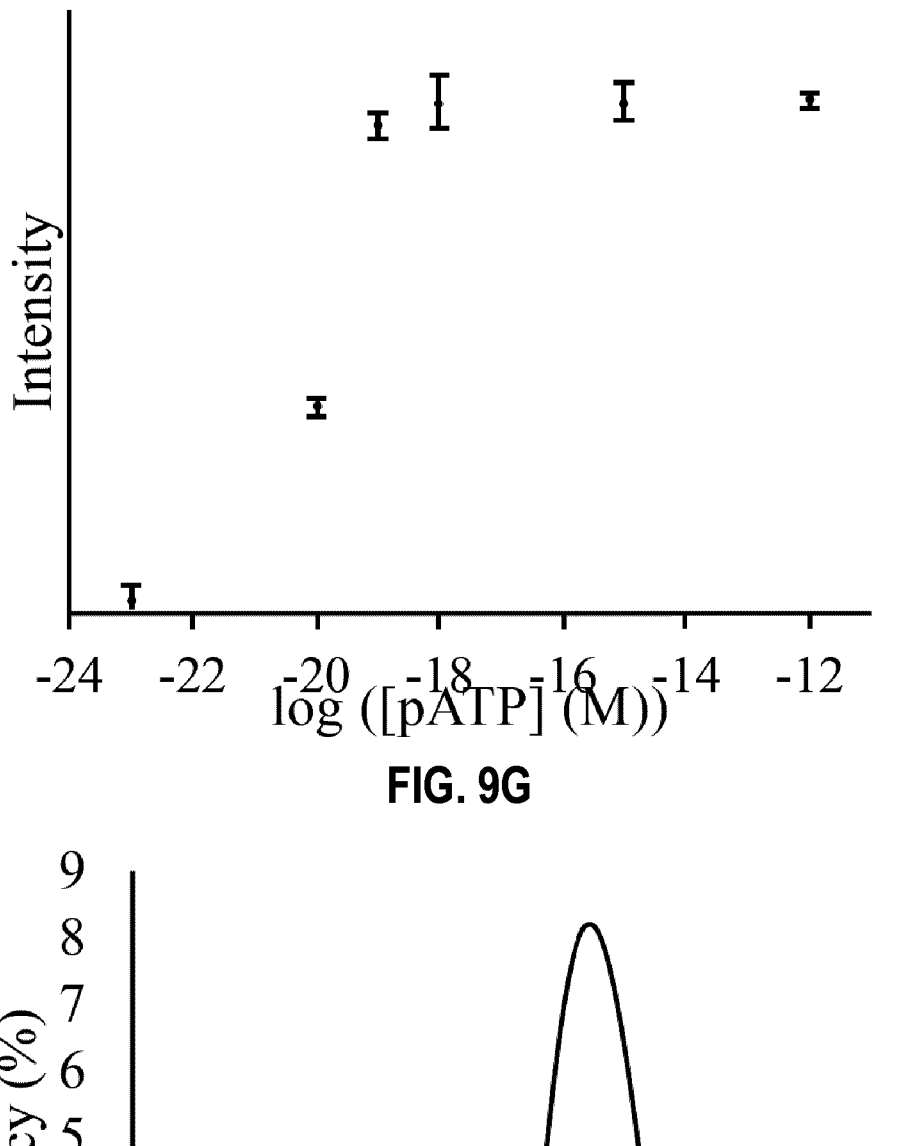
FIG. 10 shows silver nanoparticle characteristics and surface enhanced Raman interference with analytes by citrate <1000 cm-1. Specifically, FIG. 10 A) shows silver nanoparticle size distribution as measured via dynamic light scattering. Furthermore, in FIG. 10, the Raman spectra of B) the silver nanoparticles and the analytes C) p-aminothiophenol and D) p-nitrothiophenol are shown.
Figure 10B:
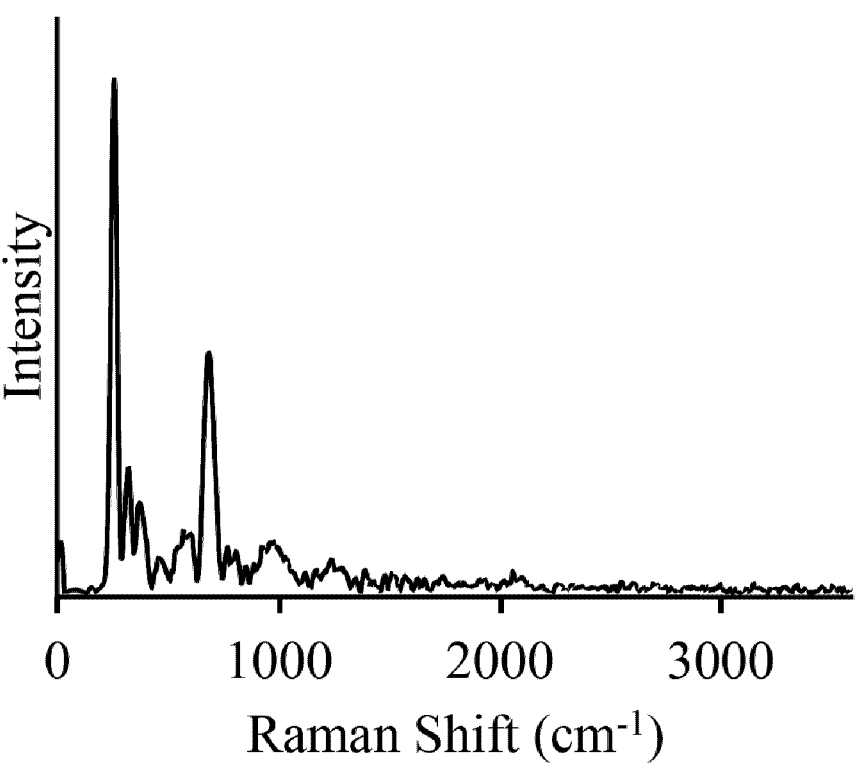
Figure 10C:
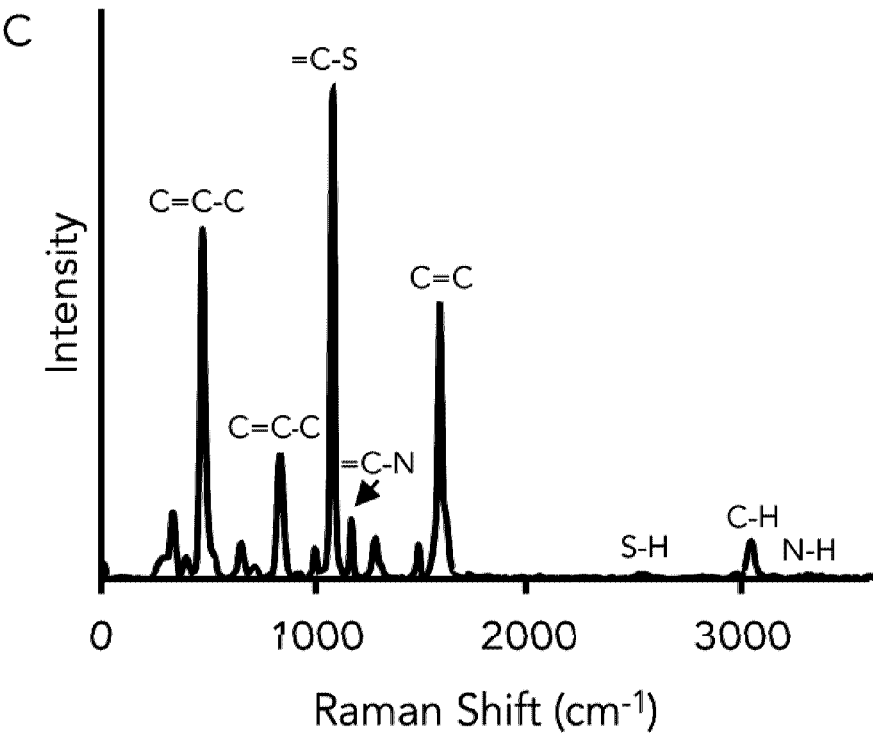
Figure 10D:
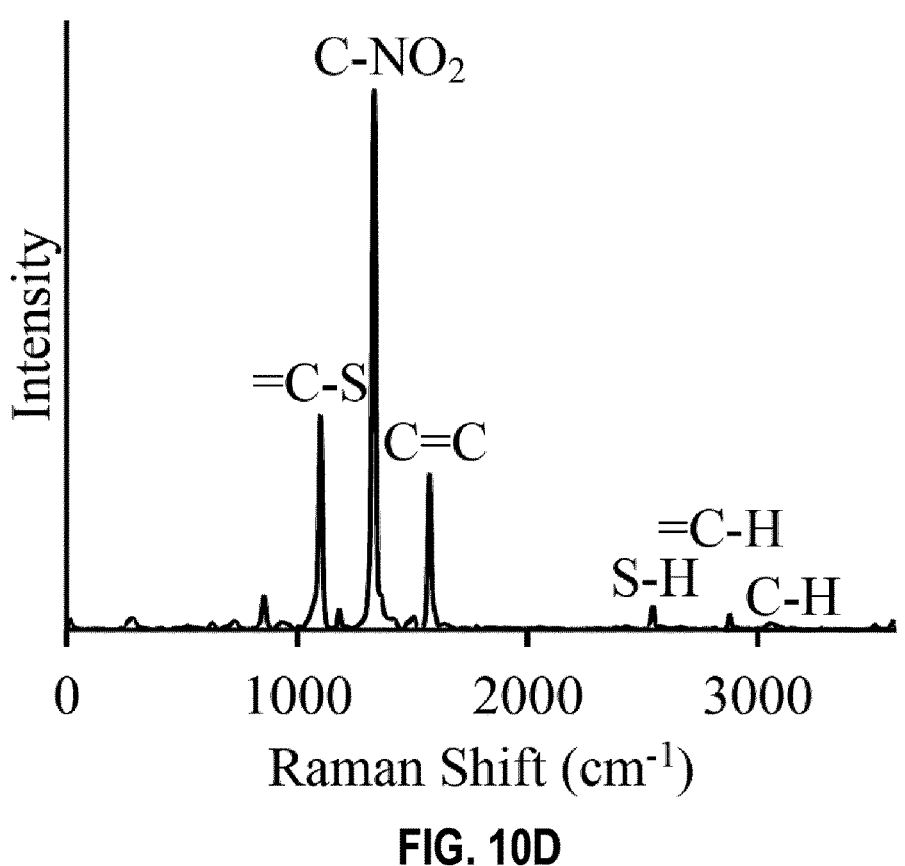

In FIG. 8, the spectra labelled as "Blanks" is for a sample containing 7 nM of AgNPs (which, as stated above, were prismatic, with an average size of 17 nm) agglomerated with $Na_2SO_3$. The liquid samples for the spectra labelled "$Na_2SO_3$" (deoxygenated using 10 mg of sodium sulfite) and $Na_2SO_4$ (containing 10 mg sodium sulfate, and therefore containing dissolved oxygen) each contain 1 fM of analyte, with $Na_2SO_3$ or $Na_2SO_4$ serving as the agglomerant. As stated above, spectra were recorded in 5×100 mm quartz NMR tubes that were irradiated with a solid-state Nd-YAG laser (785 nm, line width <3.2 cm$^{-1}$ 500 mW, beam diameter 2.5 μm). Backscattered (180°) light was collected by a standard Sunshine TG-Raman fibre spectrometer. All spectra were presented as the average of three measurements consisting of 1505 points each (integration time=100 ms). The analytes are p-aminothiophenol (FIG. 8A) and p-nitrothiophenol (FIG. 8B).

In FIG. 9, the same measurement parameters were used as in FIG. 8, but with a variety of analyte concentrations of p-aminothiophenol. The parameters of the measurements taken for FIG. 9 were otherwise the same as for FIG. 8. The spectra in FIGS. 9A-C were for samples containing dissolved oxygen (10 mg of sodium sulfate), while the spectra in FIGS. 9 D-F were for samples that had been deoxygenated using 10 mg of sodium sulfite. Please note that FIGS. 9B and 9E merely show isolated spectra from FIGS. 9A and 9D, respectively.

By using thiophenols, i.e., p-aminothiophenol (pATP) and p-nitrothiophenol (pNTP), as the main analytes and prismatic AgNPs as the plasmonic material (SERS substrate) for proof-of-principle studies, it was observed that the SERS spectra of aqueous pATP and pNTP increased dramatically after DO removal using sodium sulfite ($Na_2SO_3$, see FIGS. 8 and 9, described in more detail above). It should be mentioned that the peaks in FIG. 8 are associated with in-plane deformation of the aromatic ring, and that at higher concentrations these peaks overlap with the N═N bands of the azo dimer.

As mentioned, for all experiments, unless stated otherwise, triangular prismatic AgNPs were used. For all experiments performed, unless mentioned otherwise, sodium sulfite serves as the DO scavenger, which simultaneously agglomerates the AgNPs by screening their surface charges from the citrate capping agent (sodium sulfate, $Na_2SO_4$, was used as the control against sodium sulfite for agglomerating AgNPs in aerobic, i.e., non-deoxygenated, experiments); the spectral window was limited to $\geq 1000$ cm$^{-1}$ because of overpowering signals from citrate (see FIGS. 4 and 10, described in more detail above).

As mentioned, FIG. 4 shows transmission electron micrographs of AgNPs deposited on copper grids; FIGS. 4 a) and b) are before agglomeration and c) and d) are after agglomeration with 10 mg of sodium sulfite and extensive rinsing to remove salt crystals.

FIG. 10 a) shows AgNP size distribution via dynamic light scattering, while FIGS. 10 *b-d* show the Raman spectra for b) AgNPs, c) p-aminothiophenol, and d) p-nitrothiophenol. Specifically, FIG. 10B is the blank spectrum of the prepared AgNPs, where the large peaks are associated with the citrate capping agent. FIGS. 10C and D are the Raman spectra of pATP and pNTP at high concentrations (100 mM) to demonstrate which peaks could be used for detection (it should be noted that peaks below 1000 cm$^{-1}$ are obscured by the strong signals of surface bound citrate).

The limit of detection (LOD) for pATP reached 10 zM (compared to 10 pM in aerobic samples, a $10^9$ increase in sensitivity) based on its C-H bending (1135-1142 cm$^{-1}$) and C-S stretching (1070-1080 cm$^{-1}$) bands (although not all vibrational modes are equally sensitive and some became undetectable as the analyte concentration dropped).

Figure 11A:
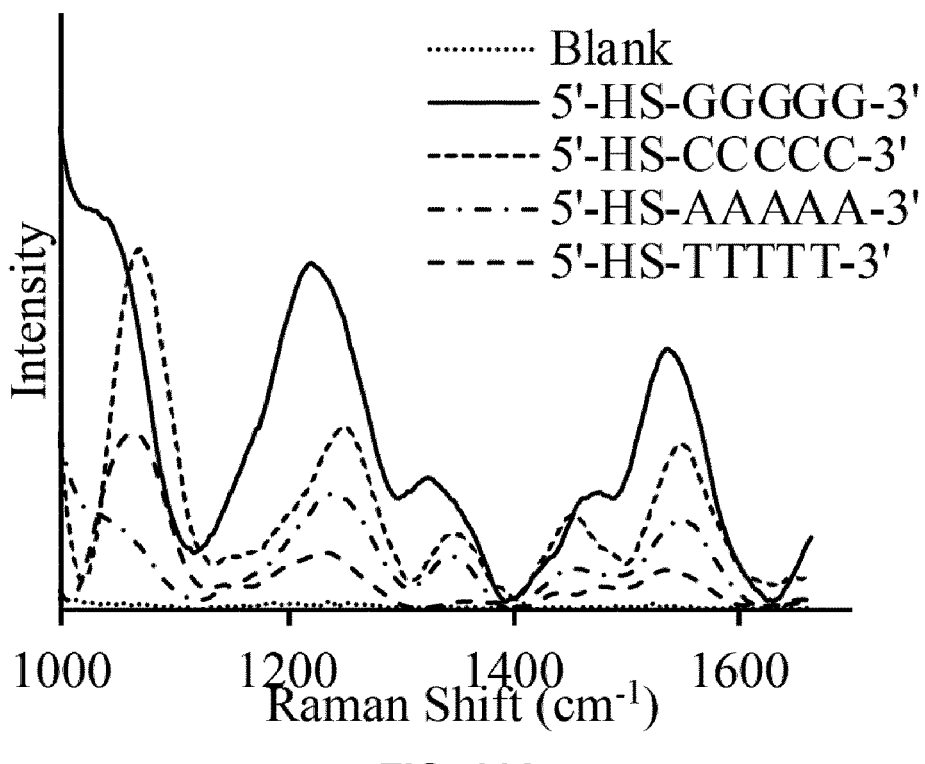
FIG. 11 shows the scope of sensitivity enhancement by dissolved oxygen removal; specifically.
Figure 11B:
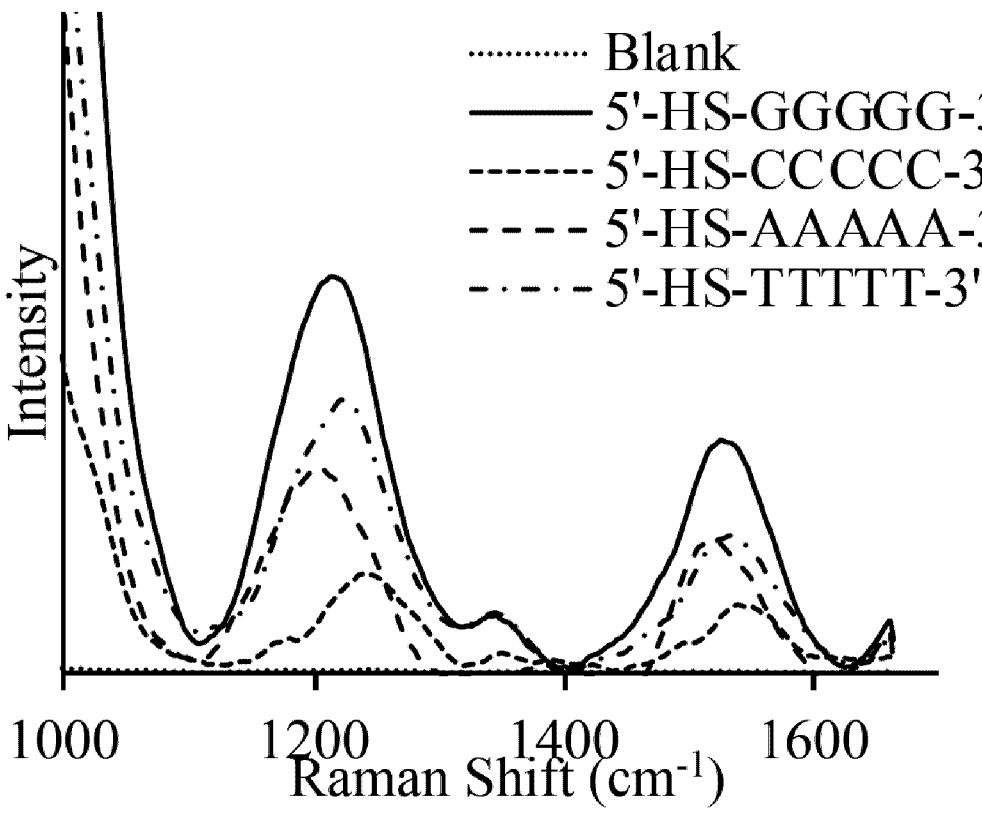

A similar SERS enhancement factor (EF) increase was observed for other analytes, i.e., four homopolymer oligoDNA sequences prepared using the method described above (see FIGS. 11A and B, described in more detail above). Specifically, FIGS. 11A and B show SERS spectra of oligonucleotides using the same measuring parameters as used in FIG. 8 for oxygenated (10 pM of analyte) and deoxygenated (8 zM of analyte) samples, respectively.

Figure 12A:
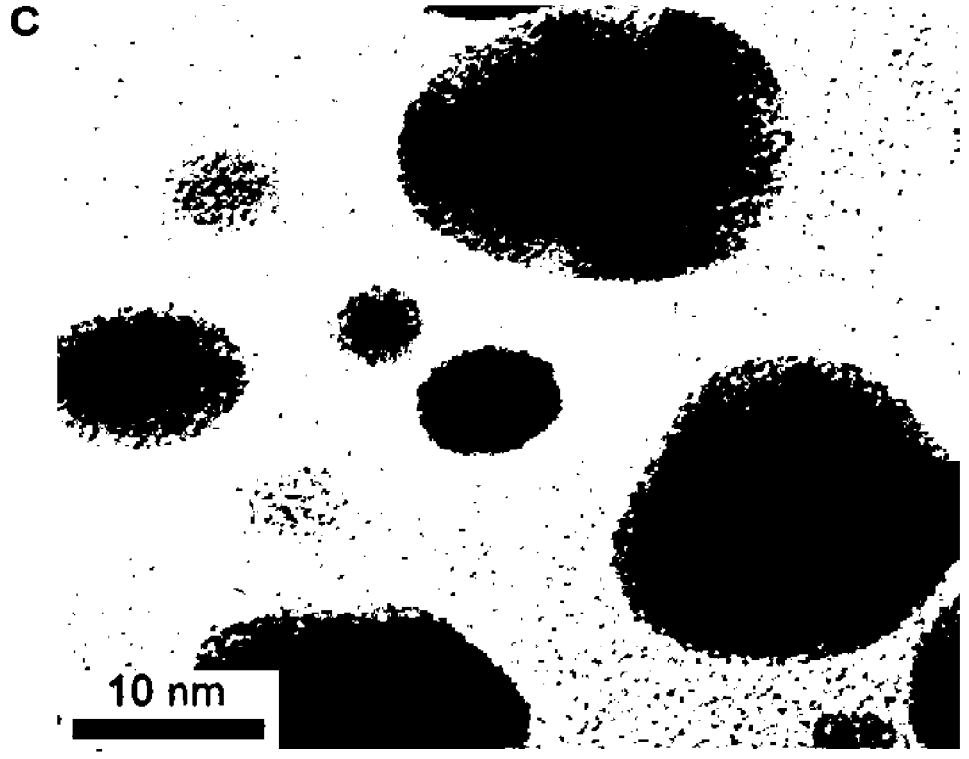
FIG. 12 shows A) a transmission electron micrograph of spherical silver nanoparticles and B) the oxygen removal dependent signal enhancement of adsorbed p-aminothiophenol (on spherical nanoparticles).
Figure 12B:
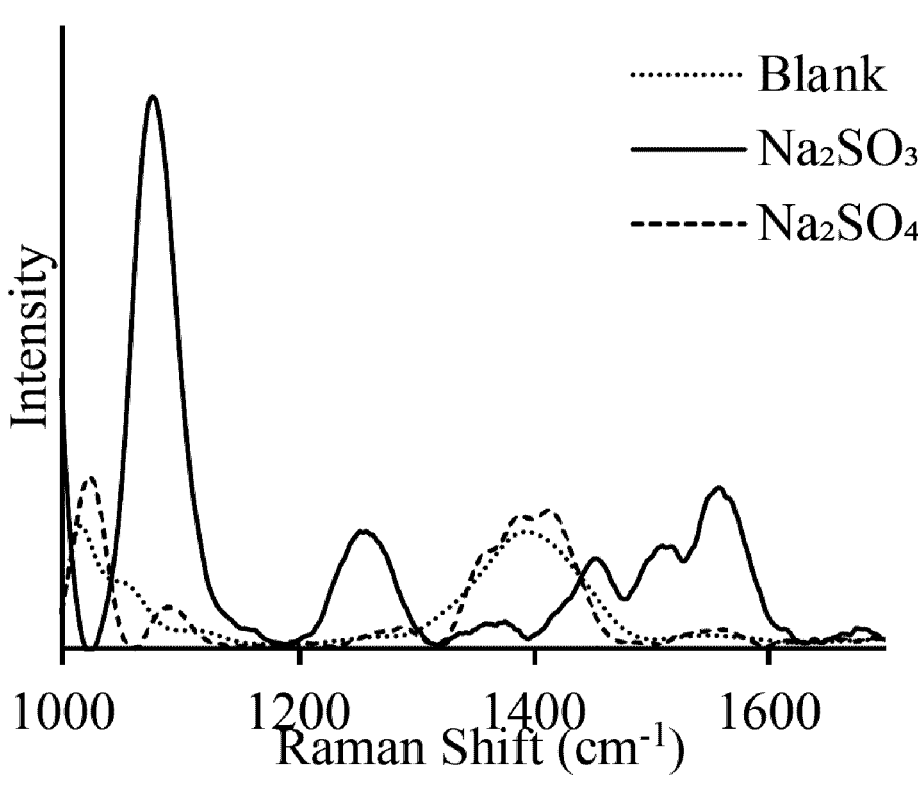

Similar results were observed when spherical rather than prismatic AgNPs were used. The DO concentration (measured electrochemically) was negatively proportional to the SERS signal intensity, regardless of whether chemical oxygen scavenging, e.g., sodium sulfite, hydrazine, or ascorbate, or physical removal using inert gas, e.g., $N_2$ or Ar, sparging, was used (see FIGS. 12, 13, and 14 described in more detail above). In FIG. 12B (with FIG. 12A showing a TEM of spherical AgNPs), the SERS spectra were obtained using the same measurement parameters as used in FIG. 8, except with spherical AgNPs instead of prismatic AgNPs.

Figure 13A:
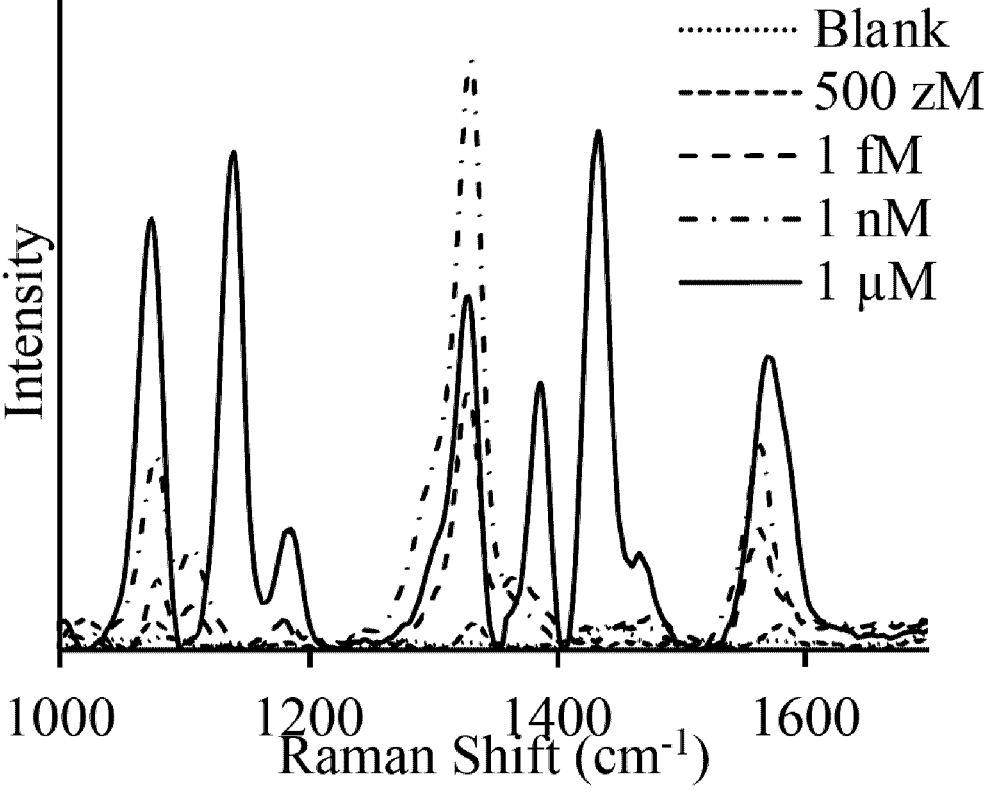
FIG. 13 shows surface enhanced Raman spectra of varying concentrations of p-nitrothiophenol with oxygen removal by A) ascorbic acid and B) hydrazine.
Figure 13B:
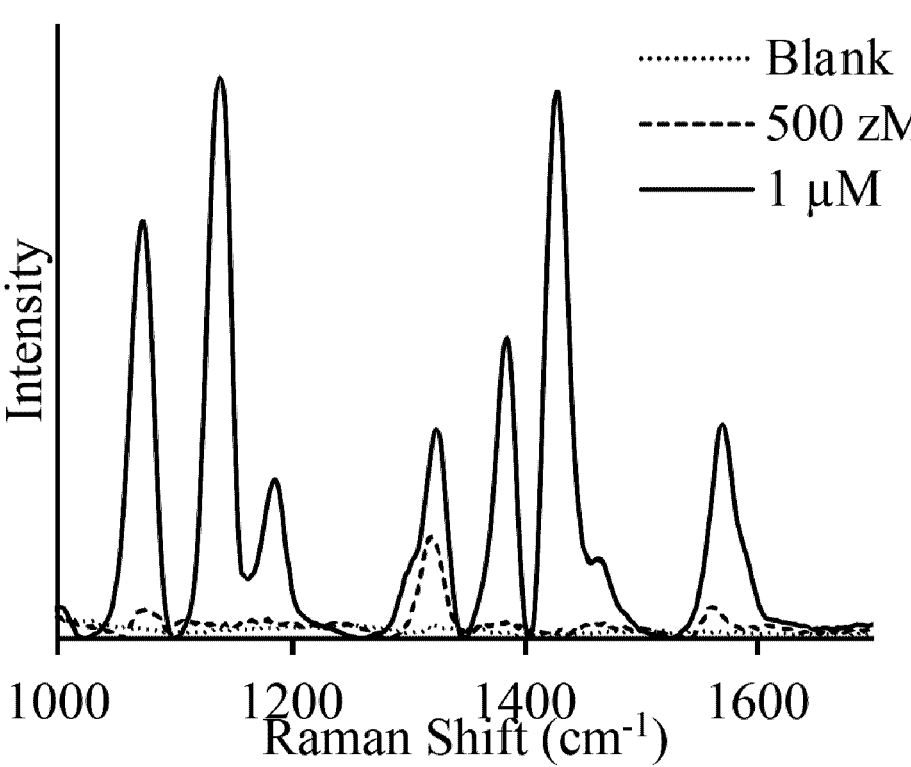

In FIGS. 13A and B, various SERS spectra were obtained using the same measurement parameters as used in FIG. 8, but with a variety of analyte concentrations of p-nitrothiophenol, and using a different oxygen scavenger. Specifically, FIG. 13A shows a SERS spectra for pNTP deoxygenated using 10 mg of ascorbic acid, while FIG. 13B shows a SERS spectra for pNTP deoxygenated by hydrazine (50 mM).

Figure 14A:
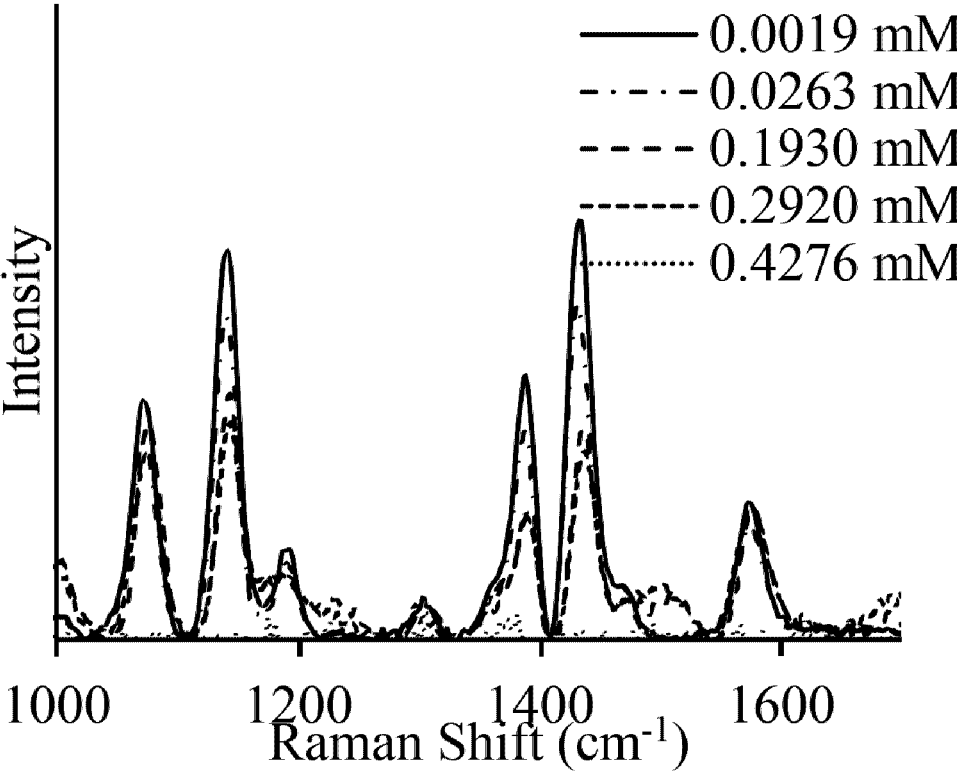
FIG. 14 shows the correlation between dissolved oxygen concentration and surface enhanced Raman scattering intensity. Specifically.

In FIGS. 14A and B, the SERS spectra were obtained using the same measurement parameters as used in FIG. 8 (with analyte pATP concentration of 100 fM), except measurements were performed in an electrochemical system to monitor oxygen concentrations, and different amounts of oxygen scavenger ($Na_2SO_3$) were used in order to test various DO concentrations.

Figures 14B, 14C:
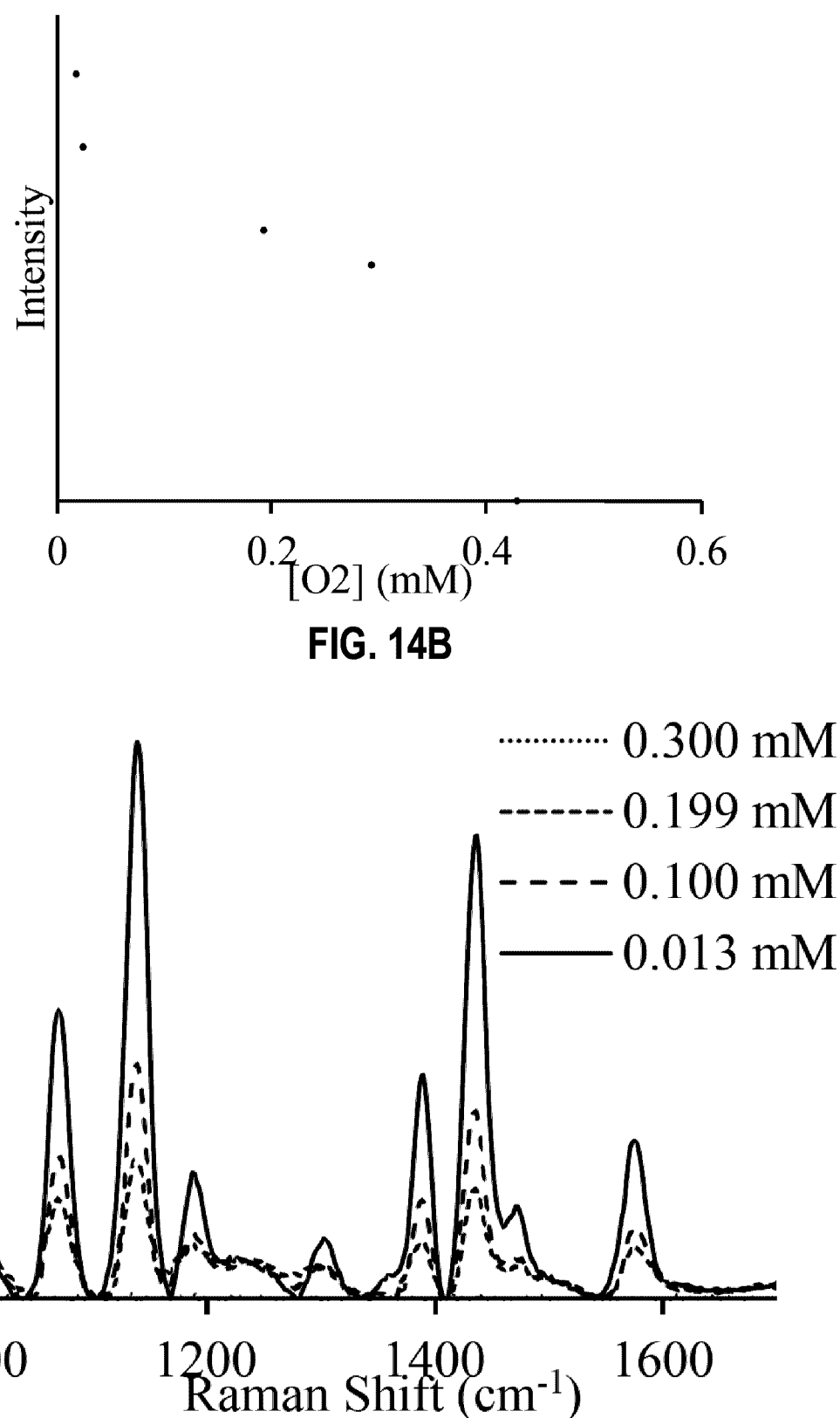

Similarly, in FIGS. 14C and D, the SERS spectra were obtained using the same measurement parameters as used in FIG. 8 (with analyte pATP concentration of 100 fM), except measurements were performed in an electrochemical system to monitor oxygen concentrations, and argon gas sparging was used instead of an oxygen scavenger. In order to test various DO concentrations, the sparging time was incrementally increased.

From FIG. 13, it can be seen that hydrazine and ascorbate enabled the same zM LOD for pNTP as $Na_2SO_3$. As can be seen in FIG. 14, while argon sparging did remove DO and increase the SERS signal intensity, the level of DO removal was still significantly lower than the maximum achieved using oxygen scavengers. It should also be mentioned that the spectra obtained in FIG. 14C using the lowest oxygen concentration (0.013 mM, almost an order of magnitude higher than the 0.0019 mM DO concentration obtained using $Na_2SO_3$) took 20 min of argon sparging with concurrent ultrasonication. As mentioned, in FIG. 14, the dissolved oxygen concentration was measured electrochemically. Further, in FIG. 14, the average of three spectra is presented and the standard deviation of the data in B) and D) are smaller than the data markers.

Figures 14D, 15A:
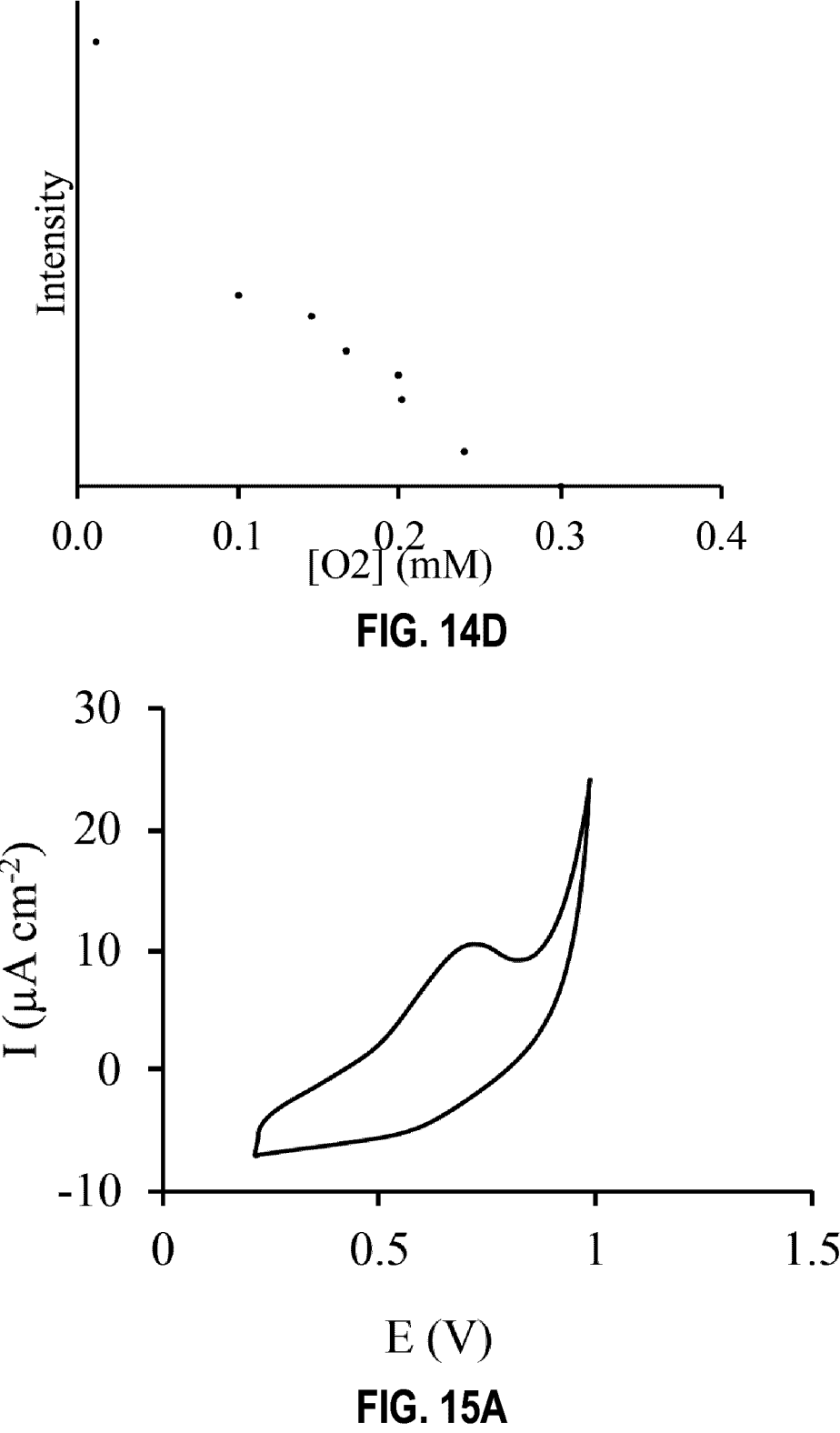
FIG. 15 shows the effect of dielectric oxide surfaces on oxygen removal enhancement of surface enhanced Raman spectroscopy; specifically.
Figures 15B, 15C:
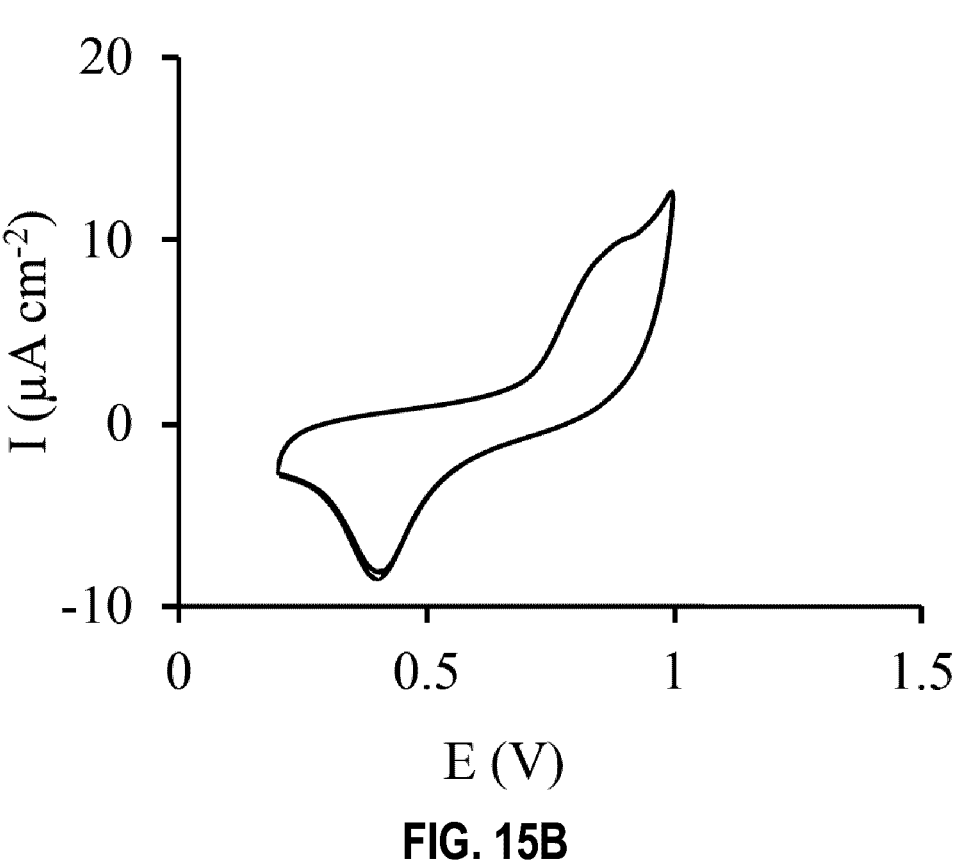

The effect of AgNP surface oxidation on SERS enhancement was examined (FIG. 15, described in more detail above), because DO removal also decreased $Ag_2O$ formation on AgNP surfaces compared to aerobic (i.e. non-deoxygenated) samples. FIG. 15A shows a voltammogram of Ag+(obtained through the addition of $Ag_2NO_3$), while FIGS. 15B and C show voltammograms of AgNPs in a sample containing DO and in a sample that has been deoxygenated using 10 mg of sodium sulfite, respectively.

Figure 16A:
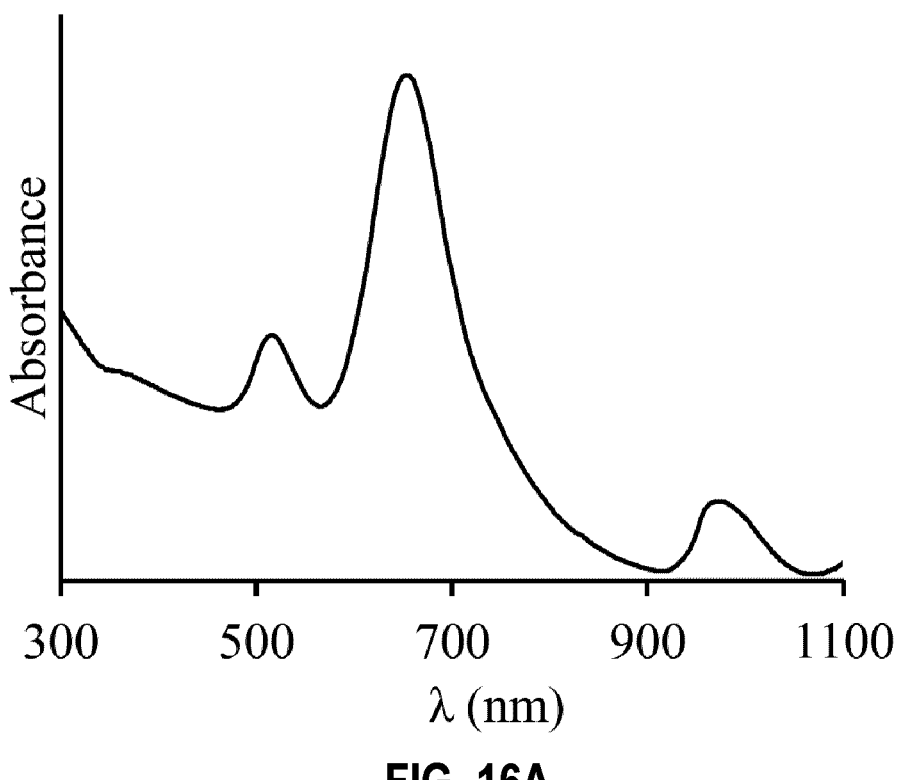
FIG. 16 A) shows the absorbance spectrum of gold nanorods and B) their surface enhanced Raman spectra in the presence and absence of dissolved oxygen (the Raman spectrum of the cetyltrimethylammonium bromide (CTAB) capping agent is given for reference).
Figure 16B:
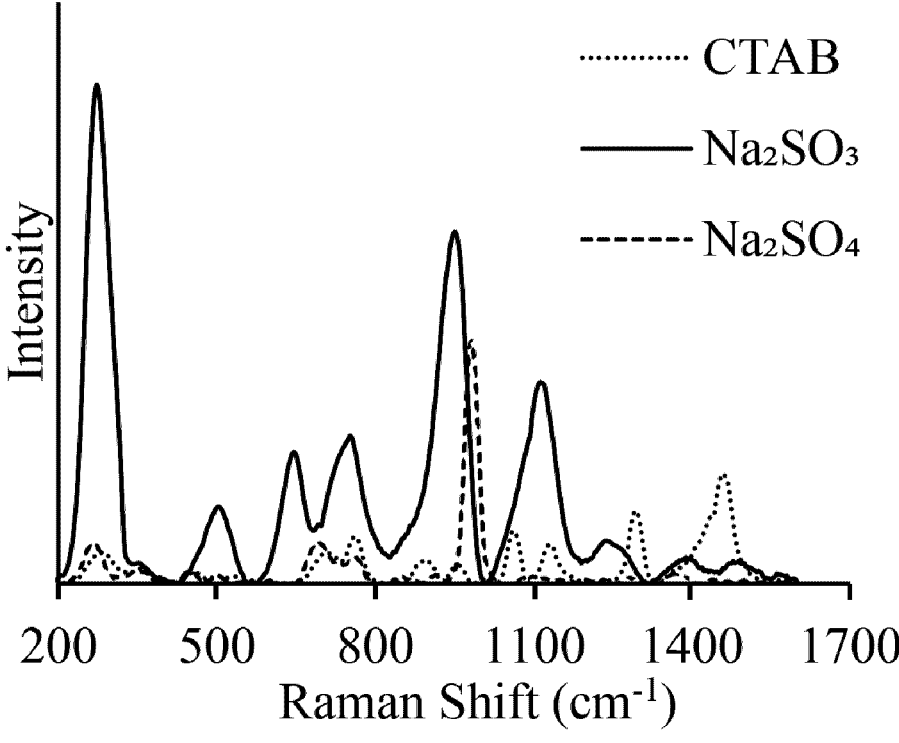

Similarly, FIG. 16A shows a UV-Vis spectrum of gold nanorods (AuNRs), while FIG. 16B shows a SERS spectrum of cetyltrimethylammonium bromide (CTAB) with and without oxygen removal on AuNRs, and the Raman spectra of concentrated CTAB (100 mM). For clarity, the spectra labelled "$Na_2SO_3$" is for a sample that has been deoxygenated using 10 mg of sodium sulfite and the spectra labelled "$Na_2SO_4$" contains 10 mg of sodium sulfate, and therefore contains dissolved oxygen. Further, the amount of CTAB in the samples with spectra labelled "$Na_2SO_3$" and "$Na_2SO_4$" was equivalent to the residual surface CTAB on the commercially supplied AuNRs.

Figures 17A, 17B:
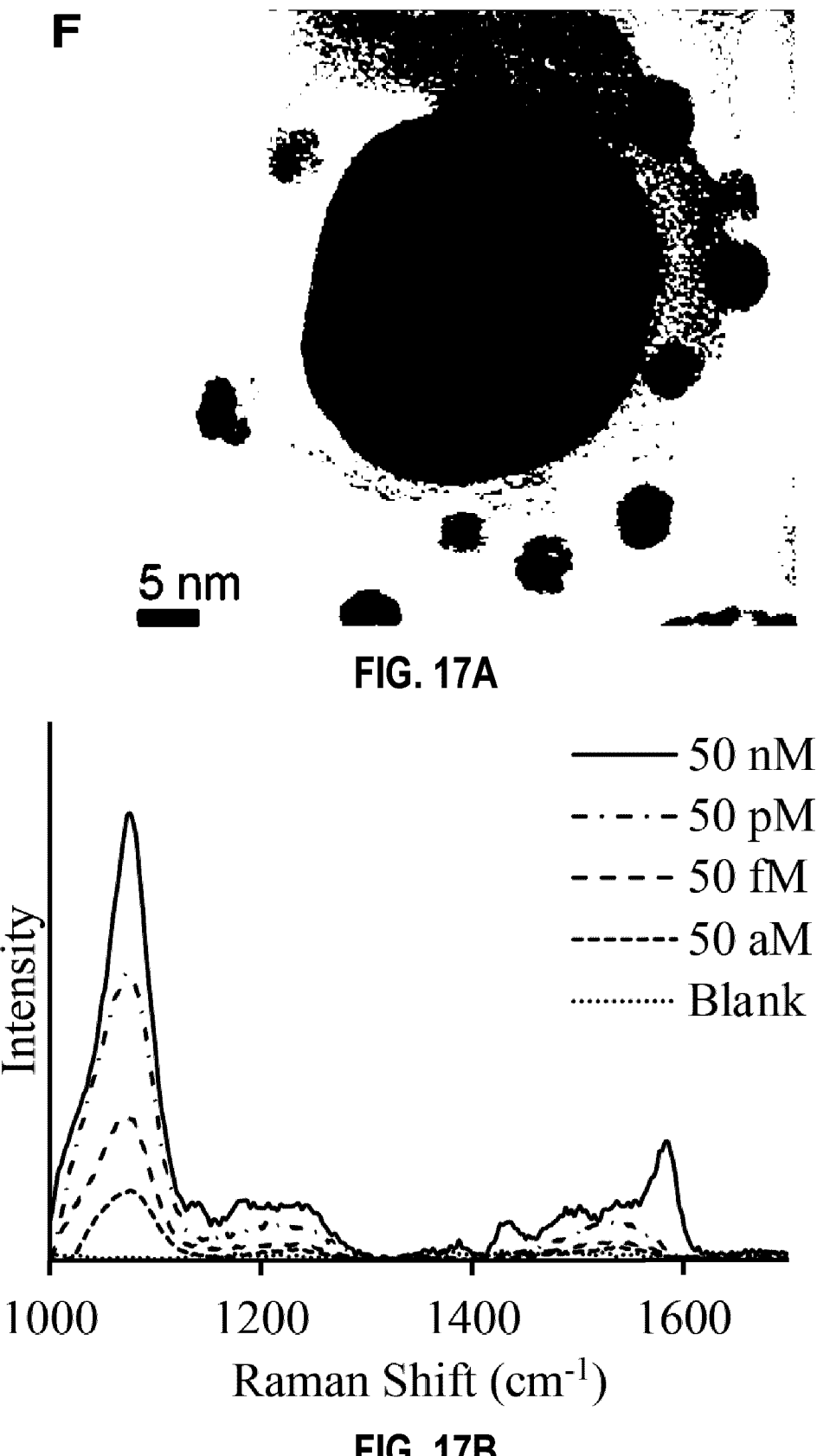
FIG. 17 A) shows transmission electron micrographs of silica coated silver nanoparticles and B) their surface enhanced Raman spectra obtained upon oxygen removal in the presence of p-aminothiophenol and C) with 50 aM of p-nitrothiophenol for reference.
Figure 17C:
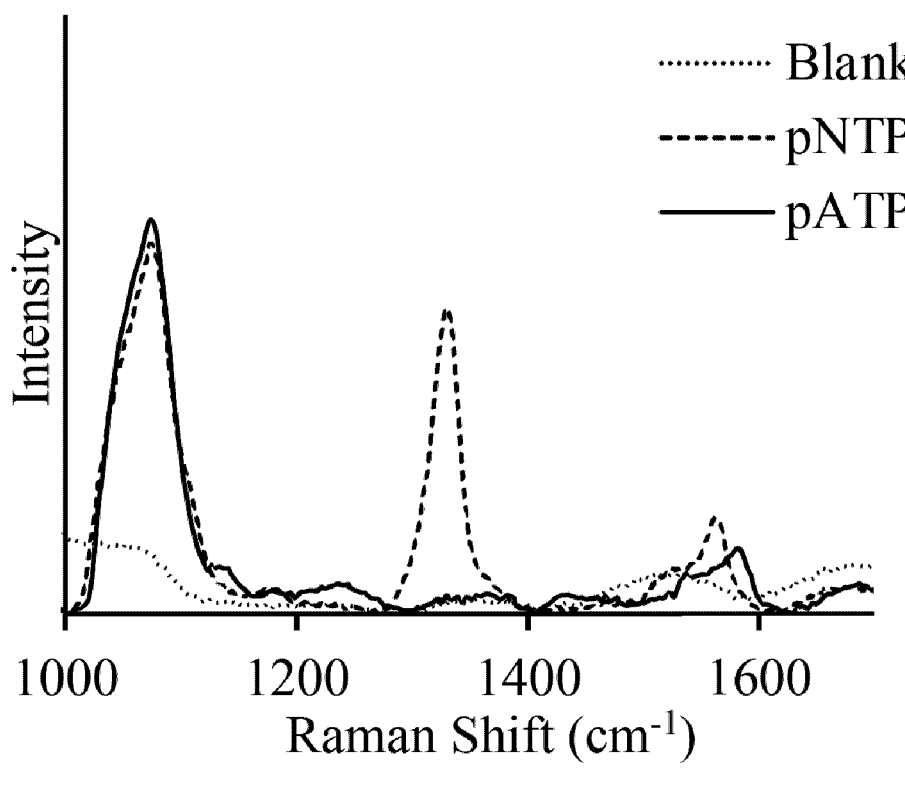

As stated, FIG. 17A shows a TEM of silica coated AgNPs, while FIG. 17B shows SERS spectra of pATP on deoxygenated agglomerated silica coated AgNPs (at pH 4) at a variety of concentrations, and FIG. 17C shows SERS spectra of pATP (50 aM) and pNTP (50 aM) on deoxygenated agglomerated silica coated AgNPs (at pH 4).

Based on these results, it appears that dielectric oxide layer formation (in this case, $Ag_2O$ formation) is a minor factor compared to the presence of DO. Signal enhancement was also observed when using silica coated AgNPs, i.e., the SHINERS technique, where the LOD decreased from 500 nM to 50 aM ($10^{10}$ times). Although the overall sensitivity of silica coated AgNPs is $10^4$ times lower than naked AgNPs, DO, rather than the surface oxide layer, appears to be the main factor quenching the SERS signal ($10^{10}$ vs $10^4$ times), i.e., the relative signal enhancement upon DO removal is always $10^0$-$10^{10}$ times although absolute sensitivities are particle dependent. By using AuNRs and silica coated AgNPs, the effects of DO from that of surface oxidation were decoupled.

This discovery challenges the conventional understanding of SERS where the analyte must be simultaneously irradiated and within the field-of-view of the detector. As the laser beam is so narrow (2.5 µm if collimated), the probability of the analyte being irradiated was $5.4 \times 10^{-8}$:1 based on the volume ratio of the light path to the sample and assuming the analyte is homogeneously distributed within the liquid sample. As this is almost zero, the analyte should be undetectable based on conventional SERS theory. However, numerous independent analyses were performed at the zM level (n>300 by different analysts on different days, with AgNPs prepared in different batches, including blind experiments, discussed above), and consistently reproducible results were obtained. As previously mentioned, to verify if the single molecule detection was real, a statistical analysis was performed on two sets of 100 samples at concentrations where the probability of a single molecule in the total sample volume was <1. The expected and actual detection frequencies were compared using Fisher's exact test, which determined there was no statistically significant difference between the measured and expected detection frequencies (p=0.57 and 0.48 for 60% and 12% probability of detection, respectively).

Based on these observations, oxygen removal appears to yield effective coupling of the SERS field and this plasmonic coupling enables the propagation of the electromagnetic (EM) field throughout the liquid sample volume without significant signal energy loss. The plasmonic field generated upon photoexcitation of AgNPs transports throughout the sample to reach the AgNP with the adsorbed analyte and returns the Raman scattering signal of the analyte to the detector. Without DO removal, the high electron affinity of oxygen traps electrons and prevents the effective generation, coupling, propagation, and integration of the SERS field among AgNPs and their aggregates, which was observed experimentally and through computational modelling. However, DO removal enables the plasmonic coupling of plasmonic material (in this case, AgNP aggregates) and SERS field transport.

The plasmonic field was computed around a model AgNP aggregate that showed the expected plasmonic coupling between the nanoparticles, which was intensified within the nanogaps (see FIGS. 6 and 7, described in more detail above). Molecular oxygen suspended in the nanogaps or adsorbed on AgNP surfaces yielded charge redistribution and quenching of the plasmonic field and coupling. When modelling $Ag_2O$-coated nanoparticles, the plasmonic field was somewhat reduced, but the introduction of DO markedly quenched the EM field and prevented coupling. The DO quenching effect was independent of representative parameters characteristic to nanogaps, including the distances of the nanogaps, the number of the nanoparticles in the nano-aggregate (2, 3, and 4 AgNPs), and the characteristics (size, shape, position, orientation, and surface chemistry) of the nanoparticles. This modelling shows that DO quenches the SERS EM field, while its absence allows the EM field to propagate throughout the sample via neighbouring AgNPs and their aggregates through plasmonic coupling.

Figure 5A:
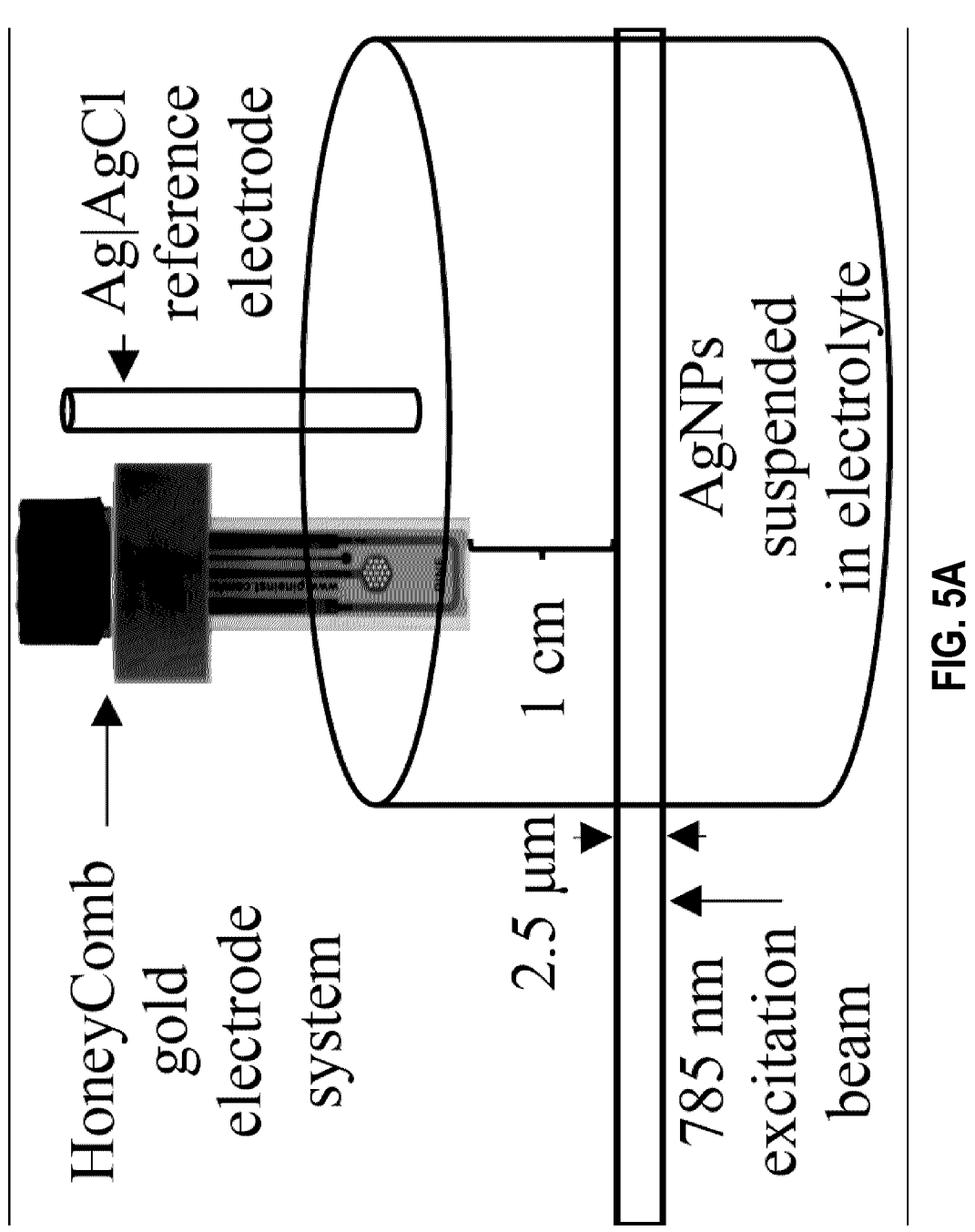
FIG. 5 shows photocurrent generation through an integrated plasmonic field; specifically, FIG. 5A) shows an experimental schematic showing the relative positions of the incident radiation and honeycomb electrode surface.
Figure 5B:
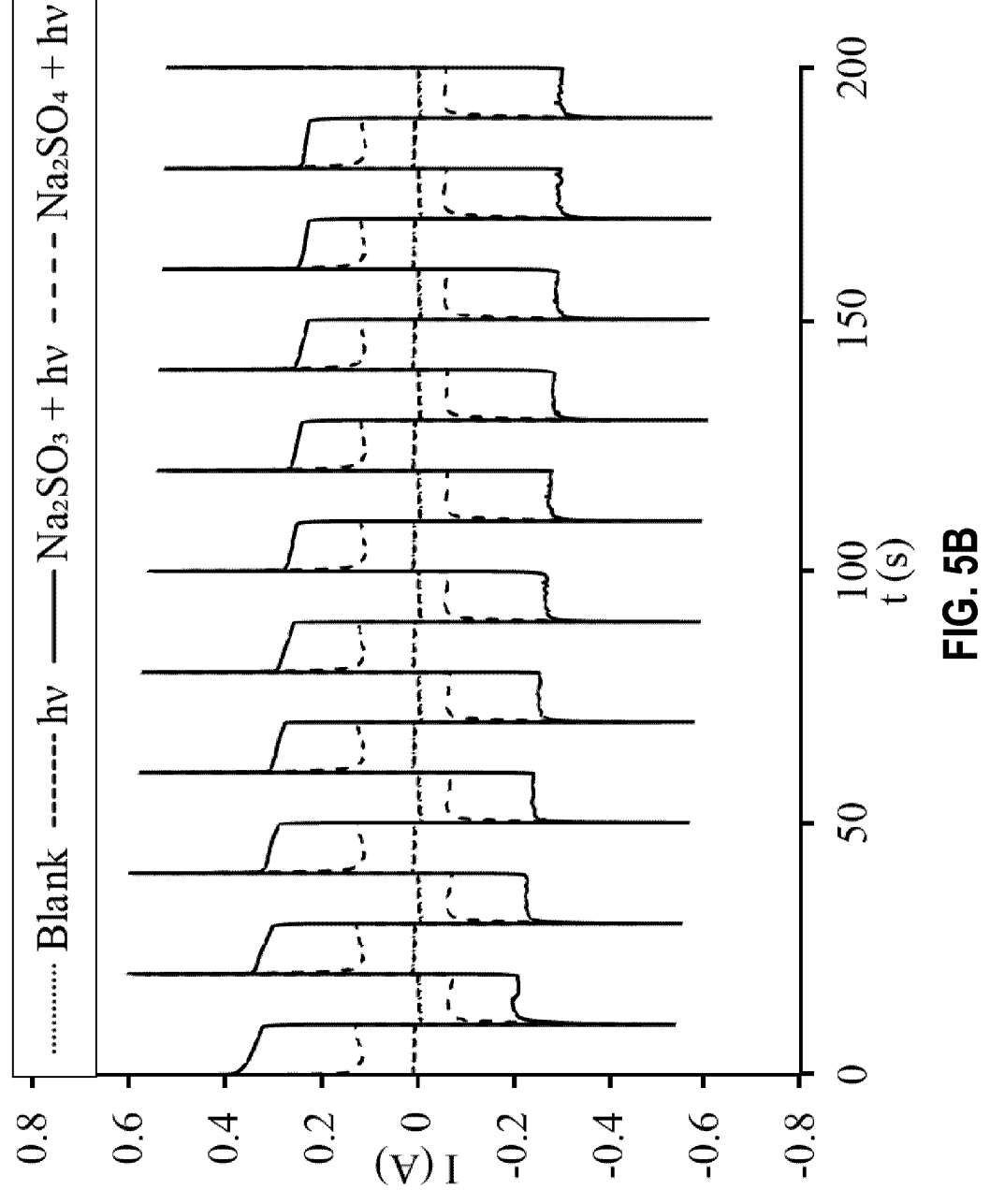

SERS signal propagation through liquid samples, such as aqueous solutions, was also studied electrochemically. DO removal significantly enhanced the photocurrent induced by the laser irradiation of suspended AgNPs not physically attached to a gold electrode (see FIG. 5, described in more detail above). As mentioned in the methodology section, FIG. 5A shows the experimental schematic that was used, where photocurrent was measured at a honeycomb gold electrode from a solution of AgNPs agglomerated by $Na_2SO_3$ (dissolved oxygen removal) and $Na_2SO_4$ (oxygen retention) through light irradiation of the AgNP solution (not the electrode). Meanwhile, FIG. 5B shows photocurrent generation under the listed conditions, through NIR ($\lambda$=785 nm) irradiation 1 cm away from the electrode surface in the presence and absence of dissolved oxygen at constant ionic strength. As can be seen in FIG. 5B, the current generated by irradiation was both increased by addition of a salt (either sodium sulfate or sulfite) and by increasing conductivity. However, sodium sulfite also scavenged the dissolved oxygen and significantly enhanced the photocurrent generation. Results and Discussion for Remote Sensing and Blind Remote Sensing Additional evidence to support long-range SERS field transmission in liquid samples, such as aqueous solutions, comes from the remote detection of analytes by anaerobic SERS using the probe of the present invention.

First, analytes adsorbed onto silver mirrors coating the distal ends of NMR tubes filled with deoxygenated pristine AgNP solutions maintained ~70% of the signal intensity of C-S stretching band (1070-1080 cm$^{-1}$) near and perpendicular to the Ag surface when measured 10 cm away from the silver mirror, although other vibrational bands that are further away and otherwise oriented decreased rapidly (see FIG. 18, described in more detail above).

For clarity, in FIG. 18, the spectra were recorded using the same measurement parameters as FIG. 8; however, the analytes were adsorbed onto a silver mirror at the base of the NMR tubes rather than dispersed through the liquid sample. The AgNPs were added and agglomerated with $Na_2SO_3$ (dissolved oxygen removal) as described in FIG. 8; however, they were added and agglomerated along the tubing and in the detection chamber.

As stated previously, to prepare the silver mirror surface at the end of the tubing, a solution of Tolien's reagent was made from 0.1 M of $AgNO_3$, which was first precipitated by the addition of dilute NaOH to form $Ag_2O$. The obtained $Ag_2O$ was re-dissolved by the dropwise addition of concentrated aqueous $NH_3$ to form the $Ag(NH_3)_2$ complex. The Tolien's reagent solution was added to the bottom of a quartz NMR tube to cover half of the desired surface (~5 mm) that was to be silver-coated. Then, an equal volume of 0.1 M of glucose was added, and the mirror was allowed to develop. After the surface was silver-coated, it was rinsed ~30 times each with nanopure water and EtOH to remove any excess reagents or other adsorbed materials before drying at ambient temperature.

Figure 18A:
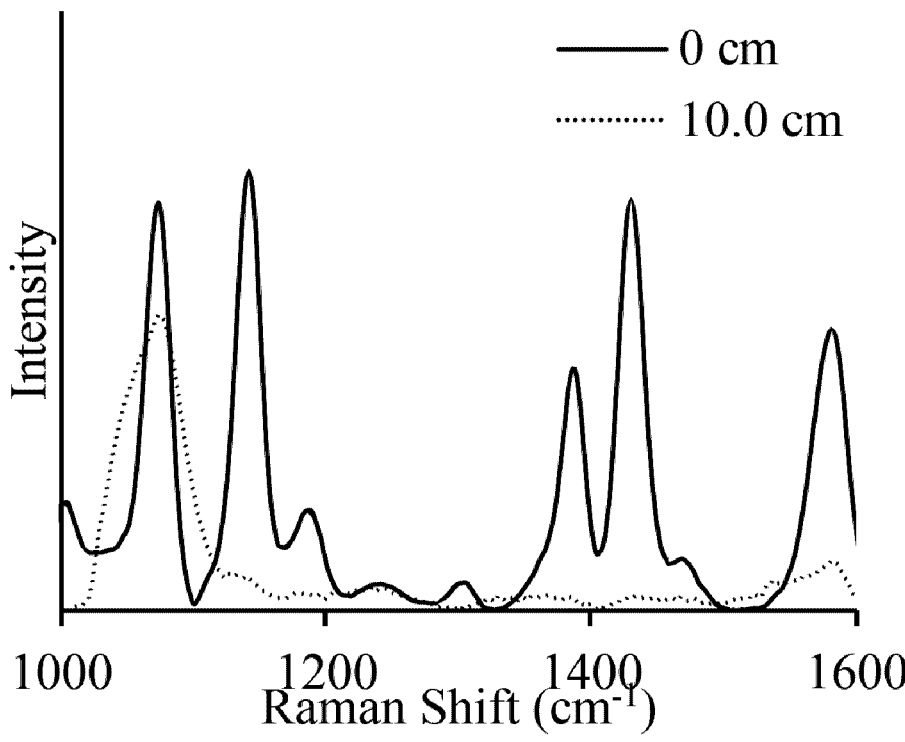
FIG. 18 shows remote detection of analyte adsorbed onto a silver mirror on the base of a quartz NMR tube; specifically.

Using the above set-up and parameters, the following SERS spectra were obtained (as shown in FIG. 18):

FIG. 18A: Adsorbed p-aminothiophenol measured at 0 and 10 cm away from the silver mirror.

Figures 18B, 18C:
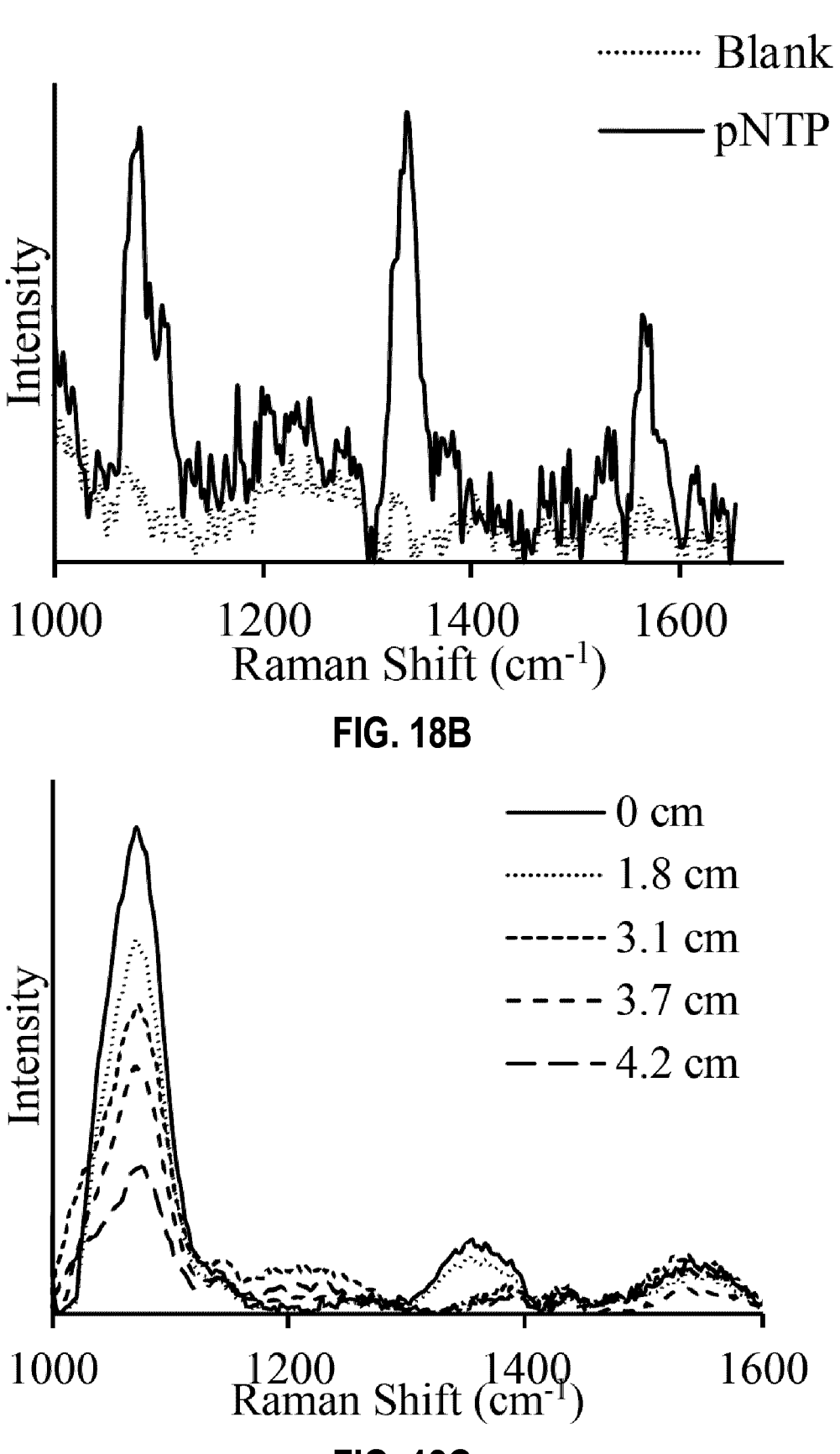

FIG. 18B: Adsorbed p-nitrothiophenol and a blank measured at 10 cm away from the silver mirror.

FIG. 18C: Adsorbed p-aminothiophenol spectra as a function of measurement distance from the silver mirror.

Figure 18D:
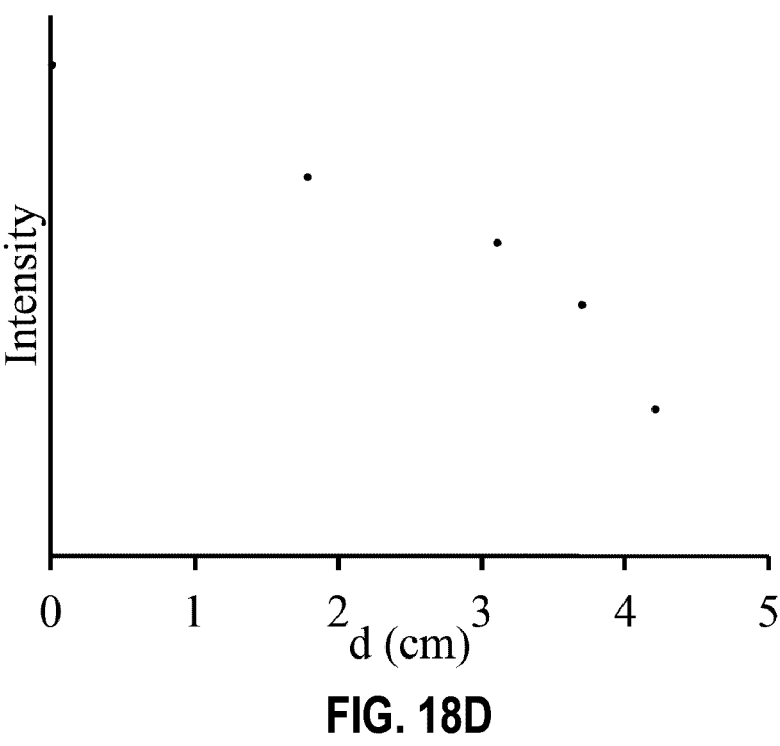

Similarly, FIG. 18D shows C-S stretching intensity of p-aminothiophenol as a function of distance from the silver mirror.

As can be seen in FIG. 18, propagation was less efficient through silica coated AgNPs. It should be mentioned that, in FIG. 18, blanks for all experiments show no significant signals beyond the noise level. The average of three spectra are presented and the standard deviation in D) is smaller than the size of the data markers.

Figure 19A:
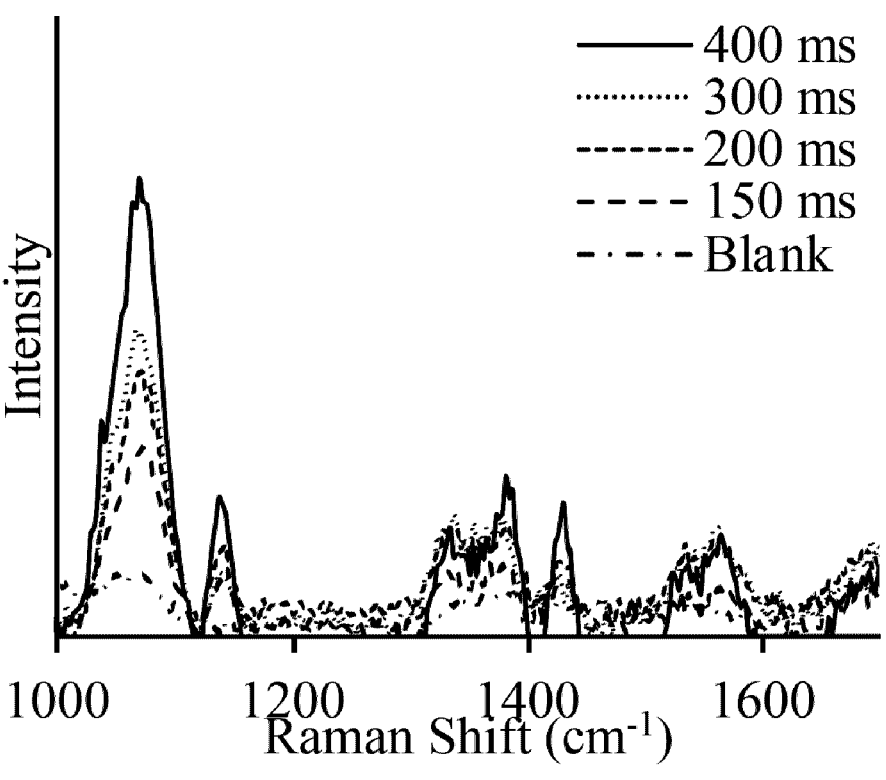
FIG. 19 shows remote detection of analytes adsorbed on deoxygenated and aggregated silver nanoparticles in a 96-well microtiter plate; specifically.
Figure 19B:
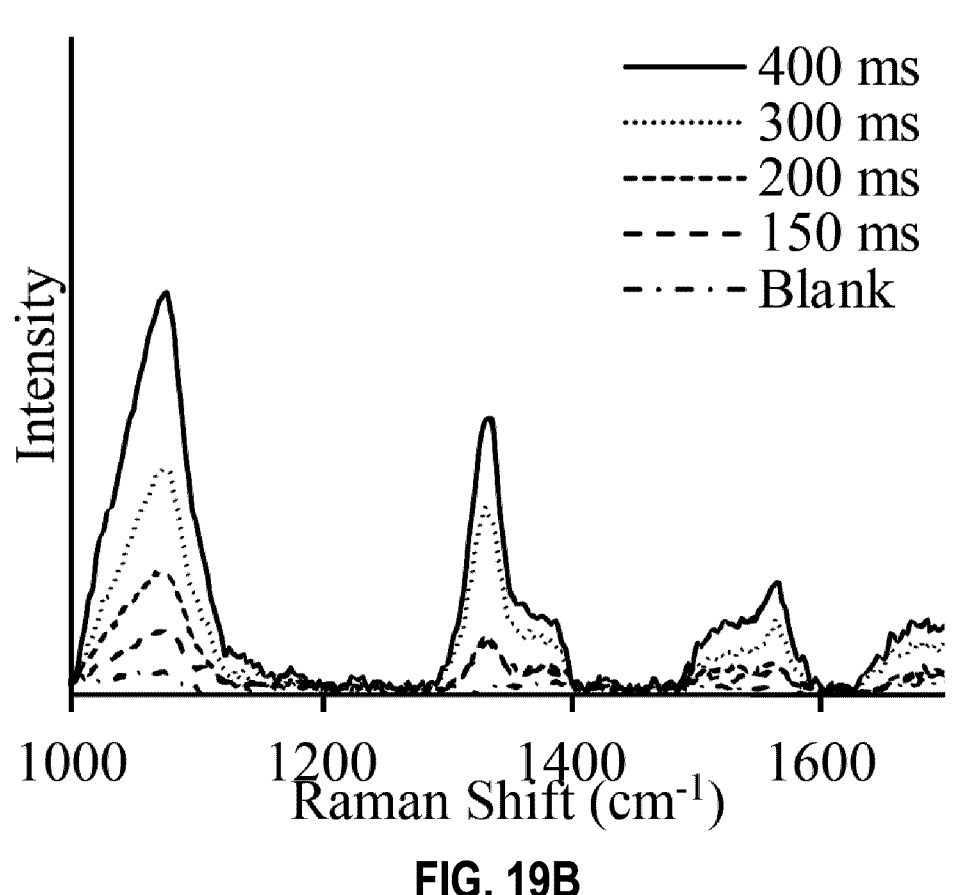

Second, remote SERS was applied to high throughput detection in a 96-well microtiter plate where the analytes were pre-adsorbed in AgNPs in the 96-well plate followed by DO removal and agglomeration with sodium sulfite (see FIG. 19, described in more detail above). The measurement parameters used in FIG. 19 were similar to those in FIG. 18; however, analytes were preadsorbed on deoxygenated agglomerated AgNPs within the wells of a microtiter plate. Capillary melting point tubes prefilled with deoxygenated agglomerated AgNPs were dipped in the wells. Spectra were measured through the capillary tube 6 cm distant to the wells. These spectra are presented as a function of integration time for p-aminothiophenol (FIG. 19A) and p-nitrothiophenol (FIG. 19B).

For clarity, the 6 cm glass capillary tubes filled with deoxygenated aqueous pristine AgNP aggregate solutions were placed in each well vertically to transmit the SERS signals upward where incident light irradiation perpendicular to the capillary tubes (and parallel to the microtiter plate). This was validated with a blind test, defined above, where 20 wells were randomly filled with analyte or a blank and detected with 100% accuracy. It should be mentioned that, in FIG. 19, blanks for all experiments show no significant signals beyond the noise level.

Figure 20A:
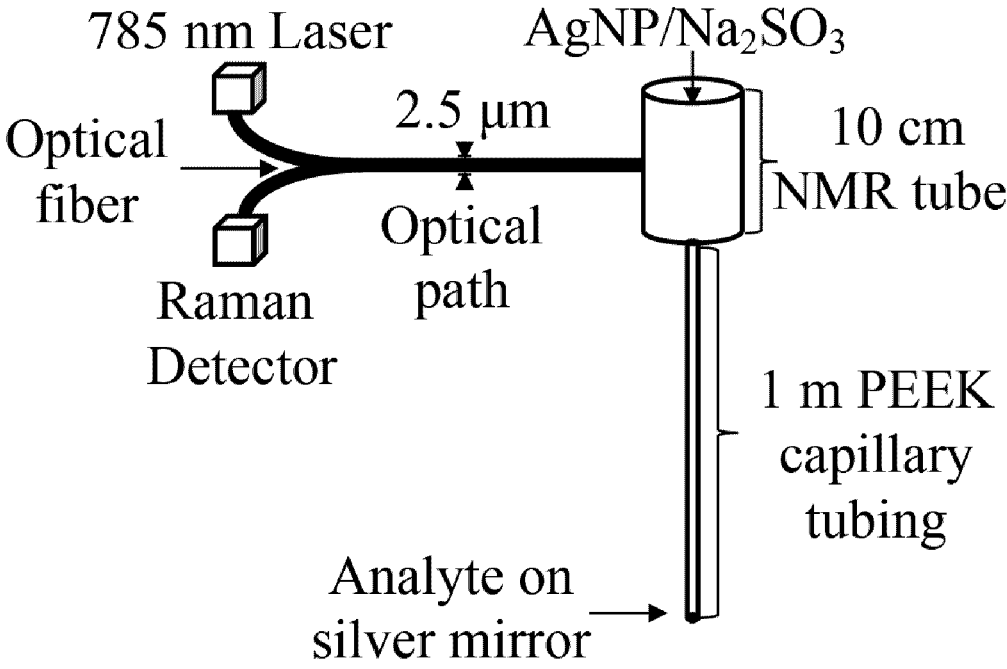
FIG. 20 shows remote analyte detection through integrated plasmonic coupling over 1 m; specifically.
Figure 20B:
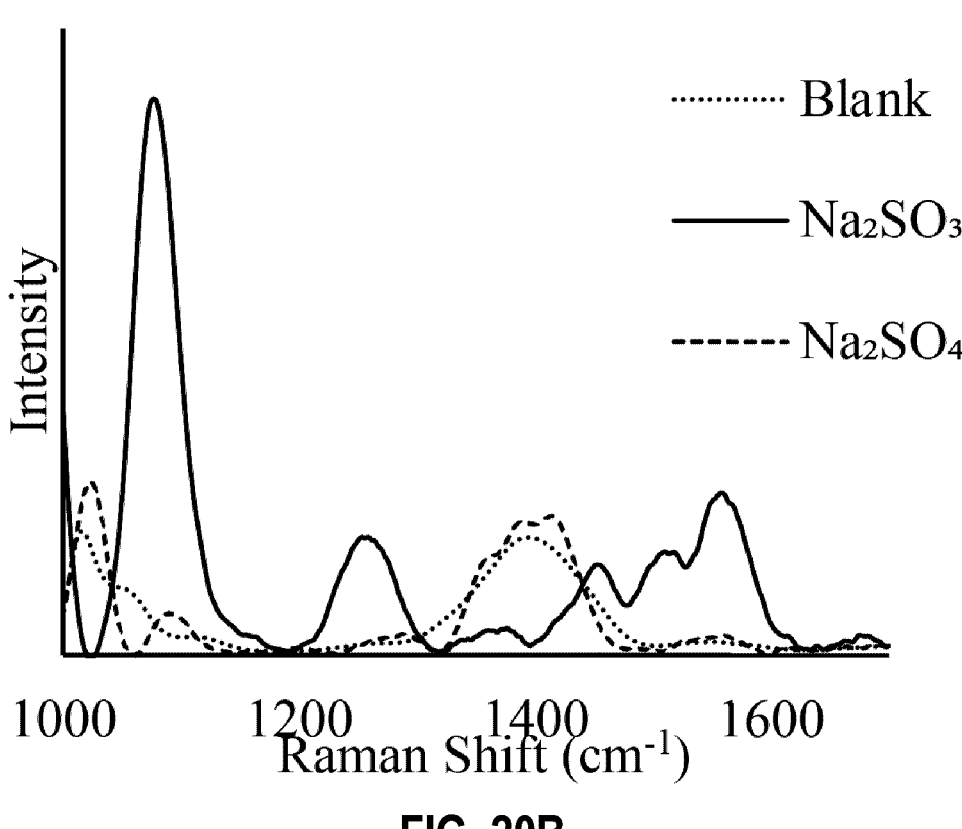
Figure 20C:
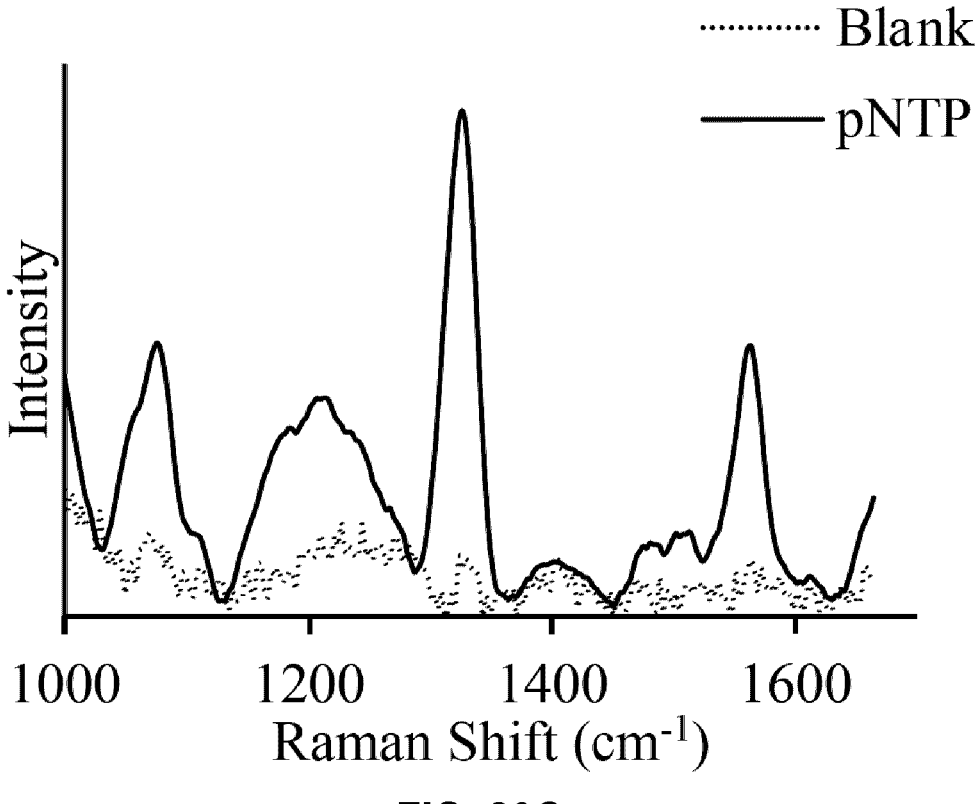

Lastly, remote SERS was validated by using a 1 m long PEEK capillary with a silver mirror at the distal end (see FIG. 20, described in more detail above). The measurement parameters used in FIG. 20 were similar to those in FIG. 18; however, the silver mirror was grown on one end of a 1 m long PEEK capillary tube. The other end was joined to a length of NMR tubing (FIG. 20A) and the system was flushed with solvent. Blank measurements were taken by passing deoxygenated agglomerated AgNPs through the tubing; thereafter, analyte was adsorbed on the silver mirror, the apparatus was rinsed, and the experiment repeated. FIG. 20A shows a schematic diagram of the above-defined set-up, while FIG. 20B shows the SERS spectra using p-aminothiophenol as the analyte, including oxygen removal and oxygen retention, and FIG. 20C shows the SERS spectra using p-nitrothiophenol as the analyte, where the sample was deoxygenated using 10 mg of sodium sulfite. For clarity, in FIG. 20A, the spectra labelled "$Na_2SO_3$" was subjected to deoxygenation using 10 mg of sodium sulfite, and the spectra labelled "$Na_2SO_4$" contains 10 mg of sodium sulfate, and therefore contains dissolved oxygen.

It should be mentioned that, in FIGS. 20B and C, no analyte was detected for the blank or without oxygen removal.

The above experiments established long-range transmission of the surface plasmonic field in liquid samples such as aqueous solutions, though the length of signal transmission is particle dependent, i.e., pristine AgNPs can transmit at least 1 m whereas less effective silica coated AgNPs decrease over ~6 cm. This is consistent with the computational modelling results (FIG. 6), where the compromised SERS field intensity and propagation using silica coated AgNPs results in $10^4$ times higher LOD (50 aM) than pristine AgNPs (10 zM).

The conventional understanding of SERS is based on signal amplification with individual nanostructures or the plasmonic field coupling of, for example, adjacent plasmonic nanoparticles, i.e., in nanogaps. The "hot spot" theory is sufficient to interpret all experimental observations, where the SERS signal amplification is based on localized surface-plasmon resonance, which is a discrete EM field around individual or small clusters of, for example, plasmonic nanoparticles. However, it was demonstrated in the present experiments that large-scale plasmonic field coupling (or, integrated surface-plasmon resonance) is possible upon DO removal. This integrated field enables effective transport of the SERS signal of a single molecule that is adsorbed on, for example, any individual plasmonic nanoparticle throughout the whole sample, e.g., every plasmonic nanoparticle becomes SERS active and can either act as a "hot spot" for an adsorbed analyte or transport the SERS signal, resulting in real single molecule detection. Herein, it was shown that this plasmonic field transport also occurs over long distances in oxygen-free water. AgNP aggregation is still preferred in anaerobic SERS, which is advantageous for plasmonic field transport (see FIG. 7A-F, described in more detail above, where it can be observed that electromagnetic field transmission is lost at 17 and 9.8 nm for pristine and silver oxide coated silver nanoparticles, respectively). In SHINERS experiments, it was found that superior SERS sensitivity (50 aM) was only achieved when silica-coated AgNPs were agglomerated by both adding sodium sulfite and lowering the pH of the solution, where sodium sulfite alone was sufficient for DO removal but unable to agglomerate silica-coated AgNPs.

One striking advantage of the present anaerobic (i.e. deoxygenated) SERS measurements is the detection time was not determined by analyte diffusion into the field-of-view of the detector (particularly because they are surface bound to immobile silver mirrors or slowly diffusing nanoparticle aggregates), but rather by the transport of the plasmonic field. In the 1 m remote SERS detection using the probe of the present invention, where the analyte was immobilized on a silver mirror at one end of the PEEK tubing and was unable to migrate, the SERS signal was obtained immediately upon irradiation at the other end of the tubing. This ultra-fast response yields high temporal resolution in addition to its high sensitivity, which allows monitoring of fast chemical events, e.g., to study chemical reactions or to detect short-lived species at a single molecule level. This technique is also cost-effective and only requires a regular Raman spectrometer without an expensive SERS detector. This greatly reduces the capital expense of performing SERS experiments and will facilitate this research globally, but particularly in developing countries and resource-limited areas. It is believed the unprecedented detection sensitivity, fast response time, and the remote sensing capability may generate many applications in medical diagnosis, environmental monitoring, and national security.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

B. Sharma, R. R. Frontiera, A.-I. Henry, E. Ringe, R. P. Van Duyne, SERS: Materials, applications, and the future. *Mater. Today.* 15, 16-25 (2012).

B. Sharma, P. Bugga, L. R. Madison, A.-I. Henry, M. G. Bieber, N. G. Greeneltch, N. Chiang, M. Mrksich, G. C. Schatz, R. P. Van Duyne, Bisboronic Acids for Selective, Physiologically Relevant Direct Glucose Sensing with Surface enhanced Raman Spectroscopy. *J. Am. Chem. Soc.* 138, 13952-13959 (2016).

J. A. Powell, K. Venkatakrishnan, B. Tan, Programmable SERS active substrates for chemical and biosensing applications using amorphous/crystalline hybrid silicon nanomaterial. *Sci. Rep.* 6, 19663 (2016).

F. Sun, H.-C. Hung, A. Sinclair, P. Zhang, T. Bai, D. D. Galvan, P. Jain, B. Li, S. Jiang, Q. Yu, Hierarchical zwitterionic modification of a SERS substrate enables real-time drug monitoring in blood plasma. *Nat. Commun.* 7, 13437 (2016).

P. Dyakonov, K. Mironovich, S. Svyakhovskiy, O. Voloshina, S. Dagesyan, A. Panchishin, N. Suetin, V. Bagratashvili, P. Timashev, E. Shirshin, S. Evlashin, Carbon nanowalls as a platform for biological SERS studies. *Sci. Rep.* 7, 13352 (2017).

R. A. Halvorson, P. J. Vikesland, Surface enhanced Raman Spectroscopy (SERS) for Environmental Analyses. *Environ. Sci. Technol.* 44, 7749-7755 (2010).

M. Fleischmann, P. J. Hendra, A. J. McQuillan, Raman spectra of pyridine adsorbed at a silver electrode. *Chem. Phys. Lett.* 26, 163-166 (1974).

D. L. Jeanmaire, R. P. Van Duyne, Surface raman spectroelectrochemistry: Part I. Heterocyclic, aromatic, and aliphatic amines adsorbed on the anodized silver electrode. *J. Electroanal. Chem. Interfacial Electrochem.* 84, 1-20 (1977).

S. Nie, S. R. Emory, Probing Single Molecules and Single Nanoparticles by Surface enhanced Raman Scattering. *Science.* 275, 1102 (1997).

K. Kneipp, Y. Wang, H. Kneipp, L. T. Perelman, I. Itzkan, R. R. Dasari, M. S. Feld, Single Molecule Detection Using Surface enhanced Raman Scattering (SERS). *Phys. Rev. Lett* 78, 1667-1670 (1997).

S.-Y. Ding, J. Yi, J.-F. Li, B. Ren, D.-Y. Wu, R. Panneerselvam, Z.-Q. Tian, Nanostructure-based plasmon-enhanced Raman spectroscopy for surface analysis of materials. *Nat. Rev. Mater.* 1, 16021 (2016).

A. Ahmed, R. Gordon, Directivity Enhanced Raman Spectroscopy Using Nanoantennas. *Nano Lett* 11, 1800-1803 (2011).

D. Radziuk, H. Moehwald, Prospects for plasmonic hot spots in single molecule SERS towards the chemical imaging of live cells. *Phys. Chem. Chem. Phys.* 17, 21072-21093 (2015).

L. Dong, X. Yang, C. Zhang, B. Cerjan, L. Zhou, M. L. Tseng, Y. Zhang, A. Alabastri, P. Nordlander, N. J. Hales, Nanogapped Au Antennas for Ultrasensitive Surface enhanced Infrared Absorption Spectroscopy. *Nano Lett.* 17, 5768-5774 (2017).

M. Yilmaz, E. Babur, M. Ozdemir, R. L. Gieseking, Y. Dede, U. Tamer, G. C. Schatz, A. Facchetti, H. Usta, G. Demirel, Nanostructured organic semiconductor films for molecular detection with surface enhanced Raman spectroscopy. *Nat. Mater.* 16, 918-924 (2017).

S. Yang, X. Dai, B. B. Stogin, T.-S. Wong, Ultrasensitive surface enhanced Raman scattering detection in common fluids. *Proc. Natl. Acad. Sci.* 113, 268 (2016).

F. De Angelis, F. Gentile, F. Mecarini, G. Das, M. Moretti, P. Candeloro, M. L. Coluccio, G. Cojoc, A. Accardo, C. Liberale, R. P. Zaccaria, G. Perozziello, L. Tirinato, A. Toma, G. Cuda, R. Cingolani, E. Di Fabrizio, Breaking the diffusion limit with super-hydrophobic delivery of molecules to plasmonic nanofocusing SERS structures. *Nat. Photonics.* 5, 682-687 (2011).

P. Christopher, H. Xin, S. Linic, Visible-light-enhanced catalytic oxidation reactions on plasmonic silver nanostructures. *Nat. Chem.* 3, 467-472 (2011).

J. F. Li, X. D. Tian, S. B. Li, J. R. Anema, Z. L. Yang, Y. Ding, Y. F. Wu, Y. M. Zeng, Q. Z. Chen, B. Ren, Z. L. Wang, Z. Q. Tian, Surface analysis using shell-isolated nanoparticle-enhanced Raman spectroscopy. *Nat. Protoc.* 8, 52-65 (2013).

M. Erol, Y. Han, S. K. Stanley, C. M. Stafford, H. Du, S. Sukhishvili, SERS Not To Be Taken for Granted in the Presence of Oxygen. *J. Am. Chem. Soc.* 131, 7480-7481 (2009).

Y. Han, R. Lupitskyy, T.-M. Chou, C. M. Stafford, H. Du, S. Sukhishvili, Effect of Oxidation on Surface enhanced Raman Scattering Activity of Silver Nanoparticles: A Quantitative Correlation. *Anal. Chem.* 83, 5873-5880 (2011).

J.-F. Li, Y.-J. Zhang, S.-Y. Ding, R. Panneerselvam, Z.-Q. Tian, Core-Shell Nanoparticle-Enhanced Raman Spectroscopy. *Chem. Rev.* 117, 5002-5069 (2017).

N. Michieli, R. Pilot, V. Russo, C. Scian, F. Todescato, R. Signorini, S. Agnoli, T. Cesca, R. Bozio, G. Mattei, Oxidation effects on the SERS response of silver nanoprism arrays. *RSC Adv.* 7, 369-378 (2017).

A. Matikainen, T. Nuutinen, T. Itkonen, S. Heinilehto, J. Puustinen, J. Hiltunen, J. Lappalainen, P. Karioja, P. Vahimaa, Atmospheric oxidation and carbon contamination of silver and its effect on surface enhanced Raman spectroscopy (SERS). *Sci. Rep.* 6, 37192 (2016).

J. F. Li, Y. F. Huang, Y. Ding, Z. L. Yang, S. B. Li, X. S. Zhou, F. R. Fan, W. Zhang, Z. Y. Zhou, D. Y. Wu, B. Ren, Z. L. Wang, Z. Q. Tian, Shell-isolated nanoparticle-enhanced Raman spectroscopy. *Nature.* 464, 392-395 (2010).

A. L. Dendramis, E. W. Schwinn, R. P. Sperline, A surface enhanced Raman scattering study of CTAB adsorption on copper. *Surf Sci.* 134, 675-688 (1983).

R. M. Bakker, D. Permyakov, Y. F. Yu, D. Markovich, R. Paniagua-Dominguez, L. Gonzaga, A. Samusev, Y. Kivshar, B. Luk'yanchuk, A. I. Kuznetsov, Magnetic and Electric Hotspots with Silicon Nanodimers. *Nano Lett* 15, 2137-2142 (2015).

A. Shalabney, J. George, H. Hiura, J. A. Hutchison, C. Genet, P. Hellwig, T. W. Ebbesen, Enhanced Raman Scattering from Vibro-Polariton Hybrid States. *Angew. Chem. Int. Ed.* 54, 7971-7975 (2015).

S. A. Maier, P. G. Kik, H. A. Atwater, S. Meltzer, E. Harel, B. E. Koel, A. A. G. Requicha, Local detection of electromagnetic energy transport below the diffraction limit in metal nanoparticle plasmon waveguides. *Nat. Mater.* 2, 229-232 (2003).

Q. Zhang, N. Li, J. Goebl, Z. Lu, Y. Yin, A Systematic Study of the Synthesis of Silver Nanoplates: Is Citrate a "Magic" Reagent? *J. Am. Chem. Soc.* 133, 18931-18939 (2011).

U. Hohenester, J. Krenn, Surface plasmon resonances of single and coupled metallic nanoparticles: A boundary integral method approach. *Phys. Rev. B.* 72, 195429 (2005).

F. J. Garcia de Abajo, A. Howie, Relativistic Electron Energy Loss and Electron-Induced Photon Emission in Inhomogeneous Dielectrics. *Phys. Rev. Lett.* 80, 5180-5183 (1998).

F. J. Garcia de Abajo, A. Howie, Retarded field calculation of electron energy loss in inhomogeneous dielectrics. *Phys. Rev. B.* 65, 115418 (2002).

M. J. Lagos, A. Trügler, U. Hohenester, P. E. Batson, Mapping vibrational surface and bulk modes in a single nanocube. *Nature.* 543, 529-532 (2017).

U. Hohenester, A. Trugler, Interaction of Single Molecules With Metallic Nanoparticles. *IEEE J. Sel. Top. Quantum Electron.* 14, 1430-1440 (2008).

F. J. Garcia de Abajo, Optical excitations in electron microscopy. *Rev. Mod. Phys.* 82, 209-275 (2010).

P. B. Johnson, R. W. Christy, Optical Constants of the Noble Metals. *Phys. Rev. B.* 6, 4370-4379 (1972).

G. Saroja, V. Vasu, N. Nagarani, Optical Studies of Ag2O Thin Film Prepared by Electron Beam Evaporation Method. *Open J. Met.* 3, 57-63 (2013).

A. A. Maryott, E. R. Smith, *Table of Dielectric Constants of Pure Liquids* (United States Department of Commerce, 1951), *National Bureau of Standard Circular.*

Ouyang, Lei; Ren, Wen; Zhu, Lihua; Irudayaraj, Joseph./ Prosperity to challenges: Recent approaches in SERS substrate fabrication. In: Reviews in Analytical Chemistry. 2017; Vol. 36, No. 1.

Mosier-Boss P A. Review of SERS Substrates for Chemical Sensing. Nanomaterials (Basel). 2017; 7(6):142. Published 2017 Jun. 8.

McNay G, Eustace D, Smith W E, Faulds K, Graham D. Surface-enhanced Raman scattering (SERS) and surface-enhanced resonance Raman scattering (SERRS): a review of applications. Appl Spectrosc. 2011; 65(8):825-837.

Restaino S M, White I M. A critical review of flexible and porous SERS sensors for analytical chemistry at the point-of-sample. Anal Chim Acta. 2019; 1060:17-29.

Luo S C, Sivashanmugan K, Liao J D, Yao C K, Peng H C. Nanofabricated SERS-active substrates for single-molecule to virus detection in vitro: a review. Biosens Bioelectron. 2014; 61:232-240.

Ogundare, S. A., van Zyl, W. E. A review of cellulose-based substrates for SERS: fundamentals, design principles, applications. Cellulose 26, 6489-6528 (2019).

Li J F, Zhang Y J, Ding S Y, Panneerselvam R, Tian Z Q. Core-Shell Nanoparticle-Enhanced Raman Spectroscopy. Chem Rev. 2017; 117(7):5002-5069.

A. Purwidyantri, C.-H. Hsu, C.-M. Yang, B. A. Prabowo, Y.-C. Tiang and C.-S. Lai, RSC Adv., 2019, 9, 4982-4992.

Neubrech F, Huck C, Weber K, Pucci A, Giessen H. Surface-Enhanced Infrared Spectroscopy Using Resonant Nano-antennas. Chem Rev. 2017; 117(7):5110-5145.

The invention claimed is:

1. A method of modifying a liquid sample containing an analyte so as to increase Surface-Enhanced Raman Scattering (SERS) signal intensity of the analyte, the method comprising the steps of:

providing the liquid sample to be analyzed using SERS; and adding an oxygen scavenger to the liquid sample so as to remove dissolved oxygen from the liquid sample, contacting the liquid sample with a plasmonic material for SERS, and measuring the SERS spectrum of the liquid sample, wherein enough oxygen scavenger is added such that a concentration of remaining dissolved oxygen is at most 0.020 mM during SERS measurement.

2. The method according to claim 1, wherein enough oxygen scavenger is added such that the concentration of remaining dissolved oxygen is at most about 0.010 mM.

3. The method according to claim 1, wherein, after the liquid sample is modified, the limit of detection for a given analyte is decreased by a factor of at least about $10^8$.

4. The method according to claim 1, wherein the limit of detection for the analyte using SERS is at most about 1 pM.

5. The method according to claim 1, wherein the plasmonic material 11 is comprised of plasmonic nanoparticles.

6. The method according to claim 5, wherein the plasmonic nanoparticles are agglomerated by adding an agglomerant, adjusting the pH, adding an organic solvent, or combining these approaches.

7. The method according to claim 6, wherein the agglomerant is the oxygen scavenger.

8. The method according to claim 7, wherein the plasmonic nanoparticles are added to the liquid sample before agglomeration of the nanoparticles and before dissolved oxygen removal using an oxygen scavenger.

9. The method according to claim 1, wherein the liquid is water.

10. The method according to claim 1, wherein the method further comprises the step of modification of the analyte so that it can interact with a surface of a plasmonic material used for the SERS detection.

11. The method according to claim 10, wherein the modification of the analyte is done by attaching a thiol group to the analyte, so the analyte will chemisorb, via the thiol, on an Ag or Au plasmonic surface.

12. The method according to claim 1, the oxygen scavenger is sodium sulfite, hydrazine, ascorbic acid, or ascorbyl palmitate.

13. The method according to claim 1, wherein an excess amount of oxygen scavenger is added.

14. The method according to claim 6, wherein the plasmonic nanoparticles are added to the liquid sample before agglomeration of the nanoparticles and before dissolved oxygen removal using an oxygen scavenger.

* * * * *